(12) United States Patent
Yamada et al.

(10) Patent No.: US 11,780,251 B2
(45) Date of Patent: Oct. 10, 2023

(54) MANUFACTURING METHOD FOR PRINTED MATTER, MANUFACTURING METHOD FOR FOAM, FOAMING INHIBITION INK, FORMING METHOD FOR THREE-DIMENSIONAL FORMED OBJECT, AND FORMING SYSTEM FOR THREE-DIMENSIONAL FORMED OBJECT

(71) Applicant: MIMAKI ENGINEERING CO., LTD., Nagano (JP)

(72) Inventors: Yoshimi Yamada, Nagano (JP); Ayaka Yokomichi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 119 days.

(21) Appl. No.: 17/295,046

(22) PCT Filed: Nov. 19, 2019

(86) PCT No.: PCT/JP2019/045199
§ 371 (c)(1),
(2) Date: May 19, 2021

(87) PCT Pub. No.: WO2020/105612
PCT Pub. Date: May 28, 2020

(65) Prior Publication Data
US 2021/0402810 A1 Dec. 30, 2021

(30) Foreign Application Priority Data

Nov. 20, 2018 (JP) ................................. 2018-217247
Dec. 19, 2018 (JP) ................................. 2018-237026
(Continued)

(51) Int. Cl.
*B29C 44/02* (2006.01)
*B41M 5/00* (2006.01)
(Continued)

(52) U.S. Cl.
CPC ............. *B41J 11/68* (2013.01); *B29C 44/022* (2013.01); *B41M 5/0041* (2013.01);
(Continued)

(58) Field of Classification Search
CPC ........ B41J 11/68; B41M 5/0041; B41M 3/18; B41M 7/009; B41M 3/06;
(Continued)

(56) References Cited

U.S. PATENT DOCUMENTS 3,844,814 A * 10/1974 Bettoli ..................... C08J 9/101
264/52

FOREIGN PATENT DOCUMENTS

GB          1069998      5/1967
JP          S46004913    2/1971
(Continued)

OTHER PUBLICATIONS

"Notification of Reasons for Rejection of Japan Counterpart Application", dated Sep. 27, 2022, with English translation thereof, p. 1-p. 10.
(Continued)

*Primary Examiner* — Yaovi M Ameh
(74) *Attorney, Agent, or Firm* — JCIPRNET

(57) ABSTRACT

Provided are a manufacturing method for a foamable printed matter, a manufacturing method for a foam and a foaming inhibition ink. The manufacturing method for a printed matter is a manufacturing method for a foamable printed matter that foams to form an irregular pattern on its surface, the method including a printing step of inkjet-printing a foaming inhibition ink on a printing medium having a layer of a foamable resin composition containing a chemical foaming agent, under a temperature condition lower than a softening temperature of the foamable resin composition, the foaming inhibition ink containing: a foaming inhibitor
(Continued)

that deteriorates a heat decomposing ability of the foamable resin composition; and a solvent that dissolves the foaming inhibitor when the foaming inhibitor is solid, is compatible with the foaming inhibitor when the foaming inhibitor is liquid, and is able to move the foaming inhibitor into the foamable resin composition.

13 Claims, 16 Drawing Sheets

(30) Foreign Application Priority Data

Dec. 19, 2018 (JP) ................................. 2018-237555
Jan. 18, 2019 (JP) ................................. 2019-006563

(51) Int. Cl.
  *B41J 11/68* (2006.01)
  *B29C 35/08* (2006.01)
  *B41M 3/18* (2006.01)
  *B41M 7/00* (2006.01)
  *B41M 3/06* (2006.01)

(52) U.S. Cl.
  CPC ........ *B29C 2035/0822* (2013.01); *B41M 3/06* (2013.01); *B41M 3/18* (2013.01); *B41M 7/009* (2013.01)

(58) Field of Classification Search
  CPC .. B29C 2035/0822; B29C 44/022; C08J 9/04; C08J 9/06
  See application file for complete search history.

(56) References Cited

FOREIGN PATENT DOCUMENTS

| JP | S6073895 | | 4/1985 | | |
|---|---|---|---|---|---|
| JP | H0486300 | | 3/1992 | | |
| JP | H07246767 | | 9/1995 | | |
| JP | H11277866 | | 10/1999 | | |
| JP | 2000053143 | | 2/2000 | | |
| JP | 2001347611 | | 12/2001 | | |
| JP | 2001347611 | A * | 12/2001 | ............ | B32B 27/28 |
| JP | 2003072217 | | 3/2003 | | |
| JP | 2003266549 | A * | 9/2003 | ............ | B29C 69/02 |
| JP | 2012045764 | | 3/2012 | | |
| JP | 5212504 | | 6/2013 | | |
| JP | 2016114284 | | 6/2016 | | |
| JP | 2018094554 | | 6/2018 | | |
| JP | 2018099851 | | 6/2018 | | |
| WO | 2013027667 | | 2/2013 | | |

OTHER PUBLICATIONS

"Office Action of Japan Counterpart Application", dated Sep. 6, 2022, with English translation thereof, p. 1-p. 6.
"Notification of Reasons for Rejection of Japan Counterpart Application", dated Oct. 25, 2022, with English translation thereof, p. 1-p. 24.
"International Search Report (Form PCT/ISA/210) of PCT/JP2019/045199," dated Feb. 25, 2020, with English translation thereof, pp. 1-5.

* cited by examiner (a)

(b)

MANUFACTURING METHOD FOR PRINTED MATTER, MANUFACTURING METHOD FOR FOAM, FOAMING INHIBITION INK, FORMING METHOD FOR THREE-DIMENSIONAL FORMED OBJECT, AND FORMING SYSTEM FOR THREE-DIMENSIONAL FORMED OBJECT

CROSS-REFERENCE TO RELATED APPLICATION

This application is a 371 application of the international PCT application serial no. PCT/JP2019/045199, filed on Nov. 19, 2019, which claims the priority benefits of Japan application no. 2018-217247, filed on Nov. 20, 2018, Japan application no. 2018-237555, filed on Dec. 19, 2018, Japan application no. 2018-237026, filed on Dec. 19, 2018, and Japan application no. 2019-006563, filed on Jan. 18, 2019. The entirety of each of the above-mentioned patent applications is hereby incorporated by reference herein and made a part of this specification.

TECHNICAL FIELD

The present invention relates to a manufacturing method for a printed matter, a manufacturing method for a foam, and a foaming inhibition ink.

The present invention relates to a forming method for a three-dimensional formed object and a forming system for a three-dimensional formed object, which are intended to form a three-dimensional formed object such as a printed matter having irregularities formed by a foaming layer.

The present invention relates to a heating machine, a foaming machine for a foamable medium, and a manufacturing method for a foamed medium.

The present invention relates to a manufacturing method for a foamed object, a manufacturing apparatus for a foamed object, and a foaming apparatus.

BACKGROUND ART

A sheet in which an irregular pattern is provided on a front surface of a foamed sheet is widely used as cushion floors and wallpaper. As a manufacturing method for such a sheet, there is a chemical embossing method. In the chemical embossing method, a foaming sheet in which a foaming agent that foams by heat is blended in a resin is prepared, a foaming inhibitor is applied only to a specific region of the foaming sheet to inhibit foaming, and then the sheet is heated to provide an irregular pattern such that a region not applied with the foaming inhibitor is swollen to form a protrusion, and that the region applied therewith is made into a recess. The foaming inhibitor is usually applied by gravure printing, rotary screen printing, flexographic printing or the like.

For example, Patent Literature 1 discloses a manufacturing method for a cytoplasmic foamed product having an irregular pattern. In this method, an inhibitor (chelating agent that chelates a metal of a catalyst) that substantially changes a decomposition temperature of a foaming agent to be contacted therewith is applied, as a pattern, to a layer of a foamable resin composition on a base material sheet, the foamable resin composition being blended with: the foaming agent that generates gas and decomposes at a specific temperature (decomposition temperature); and a catalyst (metal catalyst) that lowers the decomposition temperature of the foaming agent, and heating is performed at an intermediate temperature between two temperatures, i.e., the decomposition temperature inherent in the foaming agent and the decomposition temperature lowered by the catalyst to recess the pattern. Further, Patent Literature 1 or Patent Literature 2 referred to in Patent Literature 1 exemplifies a vinyl chloride polymer, a vinyl chloride-vinyl acetate copolymer and the like as the foamable resin composition, azodicarbonamide as the foaming agent (decomposition temperature: 163 to 204° C.), dibasic lead phosphite, zinc stearate and the like as the metal catalyst, and alizarin, 1,8-dihydroxyanthroquinone, acetoacetanylide and the like as the chelating agent.

Further, Patent Literature 3 discloses a method for inkjet-printing an antifoaming agent. Patent Literature 3 describes that the use of an aqueous embossing composition (ink of an antifoaming agent) in an inkjet printer for a long period of time causes clogging of an inkjet print head; and that, in order to prevent the clogging, an antifoaming composition obtained by diluting an antifoaming composition obtained by diluting an antifoaming agent with, as a diluent, a high boiling point compound such as dioctyl adipate added, as a plasticizer, to polyvinyl chloride of a foamable layer is inkjet-printed on the foamable layer gelled by being heated to a temperature of lower than 150° C.

Various techniques have been developed for forming a three-dimensional formed object such as a printed matter in which irregularities are formed by a foaming layer.

For example, Patent Literature 3 discloses a method of imparting irregularities to a three-dimensional formed object such as wallpaper by foaming and expanding a foaming layer (foamable layer), that is, a forming method for a three-dimensional formed object such as wallpaper provided with irregularities.

In order to enhance functionality, media made by stacking different material layers have been developed.

For example, Patent Literature 5 discloses a recording medium in which a foaming resin layer, a base material, an adhesive, and a release paper are stacked. In order to foam the foaming resin layer to form a three-dimensional design, a solid black image is printed on a portion of the foaming resin layer desired to foam, and then the recording medium is heated.

A manufacturing method has been developed in which a sheet-shaped foamable workpiece is subjected to processing such as printing and cutting, and then the workpiece is heated to foam, thereby manufacturing a foamed object having three-dimensional irregularities.

For example, Patent Literature 3 discloses a forming apparatus for a textured surface coating, the apparatus including: a screen coating apparatus for forming a surface covering raw material by stacking a foamable layer on a support layer; a drum-type inkjet printing apparatus, which is a kind of line printer, for printing an image and an antifoaming composition on the foamable layer; and a foaming apparatus for heating the surface covering raw material to form a surface covering having a recess (texture) having a desired shape and the image.

CITATION LIST

Patent Literature

Patent Literature 1: Japanese Patent Publication No. 46-4913
Patent Literature 2: Japanese Patent Publication No. 43-28636

Patent Literature 3: Japanese Unexamined Patent Publication No. 2018-94554
Patent Literature 5: Japanese Patent No. 5212504

SUMMARY OF INVENTION

Technical Problems

In the methods described in Patent Literature 1 and Patent Literature 2, the layer of the foamable resin composition is heated so as to gel at a temperature lower than the decomposition temperature of the foaming agent lowered by the foaming inhibitor. The ink containing the chelating agent is printed on a front surface of the layer by gravure printing or the like. A wear-resistant layer is applied onto the front surface printed according to need, and then heated to melt the resin composition and to decompose the foaming agent. In the method of forming a recess by using a plate-type printing method, such as gravure printing, as in Patent Literature 1, it is necessary to pre-make a plate for transferring the ink or through which the ink passes. The plate-type method is useful in repeatedly and continuously printing a drawing made by platemaking, but is not appropriate for small lot production. In addition, the plate-type method is not appropriate for outputting a large picture because, for example, when a roll is used, the size of the picture is limited by the diameter and width of the roll.

As a method that deals with small lot production of sheets with an irregular pattern and a color pattern on their surfaces, a method is conceivable in which the color pattern is printed on a printing medium with a plaster-like, canvas-like, or any other irregular pattern physically applied thereto by an embossing roll in advance. If the color pattern is printed by using an inkjet printer, this method is suitable for digital on-demand small lot printing, with regard to the color pattern. This method, however, has a problem that it is not synchronized with the printing of the color pattern as small lot production, because the printing medium applied with the irregular pattern in advance, itself, is produced in a large lot due to the necessity to prepare an embossing roll.

Further, in the method described in Patent Literature 1, at the time of printing the ink containing the chelating agent, it is necessary to heat the layer of the foamable resin composition for gelation, in order to allow the chelating agent to permeate the layer of the foamable resin composition, and the operation is thus complicated.

The method described in Patent Literature 3 can be applied to small lot production because inkjet printing is used to print the antifoaming agent. However, when the antifoaming agent is inkjet-printed, it is necessary to heat the foamable layer to about 150° C. for gelation, in order to allow the antifoaming agent to permeate the foamable layer. Thus, the operation is complicated as in the method described in Patent Literature 1.

Therefore, the present invention provides a manufacturing method for a foamable printed matter, which is simple and suitable for small lot production of a foam having an irregular pattern on its surface, as well as a manufacturing method for a foam and a foaming inhibition ink, which are suitable therefor.

The inventor has considered cutting a three-dimensional formed object as obtained in Patent Literature 3 to form a perforation or notch. The perforation is formed, for example, to easily separate a part of the three-dimensional formed object from other portions. When the three-dimensional formed object is, for example, a seal with a release paper, the notch (e.g., half cut) is formed to define a seal material (portion to be peeled from the release paper and attached elsewhere). However, when the cut is attempted to be applied to a three-dimensional formed object having irregularities formed thereon, a protrusion formed by foaming interferes with and makes difficult the formation of the cut at an accurate position or the cutting itself.

The present invention has been made to solve the problems described above, and provides a forming method for a three-dimensional formed object and a forming system for a three-dimensional formed object, which enable accurate and easy cutting to form a perforation or notch.

In the case of Patent Literature 5, the adhesive, pressure-sensitive adhesive, and release paper are heated together with the foaming resin layer, and thus it is not possible to use an adhesive or release paper having a heat resistant temperature lower than the foaming temperature for foaming the foaming resin layer. Thus, when it is necessary to heat a medium formed by stacking layers having different heat resistant temperatures at a predetermined temperature or higher, a material having a heat resistant temperature lower than the predetermined temperature cannot be used as the material for the medium. Therefore, there are only a limited number of options for the material.

The present invention provides a heating machine, a foaming machine for a foamable medium, and a manufacturing method for a foamed medium, which enable suitable heating of various media.

In the case of the conventional manufacturing method and apparatus for a foamed object as presented in Patent Literature 3, the workpiece is continuously conveyed at the same speed in both of a printing process and a foaming process in order to apply both the processes to the workpiece. For example, it is also conceivable that the printing process is performed by using a scanning printer instead of the line printer, or a medium cutting process is performed instead of the printing process, but, in such a processing process, the workpiece is conveyed intermittently. Thus, it is necessary to intermittently convey the workpiece similarly in the foaming process following these processes. However, if the foaming process is performed while the workpiece is being intermittently conveyed, there is a risk that defects such as uneven foaming may occur.

In view of the above, the present invention provides a manufacturing method for a foamed object, a manufacturing apparatus for a foamed object, and a foaming apparatus, which enable suitable conveyance of a foamable workpiece.

Solutions to Problems

The present inventor has made studies in view of the above problems and found that, when a specific combination of a resin constituting a foamable resin composition of a printing medium and a solvent of a foaming inhibition ink are used, the foaming inhibitor in the foaming inhibition ink permeates the foamable resin composition of the printing medium, and effectively deteriorates the heat decomposing ability, even if the foaming inhibition ink is inkjet-printed in a state where the foamable resin composition of the printing medium is not gelled. Based on this finding, the present inventors have further made studies and completed the present invention.

In order to solve the problems described above, a manufacturing method for a printed matter according to a first aspect of the present invention is a manufacturing method for a printed matter that is foamable and foams to form an irregular pattern on a surface of the printed matter, including:

a printing step of inkjet-printing a foaming inhibition ink on a printing medium having a layer of a foamable resin composition containing a chemical foaming agent, under a temperature condition lower than a softening temperature of the foamable resin composition, in which the foaming inhibition ink containing: a foaming inhibitor that deteriorates a heat decomposing ability of the foamable resin composition; and a solvent that dissolves the foaming inhibitor when the foaming inhibitor is solid, is compatible with the foaming inhibitor when the foaming inhibitor is liquid, and is able to move the foaming inhibitor into the foamable resin composition.

According to the manufacturing method for the printed matter having the above configuration, a foam having an irregular pattern on its surface can be easily manufactured. This method is also suitable for small lot production.

It is preferable that:
the foamable resin composition further contains a foaming aid of a metal-base that promotes a foaming reaction of the chemical foaming agent;
the foaming inhibitor be a chelating agent that chelates a metal of the foaming aid; and
the solvent be a non-aqueous solvent when a resin of the foamable resin composition is a vinyl chloride-based resin, and be an aqueous solvent when the resin of the foamable resin composition is a non-vinyl chloride-based thermoplastic resin.

By virtue of this configuration, the foaming inhibitor easily permeates the layer of the foamable resin composition of the vinyl chloride-based resin through the use of the non-aqueous solvent, and the foaming inhibitor closely adheres to the layer of the foamable resin composition of the non-vinyl chloride-based thermoplastic resin through the use of the aqueous solvent so that the foaming inhibitor easily permeates the layer due to the permeating property of the foaming inhibitor itself, which is preferable.

It is preferable that:
the printing step further include inkjet-printing a coloring ink containing a colorant;
the coloring ink be a non-aqueous ink when the resin of the foamable resin composition is a vinyl chloride-based resin; and
the coloring ink be a latex ink when the resin of the foamable resin composition is a non-vinyl chloride-based thermoplastic resin.

This configuration makes it possible to easily produce a foam having an irregular pattern and a color pattern on its surface and having no shift between these patterns, in a small lot without clogging of an ink head due to agglomeration of ink or the like.

In order to solve the problems described above, a manufacturing method for a foam according to a second aspect of the present invention is a manufacturing method for a foam having an irregular pattern on a surface of the foam, including:
a heating step of heating the printed matter at a temperature at which a difference occurs between heat decomposition of a region where the foaming inhibition ink is printed and heat decomposition of a region where the foaming inhibition ink is not printed, of the layer of the foamable resin composition to foam at least a part of the chemical foaming agent to make the region where the foaming inhibition ink is printed into a recess.

According to the manufacturing method for the foam having the above configuration, a foam having an irregular pattern on its surface can be easily manufactured. This method is also suitable for small lot production.

In order to solve the problems described above, a foaming inhibition ink according to a third aspect of the present invention is a foaming inhibition ink for inkjet printing on a printing medium having a layer of a foamable resin composition containing a chemical foaming agent,
the foaming inhibition ink containing: a foaming inhibitor that deteriorates a heat decomposing ability of the foamable resin composition; and a solvent that dissolves the foaming inhibitor when the foaming inhibitor is solid, is compatible with the foaming inhibitor when the foaming inhibitor is liquid, and is able to move the foaming inhibitor into the foamable resin composition,
wherein
the foaming inhibitor is a benzotriazole-based compound;
the solvent is a non-aqueous solvent when a resin of the foamable resin composition is a vinyl chloride-based resin; and
the solvent is an aqueous solvent when the resin of the foamable resin composition is a non-vinyl chloride-based thermoplastic resin.

According to the foaming inhibition ink having the above structure, the foaming inhibitor inhibits the foamability of the chemical foaming agent in the foamable resin composition of the printing medium, and a foam having an irregular pattern on its surface can be easily manufactured. In addition, it is possible to prevent corrosion of members of an inkjet printer.

(1) In order to achieve the above object, a forming method for the three-dimensional formed object according to the first aspect of the present invention includes:
an applying step (for example, step S2 in FIG. 5) of applying an ink (for example, foaming inhibition ink for forming a foaming inhibition layer 13) to a medium in sheet shape (for example, print media 10 and 50), wherein the medium has a foaming layer (for example, foaming layers 12 and 54) that foams by being heated, and the ink is for controlling a foaming of the foaming layer;
a cutting step (for example, step S3 in FIG. 5) of performing a cutting that forms a perforation (for example, perforations 23 and 24) or a notch (for example, notches 63 and 64) in the medium; and
a foaming step (for example, step S4 in FIG. 5) of foaming the foaming layer by heating the medium after the applying step and the cutting step.

According to such a configuration, the cutting to form a perforation or notch is performed before foaming, and thus the cutting can be accurately and easily performed without being interfered by the protrusion formed by foaming. The order of the applying step and the cutting step in the forming method is arbitrary, and a forming method in which the applying step is performed first and a forming method in which the cutting step is performed first are also encompassed in the forming method for the three-dimensional formed object.

(2) The forming method for the three-dimensional formed object as set forth in (1) may further include a printing step (for example, step S2 in FIG. 5) of printing an image on the medium.

According to such a configuration, it is possible to form a three-dimensional formed object to which an image is added.

(3) In the forming method for the three-dimensional formed object as set forth in (2), in the printing step, a plurality of images arranged in a width direction of the medium may be printed on the medium (for example, a plurality of image layers 14 arranged in the width direction are printed as shown in (a) of FIG. 7); and in the cutting step, the perforation or the notch extending along a length direction of the medium may be formed between the plurality of images (for example, the perforation 23 or notch 63 is formed).

According to such a configuration, it is possible to form a perforation or notch having a suitable shape. For example, when a perforation is formed, a part of the three-dimensional formed object can be subsequently separated from other portions along the perforation. At this time, it is possible to make the width of the part narrower than the width of the medium and to cut off the part of the three-dimensional formed object with a desired size.

(4) In the forming method for the three-dimensional formed object as set forth in any one of (1) to (3), the applying step and the cutting step may be performed by using an identical apparatus (for example, an inkjet printer having a function capable of forming the perforation or notch).

According to such a configuration, it is possible to easily form the perforation or notch. The applying step and the cutting step may be performed by using different apparatuses (a printing apparatus such as an inkjet printer for the applying step and a cutting apparatus such as a cutting plotter for the cutting step).

(5) In the forming method for the three-dimensional formed object as set forth in any one of (1) to (4), in the cutting step, the medium may be cut to form the perforation.

According to such a configuration, it is possible to separate a part of the three-dimensional formed object from other portions along the perforation.

(6) In the forming method for the three-dimensional formed object as set forth in (5), in the cutting step, the perforation may be formed in which a ratio of a length of an uncut portion to a length of a cut portion (for example, L1:L2 or L3:L4 for L1 to L4 in FIG. 9) ranges from 1:1 to 1:5.

According to such a configuration, it is possible to easily separate a part of the three-dimensional formed object from other portions along the perforation.

(7) In order to achieve the above object, a forming system for a three-dimensional formed object (for example, forming system 100) according to the second aspect of the present invention includes:

an applying device (for example, a printing function of an inkjet printer 101) that applies an ink (for example, a foaming inhibition ink for forming the foaming inhibition layer 13) to a medium in sheet shape (for example, print media 10 and 50), wherein the medium has a foaming layer (for example, the foaming layers 12 and 54) that foams by being heated, and the ink is for controlling a foaming of the foaming layer;

a cutting device (for example, a cutting function of the inkjet printer 101 or a cutting apparatus such as a cutting plotter) that performs a cutting which forms a perforation (for example, the perforations 23 and 24) or a notch (for example, the notches 63 and 64) in the medium; and a foaming device (for example, a heater 121) that foams the foaming layer by heating the medium to which the ink is applied and the cutting is performed.

According to such a configuration, the cutting to form a perforation or notch is performed before foaming, and thus the cutting can be accurately and easily performed without being interfered by the protrusion formed by foaming.

A heating machine according to the first aspect of the present invention includes:

a heating apparatus that heats one surface of the medium being conveyed in a predetermined conveyance direction, in a non-contact manner, from the one surface side; and a cooling apparatus that cools the other surface of the medium from the other surface side so that a temperature of the other surface of the medium does not exceed a predetermined temperature due to heating of the one surface of the medium by the heating apparatus.

According to the above-described configuration, various media can be suitably heated.

The heating apparatus is preferably a radiant type heating apparatus.

According to the above-described configuration, various media can be suitably heated.

The cooling apparatus is preferably a cooling roll or a cooling fan.

According to the above-described configuration, various media can be suitably heated.

A foaming machine for a foamable medium according to the second aspect of the present invention includes:

the heating machine according to the first aspect of the present invention, and the medium is a foamable medium including: a foaming layer that foams by heating; a pressure-sensitive adhesive layer having pressure-sensitive adhesiveness; and a mold release material that is attached to the pressure-sensitive adhesive layer on a side opposite to the foaming layer across the pressure-sensitive adhesive layer, and can be peeled from the pressure-sensitive adhesive layer;

the heating apparatus heats the foamable medium from the foaming layer side;

the cooling apparatus cools the foamable medium from the mold release material side; and the heating by the heating apparatus and the cooling by the cooling apparatus form, in the foamable medium, a temperature gradient in which the temperature of the foaming layer is not lower than a foaming temperature, and the pressure-sensitive adhesive layer or the mold release material has a temperature lower than the foaming temperature of the foaming layer, at which the functionality of the pressure-sensitive adhesive layer or the mold release material is not lost or deteriorated.

According to the above-described configuration, various foamable media can be suitably heated. In particular, the foaming layer can be foamed while maintaining the functionality of the pressure-sensitive adhesive layer or the mold release material.

A manufacturing method for a foamed medium according to the third aspect of the present invention includes:

a step of preparing a foamable medium including: a foaming layer that foams by heating; a pressure-sensitive adhesive layer having pressure-sensitive adhesiveness; and a mold release material that is attached to the pressure-sensitive adhesive layer on a side opposite to the foaming layer across the pressure-sensitive adhesive layer, and can be peeled from the pressure-sensitive adhesive layer; and a foaming step of heating the foamable medium from the foaming layer side and cooling the foamable medium from the mold release material side to form a temperature gradient in which the temperature of the foaming layer is not lower than a foaming temperature, and the pressure-sensitive adhesive layer or the mold release material has a temperature lower than the foaming temperature of the foaming layer, at which the functionality of the pressure-sensitive adhesive layer or the mold release material is not lost or deteriorated, and foaming the foaming layer while maintaining the functionality of the pressure-sensitive adhesive layer or the mold release material.

According to the above-described configuration, various foamable media can be suitably heated. In particular, the foaming layer can be foamed while maintaining the functionality of the pressure-sensitive adhesive layer or the mold release material.

A manufacturing method for a foamed object according to the first aspect of the present invention is a manufacturing method for a foamed object in which a sheet-shaped workpiece that foams by heating and is continuous over a conveyor path is processed and foamed in a step of conveying the workpiece along the conveyor path, the method including:

a processing step of processing the workpiece while intermittently conveying the workpiece;

a conveying step of conveying the workpiece processed in the processing step in a slackened state; and a foaming step of foaming the workpiece by heating it in a heating region while continuously conveying the workpiece conveyed in the conveying step.

According to the above configuration, the workpiece can be suitably conveyed in manufacturing the foamed object. In particular, the printing speed can be optimized with respect to the resolution of the image to be printed on the workpiece.

It is preferable that:

when the processing step, the conveying step, and the foaming step are performed over a predetermined time from a state where the workpiece is slackened by a first length in the conveying step, the workpiece is conveyed by a second length over the predetermined time in the processing step, and the workpiece is conveyed by a third length over the predetermined time in the foaming step, the third length be less than or equal to the sum of the first length and the second length.

According to the above configuration, the workpiece can be suitably conveyed in manufacturing the foamed object. In particular, the printing speed can be optimized with respect to the resolution of the image to be printed on the workpiece.

It is preferable that:

a foaming condition changing step of changing a conveyance speed of the workpiece in the foaming step and changing a length of the heating region along the conveyor path for the workpiece according to the changed conveyance speed be further provided.

According to the above configuration, the workpiece can be suitably conveyed in manufacturing the foamed object. In particular, the printing speed can be optimized with respect to the resolution of the image to be printed on the workpiece.

A manufacturing apparatus for a foamed object according to the second aspect of the present invention includes:

a conveying apparatus for conveying, along a conveyor path, a sheet-shaped workpiece that foams by heating and is continuous over the conveyor path;

a processing apparatus for processing the workpiece in a processing region provided in the middle of the conveyor path; and a foaming apparatus for foaming the workpiece by heating the workpiece processed by the processing apparatus, in a heating region provided in the middle of the conveyor path and downstream of the processing region.

The conveying apparatus:

intermittently conveys the workpiece in the processing region;

continuously conveys the workpiece in the heating region; and slackens the workpiece between the processing apparatus and the foaming apparatus.

According to the above configuration, the workpiece can be suitably conveyed in manufacturing the foamed object. In particular, the printing speed can be optimized with respect to the resolution of the image to be printed on the workpiece.

It is preferable that:

the conveying apparatus be configured so that it can change the conveyance speed of the workpiece in the heating region, and the foaming apparatus be configured so that it can change the length of the heating region according to the conveyance speed.

According to the above configuration, the workpiece can be suitably conveyed in manufacturing the foamed object. In particular, the printing speed can be optimized with respect to the resolution of the image to be printed on the workpiece.

A foaming apparatus according to the third aspect of the present invention is a foaming apparatus for heating, in a heating region, a sheet-shaped workpiece that is continuously conveyed and foams by heating to foam the workpiece, the apparatus including:

a heating device that performs heating in the heating region; and a changing device that changes the length of the heating region according to the conveyance speed of the workpiece in the heating region.

According to the above configuration, the workpiece can be suitably conveyed in manufacturing the foamed object. In particular, the printing speed can be optimized with respect to the resolution of the image to be printed on the workpiece.

It is preferable that:

the heating device include a plurality of heating apparatuses arranged side by side along the conveyor path for the workpiece; and the changing device change the length of the heating region by changing the number of the heating apparatuses to be operated.

According to the above configuration, the workpiece can be suitably conveyed in manufacturing the foamed object. In particular, the length of the heating region can be easily changed.

Effect of the Invention

According to the present invention, there can be provided a manufacturing method for a foamable printed matter, which is simple and suitable for small lot production of a foam having an irregular pattern on its surface, as well as a manufacturing method for a foam and a foaming inhibition ink, which are suitable therefor.

According to the present invention, various media can be suitably heated.

According to the above configurations, the foamable workpiece can be suitably conveyed when a foamed object is manufactured.

BRIEF DESCRIPTION OF THE DRAWINGS

In FIG. 7, (a) is a perspective view of the print medium after formation of an image layer and the like. In FIG. 7, (b) is a cross-sectional view taken along the line A-A in (a) of FIG. 7.

In FIG. 8, (b) is a cross-sectional view taken along the line A-A in (a) of FIG. 8, which shows a cutter for forming the perforations.

In FIG. 15, (b) is a sectional view taken along the line B-B in (a) of FIG. 15, which shows a cutter for forming a notch.

DESCRIPTION OF EMBODIMENTS

Figure 1:
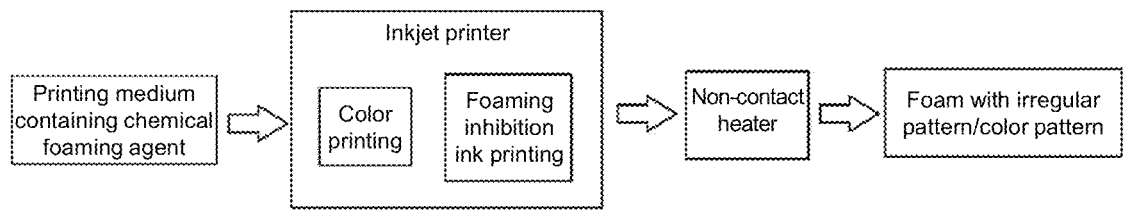
FIG. 1 is a flow diagram of a manufacturing method for a foam according to an embodiment of the present invention.

FIG. 1 shows a flow diagram of a manufacturing method for a foam according to an embodiment of the present invention. FIG. 1 is a flow diagram in which, as an embodiment of the present invention, a printed matter is manufactured by inkjet-printing (printing step) a foaming inhibition ink and, according to need, a coloring ink on a printing medium by an inkjet printer, and the printed matter is heated (heating step) to manufacture a foam having an irregular pattern. Hereinafter, the present invention will be described in detail, starting from a manufacturing method for a printed matter.

The manufacturing method for the printed matter of the present invention is a manufacturing method for a foamable printed matter having an irregular pattern on its surface, the method including a printing step of inkjet-printing a foaming inhibition ink on a printing medium having a layer of a foamable resin composition containing a chemical foaming agent under a temperature condition lower than a softening temperature of the foamable resin composition. Further, in the printing step described above, a coloring ink can be further inkjet-printed on the printing medium.

The foam having an irregular pattern on its surface includes non-flat foams such as those having only recesses, those having only protrusions, and those having recesses and protrusions in a stepped shape, in addition to those having recesses and protrusions on their surfaces.

(Printing Medium)

The printing medium used in the present invention includes a layer of a foamable resin composition. This foamable resin composition contains a chemical foaming agent.

(Chemical Foaming Agent)

The chemical foaming agent used in the present invention is not particularly limited as long as it is a substance that chemically generates gas and decomposes at a predetermined temperature, and specific examples thereof include azo compounds such as azodicarbonamide (ADCA), 4,4'-oxybis(benzenesulfonylhydrazide), 1,1'-azobis(1-acetoxy-1-phenylethane), dimethyl-2,2'-azobisisobutyrate, dimethyl-2,2'-azobisisobutyrate, 2,2'-azobis(2,4,4-trimethylpentane), 1,1'-azobis(cyclohexane-1-carbonitrile), 2,2'-azobis[N-(2-carboxyethyl)-2-methyl-propionamidine]; nitroso compounds such as N,N'-dinitrosopentamethylenetetramine (DPT); hydrazine derivatives such as 4,4'-oxybis(benzenesulfonyl hydrazide), diphenylsulfone-3,3'-disulfonylhydrazide; semicarbazide compounds such as p-toluenesulfonyl semicarbazide; organic pyrolytic foaming agents such as trihydradinotriazine; bicarbonates such as sodium hydrogen carbonate and ammonium hydrogen carbonate, carbonates such as sodium carbonate and ammonium carbonate; and inorganic pyrolytic foaming agents such as nitrites such as ammonium nitrite and hydrogen compounds.

For example, azodicarbonamide decomposes at about 230° C. to generate nitrogen gas, carbon monoxide gas, carbon dioxide gas and the like.

The chemical foaming agent is preferably an organic pyrolytic foaming agent, more preferably an azo compound, especially preferably azodicarbonamide, N,N'-dinitrosopentamethylenetetramine, or 4,4'-oxybis(benzenesulfonylhydrazide). These chemical foaming agents may be used alone, or two or more kinds thereof may be used.

(Foaming Aid)

The foamable resin composition according to the present invention preferably further contains a foaming aid. The foaming aid is not particularly limited as long as it promotes the foaming reaction of the chemical foaming agent. More specifically, it is preferably a catalyst that lowers the decomposition temperature of the chemical foaming agent, and more preferably a metal-based foaming aid containing a metal. When the foaming aid is a metal-based foaming aid, the foamability of the chemical foaming agent can be easily adjusted by using a chelating agent which will be described later.

Examples of the foaming aid include organometallic compounds or inorganometallic compounds of zinc compounds, barium compounds and the like, organic acids, urea, and derivatives thereof. Of these, organometallic compounds or inorganometallic compounds are preferable, and zinc compounds and barium compounds are preferable.

Specific examples of organometallic compounds or inorganometallic compounds of zinc compounds include zinc oxide (ZnO) and zinc stearate. Specific examples of organic acids include boric acid, oxalic acid, succinic acid, and adipic acid.

For example, when azodicarbonamide (ADCA) is used as the chemical foaming agent and zinc oxide is used as the foaming aid, the decomposition temperature of the chemical foaming agent lowers from about 240° C. to about 150° C.

These foaming aids may be used alone, or two or more kinds thereof may be used. For example, zinc stearate and zinc oxide can be used in combination.

When the foaming aid of the printing medium is a metal compound such as an organometallic compound or inorganometallic compound, a foaming inhibitor which will be described later can invalidate the effect of the foaming aid by chelating the foaming aid, inhibit foaming of only a specific region of the printing medium, and form recesses relatively.

(Resin)

The foamable resin composition according to the present invention is a resin composition containing at least the chemical foaming agent described above. The resin constituting the resin composition is preferably a thermoplastic resin. Examples of thermoplastic resins include vinyl chloride-based resins and non-vinyl chloride-based thermoplastic resins.

Examples of vinyl chloride-based resins include a polymer obtained by homopolymerizing a vinyl chloride monomer, a polymer obtained by copolymerizing a vinyl chloride monomer and another monomer, and modified products thereof. The vinyl chloride-based resin is preferably a softened vinyl chloride-based resin containing a plasticizer.

The non-vinyl chloride-based thermoplastic resins are thermoplastic resins except the vinyl chloride-based resins. Specific examples of non-vinyl chloride-based thermoplastic resins include thermoplastic resins of polymers that do not contain vinyl chloride as a monomer, such as polyolefins such as polyethylene and polypropylene, ethylene-vinyl acetate copolymers, polyvinyl acetate, and acrylic resins.

The foamable resin composition may contain other additives as long as the object of the present invention is not impaired. Examples of other additives include fillers, flame retardants, plasticizers, heat resistant stabilizers, weather-resistant stabilizers, pigments, and dyes.

Examples of fillers include calcium carbonate, talc, and mica.

Examples of flame retardants include sodium hydroxide, magnesium hydroxide, phosphorus-based flame retardants, and halogen-based flame retardants.

Examples of plasticizers include phthalates such as dioctyl phthalate, diisononyl phthalate, diisodecyl phthalate, and dibutyl phthalate; adipates such as dioctyl adipate and diisononyl adipate; trimellitates such as trioctyl trimellitate; and phthalates such as isononyl phthalate.

(Base Material)

The printing medium used in the present invention preferably includes a base material in addition to the layer of the foamable resin composition. When the printing medium includes a base material, the layer of the foamable resin composition can be directly or indirectly stacked on a surface of the base material to increase the strength of the printing medium. Further, in the case where the layer of the foamable resin composition is provided with the base material, when the layer of the foamable resin composition is heated and foamed, the base material holds the melted and softened layer of the foamable resin composition. Also, the layer of the resin composition foams and expands in volume, in a direction opposite to the surface in contact with the base material, and thus the height difference between the recesses and the protrusions in the irregularities can be increased.

Examples of the base material include a backing paper and a nonwoven fabric.

The printing medium according to the present invention can be manufactured by a known method, such as the methods described in Patent Literatures 1 to 3, involving coating a base material with a foamable resin composition so as to attain a film thickness of about 0.15 mm.

(Foaming Inhibition Ink)

The foaming inhibition ink used in the present invention contains: a foaming inhibitor that deteriorates the heat decomposing ability of the foamable resin composition described above; and a solvent that dissolves the foaming inhibitor when the foaming inhibitor is solid, is compatible with the foaming inhibitor when the foaming inhibitor is liquid, and is able to move the foaming inhibitor into the foamable resin composition.

(Foaming Inhibitor)

The foaming inhibitor contained in the foaming inhibition ink used in the present invention is not particularly limited as long as it deteriorates the heat decomposing ability of the foamable resin composition described above. For example, when the foamable resin composition contains a chemical foaming agent and a foaming aid, and the foaming aid is composed of a metal catalyst, the foaming inhibitor is preferably one capable of chelating (coordinating) the catalyst metal and deteriorating the catalytic function. Examples of such a foaming inhibitor include chelating agents.

The chelating agent is not particularly limited as long as it can chelate (coordinate) the catalyst metal. Chelating agents include oxycarboxylic acids such as glycolic acid, lactic acid, malic acid, tartaric acid and citric acid, and salts thereof; aminocarboxylic acids such as ethylenediaminetetraacetic acid (EDTA), nitrilotriacetic acid (NTA), diethylenetriaminepentaacetic acid (DTPA), hydroxyethylethylenediaminetriacetic acid (HEDTA), glycol etherdiaminetetraacetic acid (GEDTA), triethylenetetraminehexacetic acid (TTHA), hydroxyethyl iminodiacetic acid (HIDA) and dihydroxyethylglycine (DHEG), and salts thereof; phosphonic acids such as 2-aminoethylphosphonic acid, 1-hydroxyethylidene-1,1-diphosphonic acid, aminotri (methylenephosphonic acid), ethylenediaminetetrakis (methylenephosphonic acid), diethylenetriaminepenta (methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid and α-methylphosphonosuccinic acid, and salts thereof; and triazole-based compounds such as 5-methyl-1H-benzotriazole (also known as tortriazol) and benzotriazole, and salts thereof. Of these, a chelating agent that does not corrode members of a printing apparatus, such as an inkjet head, and does not dissolve a water-repellent layer thereof is preferable. Examples of such a chelating agent include triazole-based compounds.

The triazole-based compound is not particularly limited as long as it has a triazole skeleton represented by the following chemical formula (1) or (2).

[Chemical Formula 1]

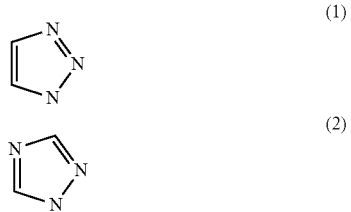

Among the triazole-based compounds, benzotriazole-based compounds are preferable. The benzotriazole-based compound is not particularly limited as long as it has a benzotriazole skeleton represented by the following chemical formula (3) or (4).

[Chemical Formula 2]

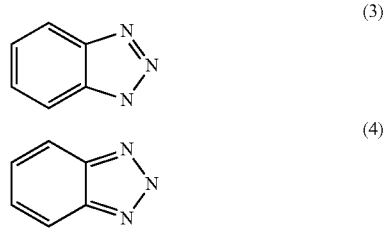

Preferable benzotriazole-based compounds are 1,2,3-benzotriazole, 1-[N,N-bis(2-ethylhexyl)aminomethyl]benzotriazole, 1-[N,N-bis(2-ethylhexyl)aminomethyl]methylbenzotriazole, and 2,2'-[[(methyl-1H-benzotriazol-1-yl)methyl]imino]bisethanol, in terms of the property of permeating the layer of the foamable resin composition of the printing medium.

Further, the benzotriazole-based compound preferably has a decomposition temperature and a boiling point higher than a heating temperature which will be described later, from the viewpoint that it is possible to prevent the compound from decomposing during a heating step which will be described later and from diffusing in an area other than a printing unit due to sublimation.

As these benzotriazole-based compounds, commercially available compounds can be used. For example, BT-120 available from Johoku Chemical Industry Co., Ltd. can be used as 1,2,3-benzotriazole; BT-LX (trade name) available from Johoku Chemical Industry Co., Ltd. can be used as 1-[N,N-bis(2-ethylhexyl)aminomethyl]benzotriazole; TT-LX (trade name) available from Johoku Chemical Industry Co., Ltd. can be used as 1-[N,N-bis(2-ethylhexyl)aminomethyl]methylbenzotriazole; and TT-LYK (trade name) available from Johoku Chemical Industry Co., Ltd. can be used as 2,2'-[[(methyl-1H-benzotriazol-1-yl)methyl]imino]bisethanol.

When the foaming inhibitor is solid at an ordinary temperature, the foaming inhibition ink becomes solid when dried on the printing medium after printing, so that bleeding of a coloring ink which will be described later can be prevented. On the other hand, when the foaming inhibitor is liquid at an ordinary temperature, excellent maintenance is obtained since the inkjet head is not clogged. The foaming inhibitors may be used alone, or two or more kinds thereof may be used.

(Solvent)

The foaming inhibition ink used in the present invention contains a solvent. The solvent is not particularly limited as long as it is a liquid compound at an ordinary temperature (15° C. to 25° C.), dissolves the foaming inhibitor when the foaming inhibitor is solid, is compatible with the foaming inhibitor when the foaming inhibitor is liquid, and is able to move the foaming inhibitor into the foamable resin composition. Preferable solvents are those other than high boiling point compounds used as the plasticizer of the foamable resin composition, from the viewpoints of a high speed of permeation of the foaming inhibitor into the foamable resin composition and the ability to prevent changes in physical properties such as the plasticity of the printing medium.

In the foaming inhibition ink, it is preferable to use a solvent corresponding to the resin of the foamable resin composition of the printing medium. Specifically, it is preferable to use a non-aqueous solvent as the solvent for the foaming inhibition ink when the resin of the foamable resin composition is a vinyl chloride-based resin, and to use an aqueous solvent as the solvent for the foaming inhibition ink when the resin of the foamable resin composition is a non-vinyl chloride-based thermoplastic resin.

The non-aqueous solvent is a solvent insoluble in water, and examples thereof include volatile organic compounds (VOCs). A preferable compound has a boiling point lower than the heating temperature in the heating step, for example, a boiling point of lower than 200° C. Examples of the non-aqueous solvent include a lactone-based solvent and a glycol ether solvent. The lactone-based solvent is preferable as having high vinyl chloride-based resin dissolution. These non-aqueous solvents dissolve the vinyl chloride-based resin, and thus allow the foaming inhibitor in the foaming inhibition ink to be dissolved or dispersed in the ink, and, on the printing medium, allow the foaming inhibitor to permeate the foamable resin composition and change the foamability of the layer of the foamable resin composition.

Examples of the lactone-based solvent include γ-butyrolactone and ε-caprolactone, and ε-caprolactone is preferable because the viscosity of the obtained ink can be adjusted to a viscosity suitable for inkjet printing.

Examples of the glycol ether solvent include ethylene glycol, diethylene glycol, diethylene glycol ethyl methyl ether, propylene glycol monomethyl ether, propylene glycol monomethyl ether acetate, propylene glycol monobutyl ether and dipropylene glycol butyl ether. Diethylene glycol ethyl methyl ether is preferable in terms of the dryness of the foaming inhibition ink after inkjet printing.

As the non-aqueous solvent, one kind may be used alone, or two or more kinds may be used. However, it is preferable to use a mixture of a lactone-based solvent and one or two or more of the glycol ether solvents.

The non-aqueous solvent has a higher ability to allow the foaming inhibitor to permeate the vinyl chloride-based resin than the plasticizer, and thus the foaming inhibitor can permeate a bottom of the layer of the vinyl chloride-based resin layer in a short time. Further, the non-aqueous solvent dissolves the vinyl chloride-based resin, but, after drying of the non-aqueous solvent, the vinyl chloride-based resin layer returns to a solid, so that the function of the foamable resin composition is not deteriorated.

When a non-aqueous solvent is used as the solvent for the foaming inhibition ink, it is preferable to use a foaming inhibitor having high solubility in a non-polar solvent. Examples of the foaming inhibitor having high solubility in a non-polar solvent include 2,2'-[[(methyl-1H-benzotriazol-1-yl)methyl]imino]bisethanol.

When a non-aqueous solvent is used as the solvent for the foaming inhibition ink, a proportion of the foaming inhibitor in the foaming inhibition ink is preferably 1 to 80% by weight, more preferably 5 to 20% by weight. A proportion of the non-aqueous solvent in the foaming inhibition ink is preferably 20 to 99% by weight, more preferably 80 to 95% by weight.

When a volatile organic compound is used as the non-aqueous solvent, it is preferable that the volatile organic compound be contained in a proportion of 50% by weight or more in the non-aqueous solvent. A content rate of the volatile organic compound in the foaming inhibition ink is 1% by weight or more, preferably 10% by weight or more, more preferably 20% by weight or more, particularly preferably 80% by weight or more.

Examples of the aqueous solvent include water and solvents soluble in water such as alcohols. Examples of alcohols include moisturizers including diols such as propylene glycol, diethylene glycol, 1,2-butanediol and 1,4-butanediol; and triols such as glycerin and 1,2,4-butanediol. These water and alcohols may be used alone, or two or more kinds thereof may be used. When an aqueous solvent is used, the foaming inhibition ink does not dissolve or permeate the layer of the foamable resin composition of the printing medium, but, when a moisturizer is used in combination, the foaming inhibitor can be fixed to the layer of the foamable resin composition. Thus, the use of a moisturizer in combination is preferable. Propylene glycol is preferable as the moisturizer alcohol.

When an aqueous solvent is used as the solvent for the foaming inhibition ink, it is preferable to use a foaming inhibitor having high solubility in a polar solvent. Examples of the foaming inhibitor having high solubility in a polar solvent include 1,2,3-benzotriazole and 1-[N,N-bis(2-ethylhexyl)aminomethyl]benzotriazole, and 1-[N,N-bis(2-ethylhexyl)aminomethyl]benzotriazole is preferable. When an aqueous solvent is used as the solvent for the foaming inhibition ink, the foaming inhibition ink does not dissolve or permeate the layer of the foamable resin composition of the printing medium. Therefore, it is preferable that the foaming inhibitor itself can be diffused into the layer of the foamable resin composition. Examples of such a foaming inhibitor include 1,2,3-benzotriazole and 1-[N,N-bis(2-ethylhexyl)aminomethyl]benzotriazole.

When an aqueous solvent is used as the solvent for the foaming inhibition ink, the proportion of the foaming inhibitor in the foaming inhibition ink is preferably 1 to 40% by weight, more preferably 5 to 20% by weight. A proportion of the aqueous solvent in the foaming inhibition ink is preferably 5 to 50% by weight, more preferably 10 to 30% by weight.

A viscosity of the foaming inhibition ink is not particularly limited, but is preferably about 3 to 18 mPa·s, which is suitable for inkjet printing. The viscosity can be adjusted by changing the solvent composition and the proportions.

(Other Components)

The foaming inhibition ink according to the present invention may further contain other components as long as the effects of the present invention are not impaired. Examples of other components include colorants and surface conditioners.

The foaming inhibition ink is made colorless and transparent, and thus can prevent the color pattern of the foam from being affected even if the amount of the ink used is increased or decreased. However, the recesses can be emphasized by blending a colorant, for example, using a black colorant.

Examples of surface conditioners include acetylene-based surface conditioners and silicon-based surface conditioners. When a surface conditioner is used, a content of the surface conditioner in the foaming inhibition ink is preferably 0.1 to 1% by weight. Examples of acetylene-based surface conditioners include polyhydric alcohol compounds having an acetylene bond, and examples thereof include FURFYNOL 104 and FURFYNOL 400 manufactured by Air Products and Chemicals, Inc. Examples of silicon-based surface conditioners include SILFACE manufactured by Nissin Chemical Co., Ltd. When the foaming inhibition ink contains an acetylene-based surface conditioner, the surface tension of the foaming inhibition ink is reduced, thereby making it possible to prevent repelling on the front surface of the printing medium.

(Coloring Ink)

In the manufacturing method for the printed matter according to the present invention, a coloring ink containing a colorant can be further inkjet-printed on the printing medium in the printing step described above. As a result, it is possible to impart a color pattern to the foam in addition to the irregular pattern.

An ink set used as the coloring ink is not particularly limited as long as it can express the color pattern, and examples thereof include an ink set having four colors of C (cyan), M (magenta), Y (yellow), and K (black). In addition to the ink set, Lc (light cyan), Lm (light magenta), Lk (light black), Or (orange), W (white), and Si (silver) can be used to improve the design of the obtained foam.

The mode of the coloring ink is not limited, and examples thereof include solvent inks, latex inks, aqueous pigment inks, UV-curable inks, aqueous sublimation inks, acid dye inks, reactive dye inks, printing pigment inks, and disperse dye inks.

When a non-aqueous solvent is used as the foaming inhibition ink, it is preferable to use a non-aqueous solvent also as the coloring ink. A non-aqueous pigment ink is more preferable, and a solvent ink is particularly preferable. This makes it possible to prevent the agglomeration of the contents due to liquid mixing.

Examples of the solvent ink include C (cyan), M (magenta), Y (yellow), K (black), and Lc (light cyan), Lm (light magenta), Lk (light black), Or (orange), W (white), and Si (silver) of Solvent Ink SS21 (colorant: pigment, solvent: organic solvent) manufactured by Mimaki Engineering Co., Ltd., and C (cyan), M (magenta), Y (yellow), BK (black), LC (light cyan), and LM (light magenta) of Solvent Ink BS4 (colorant: pigment, solvent: organic solvent) manufactured by Mimaki Engineering Co., Ltd.

When an aqueous solvent is used as the foaming inhibition ink, it is preferable to use an aqueous solvent also as the coloring ink. A latex ink and an aqueous pigment ink are more preferable, and a latex ink is particularly preferable. This makes it possible to prevent the agglomeration of the contents due to liquid mixing.

Examples of the latex ink include C (cyan), M (magenta), Y (yellow), K (black), Or (orange), G (green), and W (white) of Latex Ink LX101 (colorant: pigment, solvent: aqueous, fixing temperature: about 60° C.) manufactured by Mimaki Engineering Co., Ltd.

(Printing Apparatus)

The manufacturing method for the printed matter according to the present invention can be carried out, for example, using a printing apparatus including: a supplying device that supplies a printing medium including a layer of a foamable resin composition containing a chemical foaming agent; a foaming inhibition ink applying device that ejects a foaming inhibition ink containing a foaming inhibitor onto the printing medium by an inkjet method; and a coloring ink applying device that ejects a coloring ink containing a colorant onto the printing medium by an inkjet method, according to need.

Figure 2:
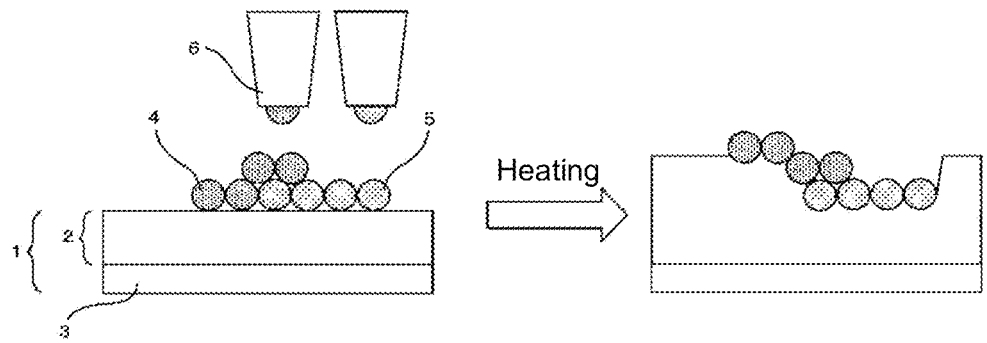
FIG. 2 is a conceptual diagram of a printing step and a foaming step according to an embodiment of the present invention.

The printing apparatus can be implemented by using, for example, an improved version of a known inkjet printer. Specifically, one of the coloring inks for inkjet is replaced with the foaming inhibition ink; data on the recesses of the irregular pattern is prepared separately from data on the color pattern; and the irregular pattern and the color pattern are ejected onto the printing medium using a printer driver programmed so as to eject the coloring inks and the foaming inhibition ink from each ink head. FIG. 2 shows, on the left side, a state where printer nozzles 6 eject a coloring ink 4 and a foaming inhibition ink 5 onto a printing medium 1 in which a layer 2 of a foamable resin composition is stacked on a base material 3 by an inkjet method. The printing medium 1 includes the layer 2 of the foamable resin composition containing a chemical foaming agent, and thus is thick. However, it is about 0.2 to 0.3 mm thick before foaming, and thus a known inkjet printer can be used.

As the inkjet printer, for example, JV300, JV400Lx, or the like manufactured by Mimaki Engineering Co., Ltd. can be used.

(Manufacturing Method for Printed Matter)

The manufacturing method for the printed matter according to the present invention includes a printing step of inkjet-printing a foaming inhibition ink on a printing medium under a temperature condition lower than a softening temperature of a foamable resin composition. In this printing step, a coloring ink can be further inkjet-printed on the printing medium.

Specifically, in the printing step, the foaming inhibition ink and, according to need, the coloring ink are inkjet-printed on the printing medium under the temperature condition lower than the softening temperature of the foamable resin composition. The softening temperature of the foamable resin composition varies individually, but is usually lower than a temperature at which the foamable resin composition can be foamed, for example, about 150° C.

The amount of the foaming inhibition ink to be inkjet-printed can be appropriately selected, and the intensity of the irregular pattern can be adjusted by adjusting the amount of the ink. For example, the amount of the ink is reduced so that the foaming agent in the foaming inhibition ink does not diffuse into the bottom of the layer of the foamable resin composition, thereby making it possible to relax the inhibition of foaming in the region where the foaming inhibition ink is printed. Further, when the amount of the ink is increased, the foaming agent in the foaming inhibition ink is diffused radially not only in the bottom direction of the layer of the foamable resin composition but also in the surface direction thereof. As a result, foaming of a portion beyond the boundary between the region where the foaming inhibition ink is printed and the region where the foaming inhibition ink is not printed is also inhibited, and the cross section of the layer of the foamable resin composition can be inclined.

The ink temperature of the foaming inhibition ink to be inkjet-printed is not particularly limited, but the permeation of the ink into the medium can be promoted by setting the temperature of the ink head to about 60° C.

In the case where the solvent for the foaming inhibition ink is a non-aqueous solvent, when the foaming inhibition ink is printed on the printing medium, the non-aqueous solvent permeates the bottom of the layer of the foamable resin composition, at a high speed, together with the foaming inhibitor while dissolving the layer of the foamable resin composition of the printing medium, so that the foaming inhibitor inhibits the foamability of the foamable resin composition.

In the case where the solvent for the foaming inhibition ink is an aqueous solvent, when the foaming inhibition ink is printed on the printing medium, the aqueous solvent does not dissolve the layer of the foamable resin composition of the printing medium, but fixes the foaming inhibitor onto the front surface of the layer of the foamable resin composition. The foaming inhibitor diffuses into the layer of the foamable resin composition due to the permeating power of the foaming inhibitor itself when the solvent is dried or when the temperature is raised by heating for foaming as will be described later, so that the foamability of the foamable resin composition is inhibited.

As described above, in the manufacturing method for the printed matter according to the present invention, even when the foaming inhibition ink is inkjet-printed on the printing medium under the temperature condition lower than the softening temperature of the foamable resin composition, the foaming inhibitor can be moved to the layer of the foamable resin composition of the printing medium to inhibit the foamability of the foamable resin composition. Therefore, this method is easier than conventional methods.

When the coloring ink is inkjet-printed together with the foaming inhibition ink, the order of ejection of the inks is not particularly limited, but it is preferable to form a layer of the foaming inhibition ink in at least a part of the printing medium and then to stack a layer of the coloring ink, because of easy permeation of the foaming inhibitor in the foaming inhibition ink into the layer of the foamable resin composition containing the chemical foaming agent, and color development.

When the inkjet printing of the coloring ink is performed by dot printing, the design is less affected by elongation of the printed surface due to foaming in the heating step. When the dot diameter is reduced or the dot density is reduced in the inkjet printing, the influence on the design is reduced.

After ejection of the foaming inhibition ink and, according to need, the coloring ink onto the printing medium, it is preferable to perform heating for drying the solvent. The heating temperature is not particularly limited, but is preferably a temperature at which the main solvents of the coloring ink and the foaming inhibition ink are dried. Specifically, the drying temperature is about 60° C. When this heating is performed, the solvent is quickly dried, thereby making it possible to inhibit that bleeding and to assist the permeation of the foaming inhibitor itself into the layer of the foamable resin composition. It should be noted that heating at about 60° C. is easier than heating at about 150° C. for gelling the printing medium.

(Manufacture of Foam)

The manufacturing method for the foam according to the present invention include a heating step of heating the printed matter obtained by the manufacturing method for the printed matter at a temperature at which a difference occurs between heat decomposition of a region where the foaming inhibition ink is printed and heat decomposition of a region where the foaming inhibition ink is not printed, of the layer of the foamable resin composition to foam at least a part of the chemical foaming agent to make a region where the foaming inhibition ink is applied into a recess.

The heating step can be performed, for example, by using a heating apparatus provided with a heating device that heats and foams the printing medium applied with the foaming inhibition ink and the coloring ink.

In the heating step, the foaming inhibition ink and the coloring ink are applied to the printing medium, and then heating process is performed. The heating step is preferably performed immediately after the printing step.

The heating temperature is not particularly limited as long as it is a temperature at which a difference occurs between heat decomposition of the region, of the layer of the foamable resin composition, to which the foaming inhibition ink is applied and heat decomposition of the region to which the foaming inhibition ink is not applied, and is, for example, in the range of 190° C. to 240° C. When the heating temperature is in this range, fine bubbles are formed and the height difference of the irregular pattern of the foam becomes large, which is preferable. The heating time is not particularly limited, but is, for example, 4 minutes or more when the heating temperature is 190° C. and about 1 minute when the heating temperature is 230 to 240° C. The mode of the heating is preferably performed without any contact with the printed surface. FIG. 2 shows, on the right side, a state where the printing medium 1 on which the coloring ink 4 and the foaming inhibition ink 5 as described above are printed is heated, so that the region where the foaming inhibition ink is not printed foams and swells, and the region where the foaming inhibition ink is printed is recessed without foaming.

In the heating step, the working environment at the time of printing can be improved by discharging the plasticizer or the like volatilized from the printing medium by a discharging device. In particular, when the foaming inhibition ink or the coloring ink contains a VOC (Volatile Organic Compounds) component, the working environment at the time of printing can be further improved by discharging the VOC component by the discharging device.

In the manufacture of the foam according to the present invention, the foaming inhibition ink and the coloring ink are inkjet-printed, and thus it is possible to efficiently produce a small lot of embossed printed matters that cannot be realized due to a high cost of an embossing cylinder. Further, since the foaming inhibition ink and the coloring ink are inkjet-printed, small lot production of long embossed printed matters, which would require bonding of a plurality of printed matters if an embossing roll or a rotary screen is used, can be realized.

The foam having an irregular pattern and a color pattern on its surface according to the present invention can be further subjected to liquid lamination. Thus, the fastness of color such as abrasion resistance can be improved.

EXAMPLES

Hereinafter, the present invention will be described based on Examples, but is not limited to these Examples. The evaluation test on each foam was conducted by the following method.

(Embossing Effect)

The front surface of the foam was evaluated according to the following criteria.

TABLE 1

| | |
|---|---|
| ◉ | A line having a thickness of 3 pt or less could be expressed. |
| ○ | The foaming-inhibited portion was completely inhibited. |
| △ | The foaming-inhibited part foamed. |
| × | The region to which the foaming inhibition ink was applied also foamed similarly to the region to which the foaming inhibition ink was not applied. |

Example 1

As a printing medium, a sheet was prepared in which a base material (high quality paper, thickness: 0.1 mm) was coated with a foamable resin composition (chemical foaming agent: azodicarbonamide; foaming aids: zinc stearate and zinc oxide; filler: calcium carbonate; flame retardants: aluminum hydroxide and magnesium hydroxide; plasticizer: isononyl phthalate; and resin: vinyl chloride resin) with a thickness of 0.15 mm.

Non-aqueous solvents, diethylene glycol ethyl methyl ether and ε-caprolactone (weight ratio 5:3), were used as the solvents, and 1-[N,N-bis(2-ethylhexyl)aminomethyl]methylbenzotriazole was used as the foaming inhibitor. The foaming inhibitor was dissolved in the solvents in a proportion of 20% by weight to prepare a foaming inhibition ink E1. The foaming inhibition ink E1 was inkjet-printed on the printing medium described above by using an inkjet printer JV-300 manufactured by Mimaki Engineering Co., Ltd. in an atmosphere at 25° C. under the conditions of an ink head temperature of 60° C. and an amount of the ink used of 8.7 g/m$^2$ to produce a foamable printed matter E1. During printing, the solvent was dried by heating to 60° C. with a heater.

Using a non-contact heater, the foamable printed matter E1 was heated at 230° C. for 1 minute to be foamed, so that a foam E1 was obtained. The front surface of the foam E1 was glossy. In addition, recesses and protrusions were formed. The embossing effect of the foam E1 was evaluated. The evaluation results are indicated in Table 2.

Example 2

A foaming inhibition ink E2 was prepared in the same manner as in Example 1 except that a non-aqueous solvent, diethylene glycol ethyl methyl ether, was used as the solvent for the foaming inhibition ink. A foamable printed matter E2 was produced in the same manner as in Example 1 except that the foaming inhibition ink E2 was used and that the amount of the ink used was 2.0 g/m$^2$. Heating was performed in the same manner as in Example 1 to produce a foam E2. The embossing effect of the foam E2 was evaluated. The evaluation results are indicated in Table 2.

Example 3

A foamable printed matter E3 was produced in the same manner as in Example 1 except that the foaming inhibition ink E1 prepared in Example 1 was used and that the amount of the ink used was 2.3 g/m². Heating was performed in the same manner as in Example 1 to produce a foam E3. The front surface of the foam E3 was glossy. Recesses and protrusions were formed, and the height difference was the same as that of the foam E1, but the cross sections of the boundaries between the recesses and the protrusions were slightly gentle. The embossing effect of the foam E3 was evaluated. The evaluation results are indicated in Table 2.

Example 4

A foaming inhibition ink E4 was prepared in the same manner as in Example 1 except: that non-aqueous solvents, diethylene glycol ethyl methyl ether and ε-caprolactone (weight ratio 5:3), were used as the solvents for the foaming inhibition ink; that 2,2'-[[(methyl-1H-benzotriazol-1-yl)methyl]imino]bisethanol was used as the foaming inhibitor; and that the foaming inhibitor was dissolved in the solvents in a proportion of 20% by weight. A foamable printed matter E4 was produced in the same manner as in Example 1 except that the foaming inhibition ink E4 was used and that the amount of the ink used was 2.4 g/m². Heating was performed in the same manner as in Example 1 to produce a foam E4. The embossing effect of the foam E4 was evaluated. The evaluation results are indicated in Table 2.

Example 5

A foaming inhibition ink E5 was prepared in the same manner as in Example 1 except: that aqueous solvents, water and propylene glycol (weight ratio 1:1), were used as the solvents for the foaming inhibition ink; and that 2,2'-[[(methyl-1H-benzotriazol-1-yl)methyl]imino]bisethanol (20% by weight) was used as the foaming inhibitor. A foamable printed matter E5 was produced in the same manner as in Example 1 except that the foaming inhibition ink E5 was used and that the amount of the ink used was 2.4 g/m². Heating was performed in the same manner as in Example 1 to produce a foam E5. The front surface of the foam E5 was not glossy, and recesses and protrusions were formed thereon. The height difference of the irregularities was smaller than that of Example 1. The embossing effect of the foam E5 was evaluated. The evaluation results are indicated in Table 2.

Example 6

A foaming inhibition ink E6 was prepared in the same manner as in Example 1 except that 1,2,3-benzotriazole (melting point: 99° C., and boiling point: 350° C.) was used in a proportion of 20% by weight as the foaming inhibitor for the foaming inhibition ink. A foamable printed matter E6 was produced in the same manner as in Example 1 except that the foaming inhibition ink E6 was used and that the amount of the ink used was 2.6 g/m². Heating was performed in the same manner as in Example 1 to produce a foam E6. The embossing effect of the foam E6 was evaluated. The evaluation results are indicated in Table 2.

Example 7

A foaming inhibition ink E7 was prepared in the same manner as in Example 1 except: that aqueous solvents, water and propylene glycol (weight ratio 1:1), were used as the solvents for the foaming inhibition ink; and that 1,2,3-benzotriazole (20% by weight) was used as the foaming inhibitor. A foamable printed matter E7 was produced in the same manner as in Example 1 except that the foaming inhibition ink E7 was used and that the amount of the ink used was 6.2 g/m². The embossing effect was evaluated. The evaluation results are indicated in Table 2.

Example 8

A foamable printed matter E8 was produced in the same manner as in Example 1 except: that the foaming inhibition ink E7 was used for a printing medium laminated (film thickness: 0.15 mm) with a foamable resin composition (chemical foaming agent: azodicarbonamide; foaming aids: zinc stearate and zinc oxide; resin: ethylene-vinyl acetate; filler: calcium carbonate; flame retardants: aluminum hydroxide and magnesium hydroxide; and lubricant: stearic acid); and that the amount of the ink used was 6.2 g/m², and the embossing effect was evaluated. The evaluation results are indicated in Table 2.

TABLE 2

|  | Resin of foamable resin composition | Foaming inhibitor | Solvent | Amount of ink used | Embossing effect |
|---|---|---|---|---|---|
| Example 1 | Vinyl chloride resin | 1-[N,N-bis(2-ethylhexyl)aminomethyl]methyl-benzotriazole (20 wt %) | Diethylene glycol ethyl methyl ether:ε-caprolactone (=5:3) | 8.7 g/m² | ◉ |
| Example 2 | Vinyl chloride resin | 1-[N,N-bis(2-ethylhexyl)aminomethyl]methyl-benzotriazole (20 wt %) | Diethylene glycol ethyl methyl ether | 2.0 g/m² | ○ |
| Example 3 | Vinyl chloride resin | 1-[N,N-bis(2-ethylhexyl)aminomethyl]benzo-triazole (20 wt %) | Diethylen glycol ethyl methyl ether:ε-caprolactone (=5:3) | 2.3 g/m² | ○ |
| Example 4 | Vinyl chloride resin | 2,2'-[[(Methyl-1H-benzotriazol-1-yl)methyl]imino]bisethanol (20 wt %) | Diethylene glycol ethyl methyl ether:ε-caprolactone (=5:3) | 2.4 g/m² | ○ |
| Example 5 | Vinyl chloride resin | 2,2'-[[(Methyl-1H-benzotriazol-1-yl)methyl]imino]bisethanol (20 wt %) | Water:propylene glycol (=1:1) | 2.4 g/m² | Δ (The front surface was not glossy) |
| Example 6 | Vinyl chloride resin | 1,2,3-benzotriazole (20 wt %) | Diethylene glycol ethyl methyl ether:ε-caprolactone | 2.6 g/m² | Δ (The foaming inhibition |

TABLE 2-continued

| | Resin of foamable resin composition | Foaming inhibitor | Solvent | Amount of ink used | Embossing effect |
|---|---|---|---|---|---|
| | | | (=5:3) | | region also foamed) |
| Example 7 | Vinyl chloride resin | 1,2,3-benzotriazole (20 wt %) | Water:propylene glycol (=1:1) | 6.2 g/m$^2$ | Δ (The foaming inhibition region also foamed) |
| Example 8 | Ethylene-vinyl acetate (Non-vinyl chloride-based thermoplastic resin) | 1,2,3-benzotriazole (20 wt %) | Water:propylene glycol (=1:1) | 6.2 g/m$^2$ | Δ (The foaming inhibition region also foamed) |

Example 9

Figure 3:
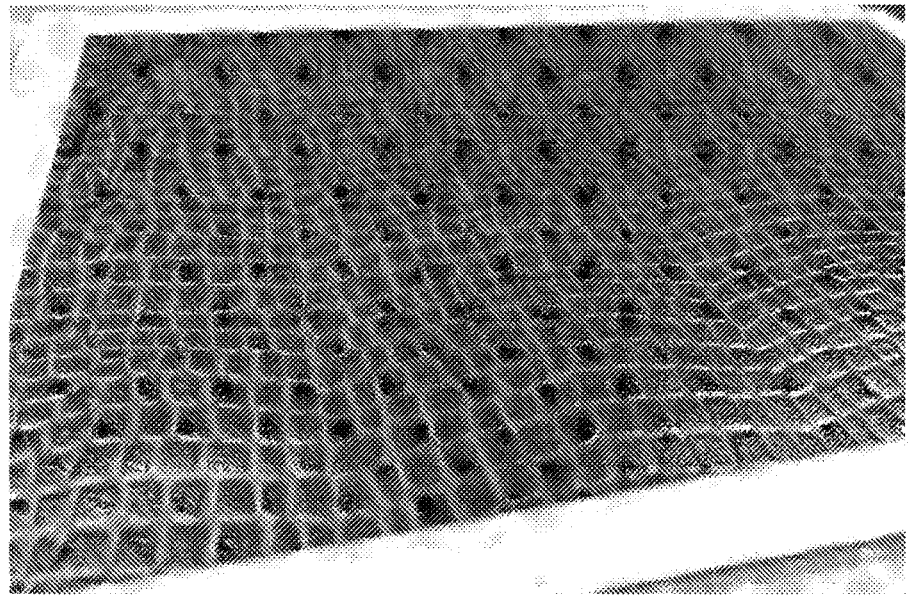
FIG. 3 is a photograph of a foam according to an embodiment of the present invention.

A crocodile skin-like sheet was manufactured in the same manner as in Example 1 using the foaming inhibition ink E1 of Example 1 and coloring inks (FIG. 3). The coloring inks used were C (cyan), M (magenta), Y (yellow), K (black), Lm (light magenta), Lc (light cyan), and Lk (light black) of Solvent Ink SS21 (colorant: pigment; solvent: Eco-Solvent; and fixing temperature: about 60° C.) manufactured by Mimaki Engineering Co., Ltd. The regions where the foaming inhibition ink E1 was printed were colored russet, and the portions where the foaming inhibition ink E1 was not printed were colored brown. It was heated to manufacture a crocodile skin-like sheet having red recesses and brown protrusions. It can be seen that there is no shift between the irregular pattern and the color pattern.

Example 10

Figure 4:
FIG. 4 is a photograph of a foam according to an embodiment of the present invention.

A stained glass-like sheet was manufactured using the foaming inhibition ink E1 of Example 1 and coloring inks (FIG. 4). The same coloring inks as in Example 9 were used. The regions where the foaming inhibition ink E1 was printed were colored red, green, yellow, and orange, and the portions where the foaming inhibition ink E1 was not printed were colored black. It was heated to manufacture a stained glass-like sheet having red, green, yellow and orange recesses and black protrusions. It can be seen that there is no shift between the irregular pattern and the color pattern. Moreover, the printed surface is glossy.

According to the present invention, a foam having no shift between the irregular pattern and the color pattern can be manufactured without making a plate. Therefore, the present invention is suitable also for small lot production.

Various embodiments and variations of the present invention are possible without departing from the broader spirit and scope of the present invention. The above-described embodiments are illustrative purpose only and do not intend to limit the scope of the present invention. That is, the scope of the present invention is demarcated by the claims rather than the embodiments. Various variations made within the claims and the scope of the spirit of the invention which is equivalent to the claims are to be regarded as being within the scope of the present invention.

Hereinafter, a forming method for a three-dimensional formed object according to an embodiment of the present invention will be described with reference to the drawings.

(Forming Method for Three-Dimensional Formed Object)

Figure 5:
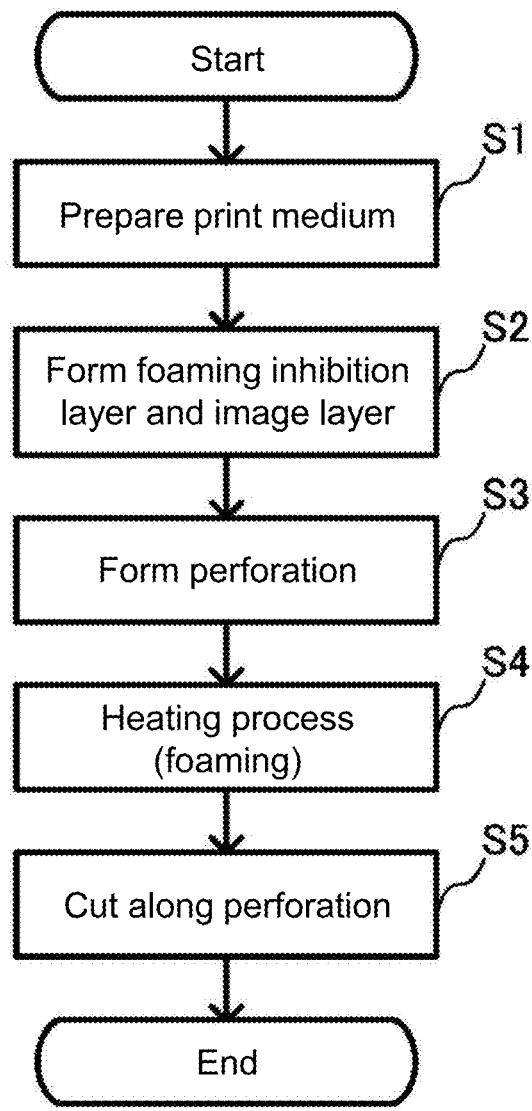
FIG. 5 is a flowchart showing steps of a forming method for a three-dimensional formed object according to an embodiment of the present invention.

As shown in FIG. 5, the forming method for the three-dimensional formed object (which is also a three-dimensional printed matter applied with various print) includes: step S1 of preparing a print medium; step S2 of applying an ink to the print medium to form a foaming inhibition layer and an image layer; step S3 of forming perforations in the print medium; step S4 of foaming the print medium by heating; and step S5 of cutting the print medium along the perforations. Each step will be described in detail below.

(Step S1)

Figure 6:
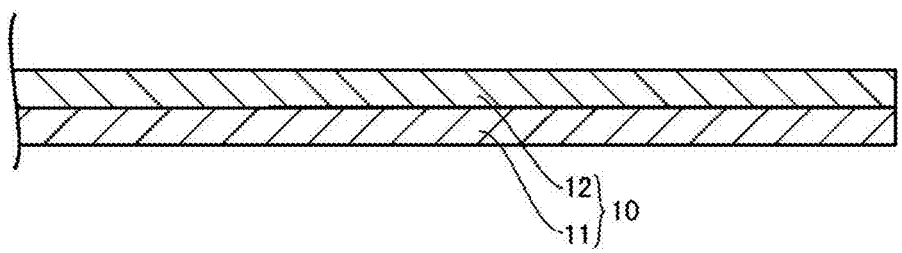
FIG. 6 is a cross-sectional view of a print medium.

In step S1, a print medium 10 is prepared (step S1). As shown in FIG. 6, the print medium 10 is a sheet-shaped medium having a flat surface, and is composed of a base material 11 and a foaming layer 12 which are stacked.

The base material 11 supports the foaming layer 12. Examples of the base material 11 include a paper sheet, a nonwoven fabric sheet, and a plastic film. The thickness of the base material 11 may be, for example, 0.025 mm to 0.3 mm, more preferably 0.05 mm to 0.12 mm.

The foaming layer 12 is a layer of a thermoplastic resin containing a chemical foaming agent, and may further contain a foaming aid, a plasticizer, a filler, a pigment, and a flame retardant, according to need. The thickness of the foaming layer 12 may be, for example, 0.1 mm to 0.5 mm, more preferably 0.15 mm to 0.3 mm.

Examples of the thermoplastic resin for the foaming layer 12 include polyvinyl chloride resins, polyethylene resins, polypropylene resins, polyethylene-vinyl acetate copolymers (EVA), acrylic resins, and urethane resins. Further, it is desirable that the polyvinyl chloride be a resin based on a soft polyvinyl chloride containing a plasticizer which will be described later.

Examples of the chemical foaming agent for the foaming layer 12 include azodicarbonamide, N,N'-dinitrosopentamethylenetetramine, and 4,4'-oxybis(benzenesulfonyl hydrazide), but it is desirable to use azodicarbonamide. The chemical foaming agent is vaporized by heating, which causes the foaming layer 12 to foam (the front surface rises). That is, the foaming layer 12 foams when heated.

Examples of the foaming aid for the foaming layer 12 include zinc compounds such as zinc stearate and barium compounds such as barium stearate.

Examples of the plasticizer for the foaming layer 12 include bis(2-ethylhexyl)phthalate, diisononyl phthalate (DINP), diisodecyl phthalate (DIDP), di-2-ethylhexyl adipate (DOA), diisononyl adipate (DINA), tri-2-ethylhexyl trimellitate (TOTM), and tricresyl phosphate (TCP).

Examples of the filler for the foaming layer 12 include calcium carbonate, talc, and clay minerals.

Examples of the pigment for the foaming layer 12 include pigments of any colors, for example, white pigments such as titanium oxide.

Examples of the flame retardant for the foaming layer 12 include phosphoric acid-based flame retardants, phosphoric acid ester-based flame retardants, aluminum hydroxide, magnesium hydroxide, and chlorine-based flame retardants.
(Step S2)

Figure 7:
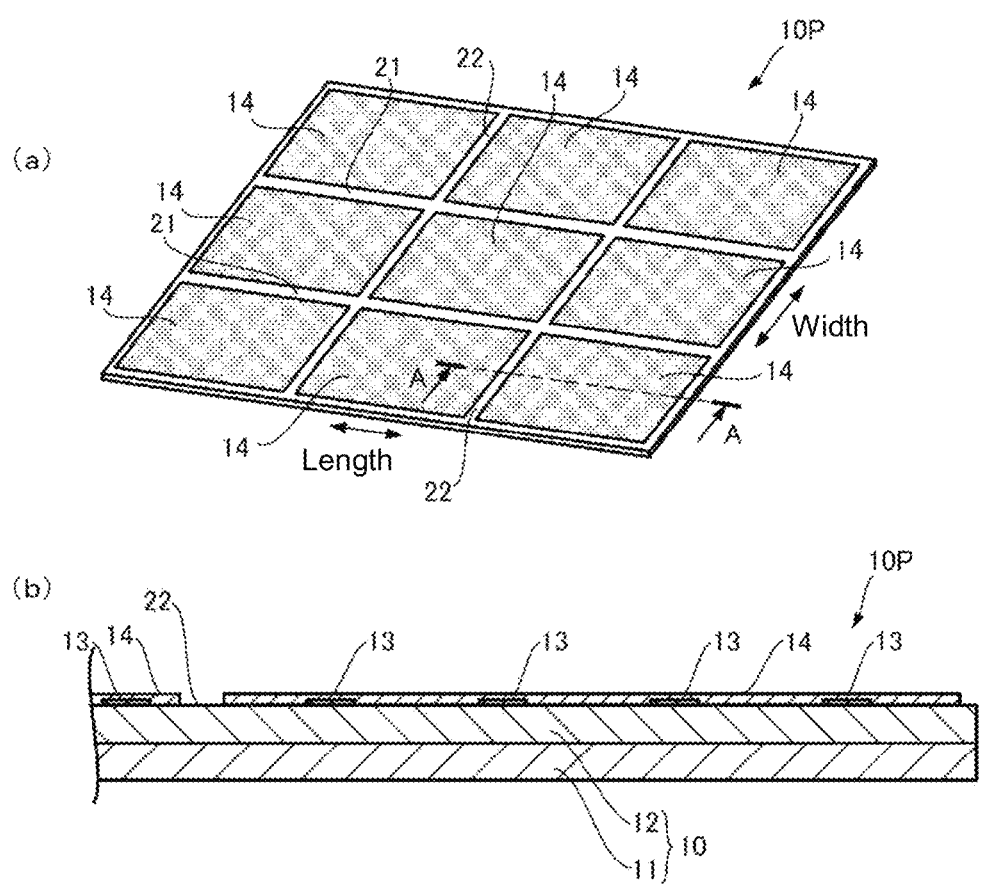

In step S2, the foaming inhibition layer 13 and the image layer 14 are formed (printed) on the front surface of the print medium 10. FIG. 7 shows a print medium 10P, which is the print medium 10 after the foaming inhibition layer 13 and the image layer 14 are formed. The foaming inhibition layer 13 is a layer that inhibits foaming (reaction) of the foaming layer 12, and is formed in a region of the foaming layer 12 that is not desired to be foamed. The image layer 14 is a layer exhibiting an image, and the image is printed by printing the image layer 14. The image to be printed is a landscape, a pattern, a character, etc., and the content thereof is not particularly limited. In step S2, the foaming inhibition layer 13 is formed first, and then the image layer 14 is formed. Here, as shown in (a) of FIG. 7, nine image layers 14 (that is, nine images) are formed in a 3×3 matrix in the length direction and the width direction. It is assumed that each of the nine image layers 14 exhibits the same image. It is assumed that the foaming inhibition layer 13 is formed under each of the nine image layers 14 in the same shape in each of the image layers 14. That is, due to foaming which will be described later, the nine images (the images exhibited by the image layers 14) are formed with irregularities of the same shape (irregularities formed by regions raised by foaming and regions where foaming is inhibited by the foaming inhibition layers 13).

The foaming inhibition layers 13 are printed with the foaming inhibition ink, and the image layers 14 are printed with various color inks. These inks are applied by various printers (printing apparatuses) such as an inkjet printer.

The nine image layers 14 are formed apart from each other. In the print medium 10P, portions where no image layer 14 is formed (between the respective image layers 14) are also referred to as margins 21 and margins 22. The margins 21 extend in the length direction of the print medium 10P, and the margins 22 extend in the width direction of the print medium 10P. A grid-shaped margin is formed by the margins 21 and the margins 22.

The foaming inhibition ink that forms the foaming inhibition layer 13 is an ink of any system that contains a foaming inhibitor which inhibits foaming of the foaming layer 12 and that is compatible with a color ink which will be described later, for example, a solvent ink or an aqueous ink. Depending on the material, the foaming inhibition ink may permeate the foaming layer 12 and inhibit foaming of the foaming layer 12. In this case, the foaming inhibition layer 13 may not be formed (in this case, the foaming inhibition layer 13 in the figures indicates the position at which the foaming inhibition ink is applied).

Examples of the foaming inhibitor include benzotriazole-based compounds such as 1,2,3-benzotriazole, 1-[N,N-bis(2-ethylhexyl)aminomethyl]benzotriazole, 1-[N,N-bis(2-ethylhexyl)aminomethyl]methylbenzotriazole, and 2,2'-[[(methyl-1H-benzotriazol-1-yl)methyl]imino]bisethanol. As the foaming inhibitor, one kind may be used alone, or two or more kinds may be used in combination.

When the foaming inhibition ink is a solvent ink, the foaming inhibition ink contains a solvent and a foaming inhibitor. Examples of the foaming inhibitor to be blended in the solvent ink include 1-[N,N-bis(2-ethylhexyl)aminomethyl]methylbenzotriazole. The concentration of the foaming inhibitor in the foaming inhibition ink is, for example, 1 to 80 wt %, preferably 5 to 20 wt %. As the solvent, for example, one kind of lactone-based solvents such as gamma butyrolactone and epsilon caprolactone and glycol ether-based solvents such as diethylene glycol ethyl methyl ether and dipropylene glycol monomethyl ether is used, or a mixture of two or more kinds thereof is used.

When the foaming inhibition ink is an aqueous ink, the foaming inhibition ink contains water and a foaming inhibitor. The foaming inhibitor to be blended in the aqueous ink is preferably soluble in water and solid at an ordinary temperature, and examples of such a foaming inhibitor include 2,2'-[[(methyl-1H-benzotriazol-1-yl))methyl]imino]bisethanol and 1,2,3-benzotriazole. Such a foaming inhibitor is advantageous in that it can prevent bleeding of color inks on the image layer 14 printed on the foaming inhibition layer 13. The concentration of the foaming inhibitor in the foaming inhibition ink is, for example, 1 to 30 wt %, preferably 5 to 20 wt %. The foaming inhibition ink, which is an aqueous ink, may further contain a moisturizer and a surface conditioner, according to need. Examples of the moisturizer include glycerin, propylene glycol, diethylene glycol, triethylene glycol, 1,2-butanediol, and 1,4-butanediol. The concentration of the moisturizer in the foaming inhibition ink is, for example, 5 to 50 wt %, preferably 20 to 50 wt %. Examples of the surface conditioner include acetylene-based surface conditioners and silicon-based surface conditioners. The concentration of the surface conditioner of the moisturizer in the foaming inhibition ink is, for example, 0.1 to 1 wt %.

The color inks forming the image layer 14 are inks of any system compatible with the thermoplastic resin of the foaming layer 12 and the foaming inhibition ink of the foaming inhibition layer 13, such as a solvent ink and a latex ink. BS4 and SS21 manufactured by Mimaki Engineering Co., Ltd. can be used as examples of the solvent ink, and Lx101 manufactured by Mimaki Engineering Co., Ltd. can be used as an example of the latex ink.

For example, when polyvinyl chloride (PVC) or the like having no ink receiving layer is used as the thermoplastic resin for the foaming layer 12, it is preferable to use, as the color inks, solvent inks containing a pigment as a colorant, and to use the solvent ink described above as the foaming inhibition ink. On the other hand, for the print medium 10 in which any other material is used in the foaming layer 12, it is preferable to use, as the color inks, latex inks containing a pigment as a colorant, and to use the aqueous ink described above as the foaming inhibition ink.

(Step S3)

Figure 8:
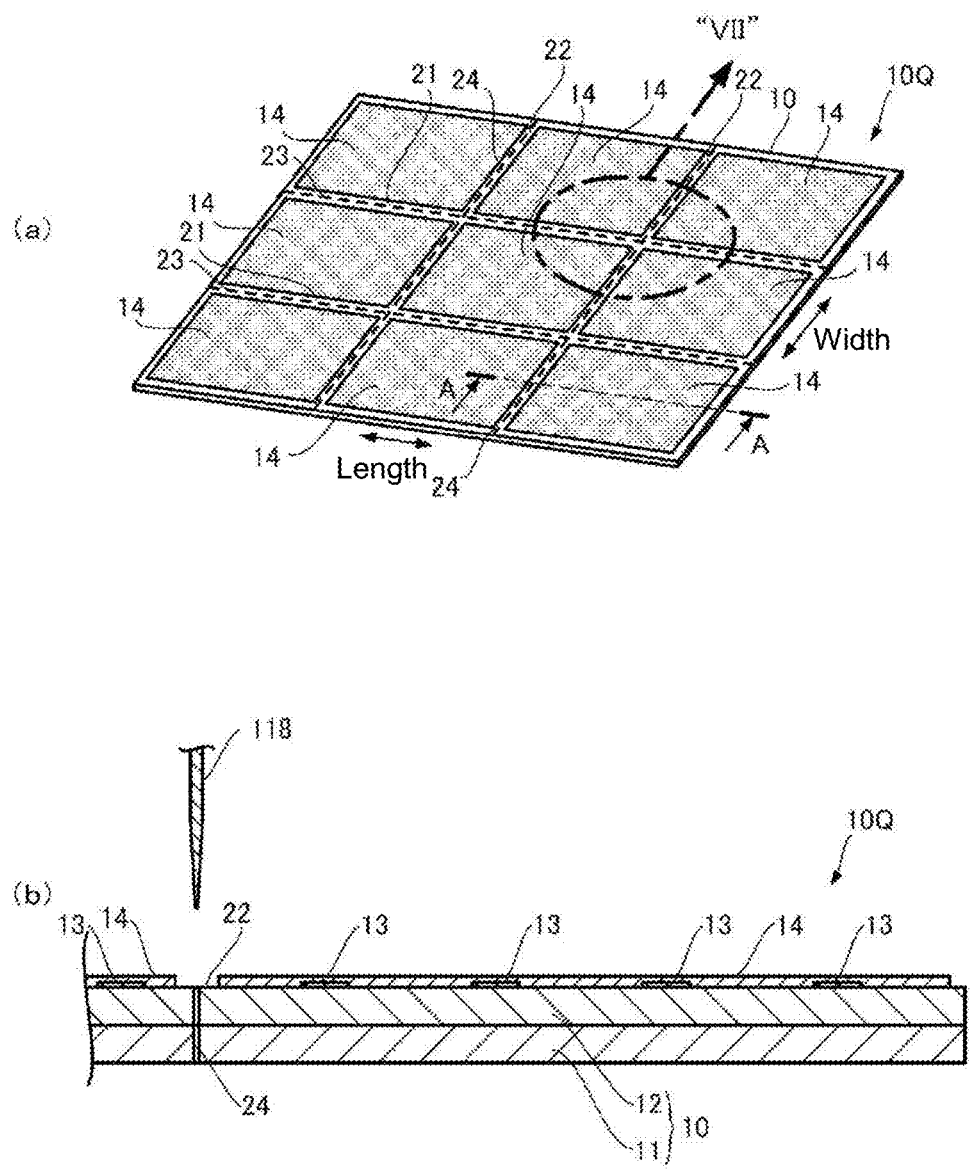
In FIG. 8, (a) is a perspective view of the print medium after formation of perforations.
Figure 9:
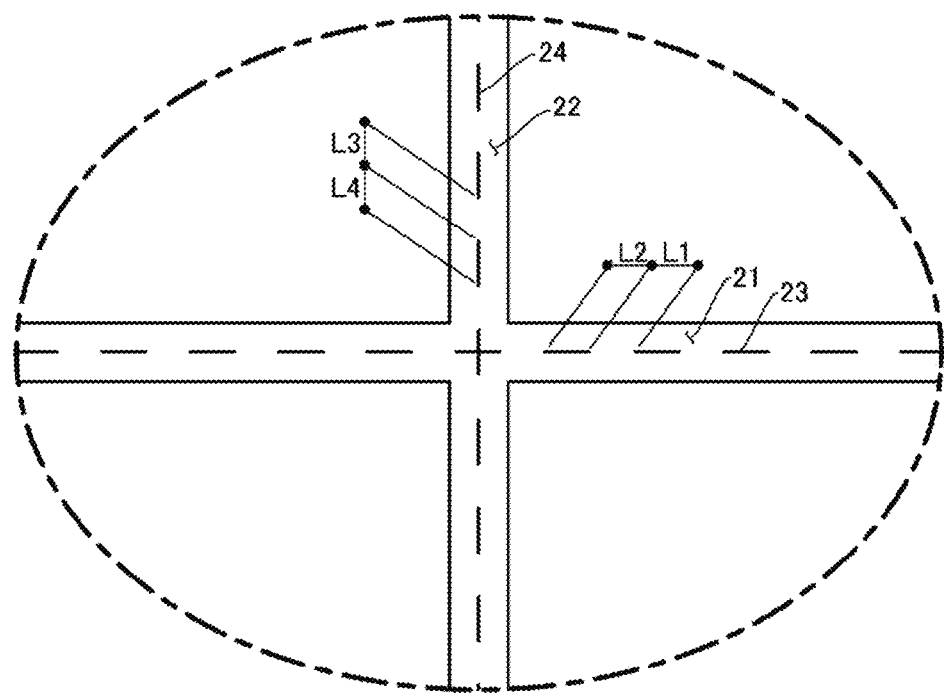
FIG. 9 is an enlarged view of the part "VII" in (a) of FIG. 8, which is a plan view focusing on the perforations.

In step S3, the print medium 10P is cut to form perforations 23 and 24 therein. The print medium 10P after formation of the perforations 23 and 24 is defined as a print medium 10Q, which is shown in FIG. 8. The perforations 23 and 24 can be formed, for example, by performing cutting with a cutter 118 ((b) of FIG. 8) in such a manner that the cutter 118 intermittently penetrates the print medium 10P at intervals. Of the perforations 23 and 24, the perforations 23 are formed linearly along the length direction in the margins 21 and pass between the plurality of image layers 14 arranged in the width direction. As shown in FIG. 9, the perforations 23 are each composed of uncut portions of a length L1 and cut portions of a length L2, which are alternately arranged. Further, the perforations 24 are formed linearly along the width direction in the margins 22, and pass between the plurality of image layers 14 arranged in the width direction. As shown in FIG. 9, the perforations 24 are composed of uncut portions of a length L3 and cut portions of a length L4, which are alternately arranged. The perforations 23 and 24 are arranged between the plurality of image layers 14 arranged along the width direction and the length direction, respectively.

(Step S4)

Figure 10:
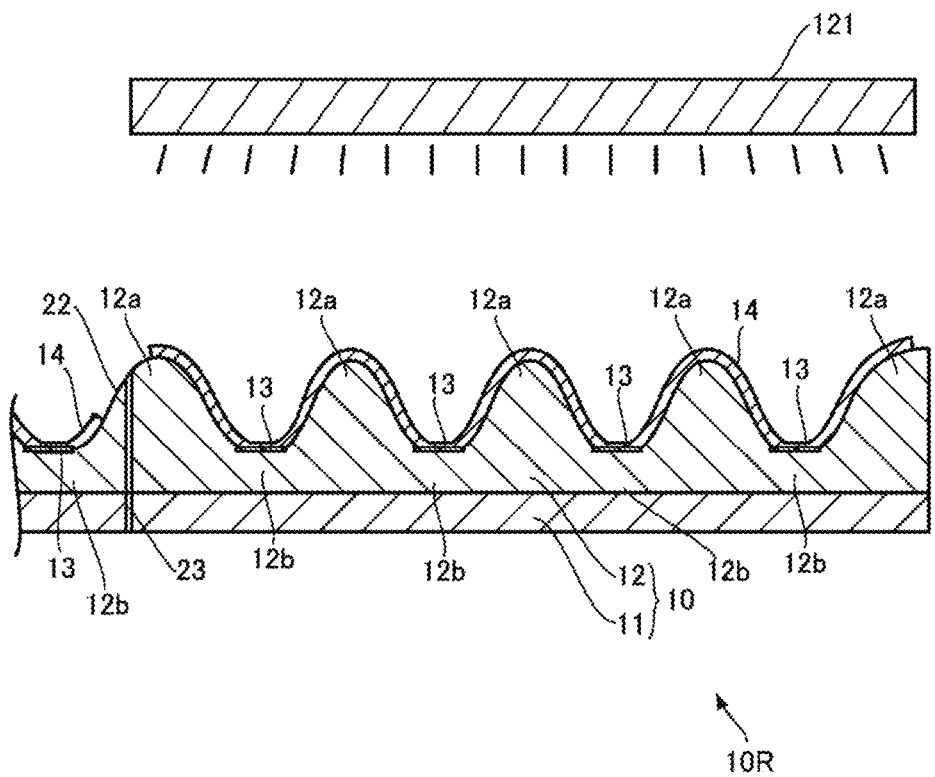
FIG. 10 is a cross-sectional view showing a state where a foaming layer is foamed by heating.

In step S4, the print medium 10Q is heated. The heating is performed, for example, with a heater 121 shown in FIG. 10. A print medium 10R in FIG. 10 is the print medium 10Q after heating. The heater 121 heats the print medium 10Q in a non-contact manner. The heating of the print medium 10Q is preferably performed as soon as possible after the foaming inhibition layers 13 and the image layers 14 are formed. The heater 121 can heat the print medium 10Q at a temperature ranging from 180° C. to 240° C., and heats the print medium 10Q for 1 to 4 minutes. Thus, as shown in FIG. 10, the regions of the foaming layer 12 where no foaming inhibition layer 13 is formed are heated and expanded (foamed). On the other hand, in the regions of the foaming layer 12 where the foaming inhibition layer 13 is formed, the reaction is inhibited, and the expansion (foaming) of the foaming layer 12 is inhibited. Therefore, the print medium 10R in FIG. 10 is the print medium 10Q foamed by heating (print medium 10Q formed with irregularities), which is also a three-dimensional formed object. As shown in FIG. 10, the print medium 10R, which is the print medium 10Q after foaming, is formed with an expanded region 12a (a raised region) in which the foaming layer 12 is expanded and an expansion-inhibited region 12b in which the expansion of the foaming layer 12 is inhibited. As a result, only desired regions of the print medium 10 can be swollen, and irregularities can be formed on the front surface of the print medium 10. After step S4, the print medium 10R is cooled, and the process proceeds to step S5.

(Step S5)

Figure 11:
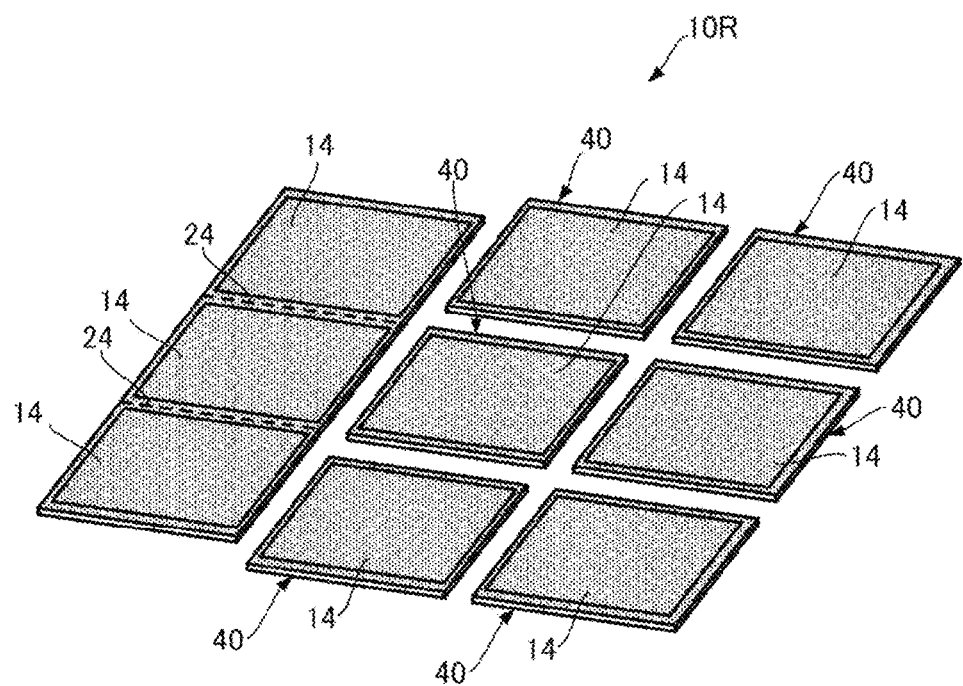
FIG. 11 is a perspective view showing a state where the print medium after foaming is cut along the perforations.

In step S5, a cutting step of cutting the print medium 10R along the perforations 23 and 24 is performed. The print medium 10R may be cut by hand or by using a commercially available cutter knife, and the cutting method is not particularly limited. By cutting the print medium 10R along the perforations 23 and 24, as shown in FIG. 11, a portion of the print medium 10R (three-dimensional formed object) where one image layer 14 and the irregularities are formed can be separated from other portions of the print medium 10R as a small-sized three-dimensional formed object 40. In this way, the print medium 10R can be divided into small-sized three-dimensional formed objects 40 each foamed with the image layer 14. In FIG. 11, dots show that the irregularities are formed, and the actual irregularities are omitted.

(Forming System for Three-Dimensional Formed Object)

Figure 12:
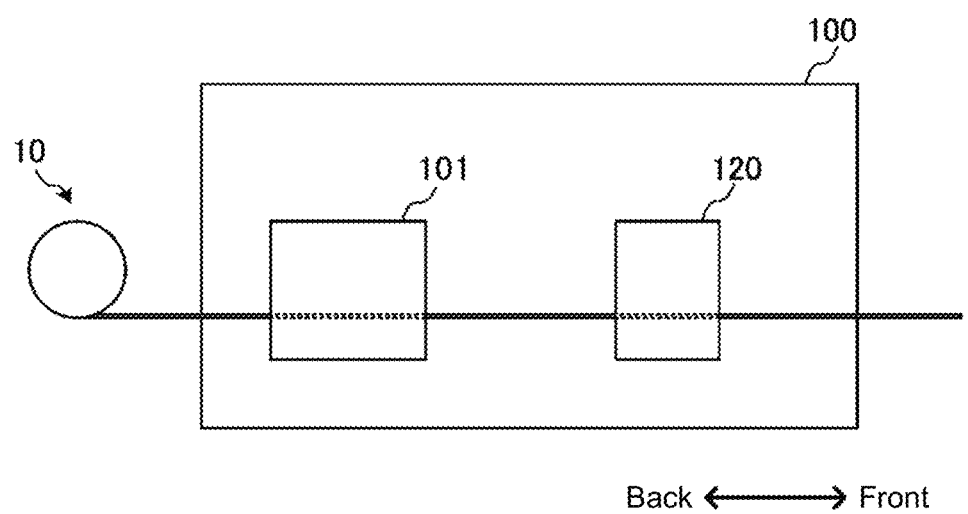
FIG. 12 is a schematic configuration diagram of a forming system for a three-dimensional formed object according to an embodiment of the present invention.
Figure 13:
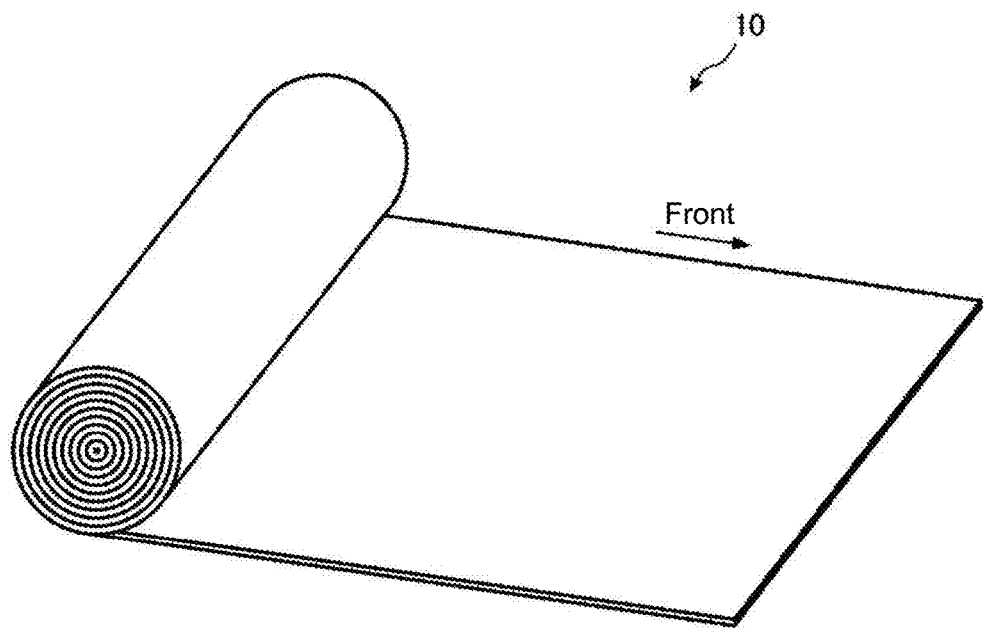
FIG. 13 is a perspective view of the print medium wound in a roll shape and partially fed.

The forming method for the three-dimensional formed object (particularly, the print medium 10R) can be performed, for example, by a forming system 100 for the three-dimensional formed object as shown in FIG. 12. The forming system 100 includes an inkjet printer 101 and a heating apparatus 120. In this forming system 100, as shown in FIGS. 12 and 13, the print medium 10 is wound in a roll shape, is sequentially fed forward from the tip, and runs (note that the direction of the feeding and running is defined as the length direction shown in FIG. 7 and the like). The forming system 100 also includes a mechanism for feeding and running the print medium 10 forward, a mechanism for supporting the print medium 10, and the like (neither of the mechanisms is shown).

The inkjet printer 101 may be, for example, an apparatus such as a CJV300 Series or CJV150 Series inkjet printer, which is an inkjet printer having a cutting function (for example, a cutting function capable of forming perforations with the cutter 118 described above) manufactured by Mimaki Engineering Co., Ltd. The inkjet printer 101 prints the foaming inhibition layers 13 and the image layers 14 on the print medium 10 (which may be stopped for printing and cutting) running forward, and then performs cutting to form the perforations 23 and 24. Cutting may also be performed while the printing is performed. A printer other than the inkjet printer may be used as the apparatus for printing and cutting (for example, a screen printing apparatus or the like).

The heating apparatus 120 is disposed downstream of the inkjet printer 101. The heating apparatus 120 includes the heater 121 described above, and the heater 121 is used to heat the foaming inhibition layers 13, the image layers 14, and the print medium 10 (print medium 10Q) after formation of the perforations 23 and 24 and to foam the foaming layer 12 of the print medium 10, thereby forming irregularities (expanded regions 12a, expansion-inhibited regions 12b).

(Perforation)

The perforations 23 and 24 formed in the print medium 10 will now be described. The function required of the perforations 23 and 24 formed in step S3 in FIG. 5 is to make it easy to cut the print medium 10 shown in step S5 by hand or a utility knife. Further, the perforations 23 and 24 must not be cut or significantly deform the print medium 10 while the print medium 10 is being run. The inventor prepared a plurality of print media varying in the lengths L1 and L3 of the uncut portions and the lengths L2 and L4 of the cut portions of the perforations 23 and 24 shown in FIG. 9, and verified the dimensions of the perforations which satisfied the functions described above through experiments. Here, as the plurality of print media, a plurality of pairs of a print medium before foaming and a print medium after foaming are prepared, and the perforations (lengths L1 to L4) are different among the pairs (the print media of the same pair have the same perforations (lengths L1 to L4)). The perforations of the print medium after foaming are formed before foaming. The print media are identical (identical in material and forming method) except the presence or absence of foaming and perforations, and are each obtained by coating a paper with a foamable resin layer (foaming layer 12) using azodicarbonamide (ADCA) as a foaming agent, polyvinyl chloride (PVC) as a base resin, diisononyl phthalate (DINP) as a plasticizer, calcium carbonate as a filler, rutile-type titanium oxide as a pigment, and zinc stearate as a stabilizer (foaming aid). The print medium before foaming and the print medium after foaming are prepared mainly for verifying the ease of cutting from the perforations when the print medium is run (because the print medium after formation of the perforations is run both before and after foaming).

As a result of the experiments, when the lengths L1 and L3 of the uncut portions of the perforations 23 and 24 were set to 1 mm, it was difficult to cut the print medium unless the lengths L2 and L4 of the cut portions thereof were set to 1 mm or more, and a problem, for example, that the print medium was cut during running occurred (the problem occurred similarly both before and after foaming) unless the lengths L2 and L4 (especially, length L4) were set to 5 mm or less. Also, when the lengths L1 and L3 of the uncut portions of the perforations 23 and 24 were set to 2 mm, it was difficult to cut the print medium unless the lengths L2 and L4 of the cut portions thereof were set to 3 mm or more (particularly, length L4), and a problem, for example, that the print medium 10 was cut during running occurred (the problem occurred similarly both before and after foaming) unless the lengths L2 and L4 were set to 10 mm or less. From this fact, it was found that the ratio of the length L1 of the uncut portions of the perforations 23 to the length L2 of the cut portions thereof (L1:L2) and the ratio of the length L3 of the uncut portions of the perforations 24 to the length L4 of the cut portions thereof (L3:L4) are preferably in the range of 1:1 to 1:5.

It was also found that the lengths L1 and L3 of the uncut portions of the perforations 23 and 24 are preferably 2 mm or less. If the lengths L1 and L3 of the uncut portions are 3 mm or more, it becomes difficult to cut the print medium 10 (cut along the perforations 23 and 24) in step S5. However, this depends also on the thickness and strength of the print medium 10 (if the thickness and strength of the print medium 10 are low, it may be easy to cut even if the lengths L1 and L3 of the uncut portions are set to 3 mm or more).

Effect of the Present Embodiment

In the present embodiment, the perforations 23 and 24 for cutting are formed in the print medium 10 (step S3 in FIG. 5) before the print medium 10 is heated and expanded (step S4 in FIG. 5). Therefore, the perforations 23 and 24 for cutting are formed in the print medium 10 before foaming. That is, the perforations 23 and 24 are formed in the print medium 10 without irregularities, and thus can be easily formed. Further, since the perforations 23 and 24 are easily formed, the perforations 23 and 24 can be formed at exact positions in the print medium 10. From this, it is possible to improve the dimensional accuracy of the three-dimensional formed object 40 to be formed. For example, it may be necessary to press down the print medium 10 when forming the perforations 23 and 24 (the inkjet printer 101 described above may include a pressing mechanism that presses down the print medium to prevent misalignment during cutting). When the perforations 23 and 24 are formed in the print medium after the irregularities are formed, the protrusions may be crushed by the pressing or interferes with the formation of the perforations. By forming the perforations 23 and 24 in the print medium 10 having no irregularities, such inconvenience can be avoided, and the perforations 23 and 24 can be formed easily and accurately. Further, in some cases, an image serving as a mark (such as a dragonfly image) is printed on the print medium 10 in advance, and the position of the cutter is corrected with reference to this image at the time of forming the perforations 23 and 24 (for example, the inkjet printer 101 is provided with a camera and a control unit (such as a computer that controls printing and cutter operation), the image may be read by the camera, and correction process may be performed by the control unit to adjust the position of the cutter). However, when the perforations 23 and 24 are formed after foaming, the image portion of the mark may also be raised to distort the image, so that the position of the cutter may not be corrected accurately. By forming the perforations 23 and 24 in the print medium 10 having no irregularities, the image is not distorted, the inconvenience described above does not occur, and the perforations 23 and 24 can be formed easily and accurately. In addition, since the print medium after foaming has irregularities, for example, when a cutter blade is inserted into the slope of a protrusion, there may arise an inconvenience such that the blade slips on the slope and thus cannot be inserted into the slope well for cutting. In the above embodiment, the cutter blade is inserted into the print medium before foaming, the above inconvenience does not arise. Therefore, the perforations 23 and 24 can be formed easily and accurately.

Further, the forming system 100 can allows the print medium 10 wound in a roll shape to run, and can perform heating process directly. Thus, the loss of the print medium can be reduced, and the production cost for the three-dimensional formed object can be saved. Further, since the images by the image layers 14 are expressed on the print medium 10, the design is improved. Further, by using an identical apparatus (inkjet printer 101) to form the foaming inhibition layer 13 and the image layer 14 and to form the perforations 23 and 24, they are easily formed, and the formation positions thereof are easily aligned.

Further, in addition to the perforations 24 along the width direction, the print medium 10 is also formed with the perforations 23 along the length (flow) direction. Thus, perforations having a suitable shape can be formed. A three-dimensional formed object having a desired size can be produced, and a particularly small three-dimensional formed object (particularly, small-sized three-dimensional formed object 40 narrower in width than the print medium) can be produced. The thus-produced three-dimensional formed object can be used for posters, postcards, and the like, and the scope of application thereof can be expanded. In addition, since a three-dimensional formed object (three-dimensional decoration) cut along the perforations in advance can be attached to an object to be decorated (decorative box, furniture, electric appliance, etc.), the work of cutting the three-dimensional formed object after attachment thereof to the object to be decorated becomes unnecessary. Thus, the work of decorating the object to be decorated can be simplified.

The present invention is not limited to the above-described embodiments, and various variations and applications are possible. Variations will be described below.

(Variation 1)

Figure 14:
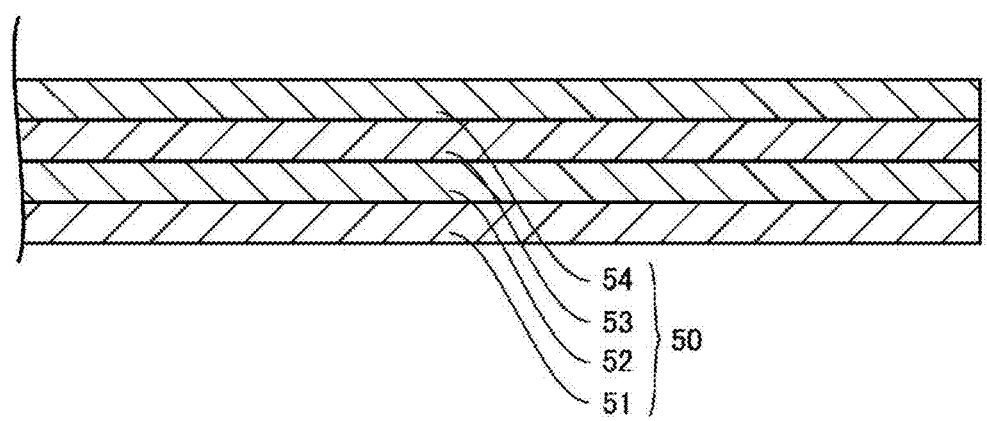
FIG. 14 is a cross-sectional view of a print medium according to a variation.

As the print medium 10, for example, a print medium 50 in FIG. 14 may be adopted. The print medium 50 is composed of a release paper 51, a pressure-sensitive adhesive layer 52, a base material 53 (which may be the same as the base material 11), and a foaming layer 54 (which may be the same as the foaming layer 12), which are stacked. The print medium 50 is a seal with a release paper, and the pressure-sensitive adhesive layer 52, the base material 53, and the foaming layer 54 can be integrally released from the release paper 51. A portion composed of the pressure-sensitive adhesive layer 52, the base material 53, and the foaming layer 54 is also referred to as a seal material that is peeled from the release paper 51.

Figure 15:
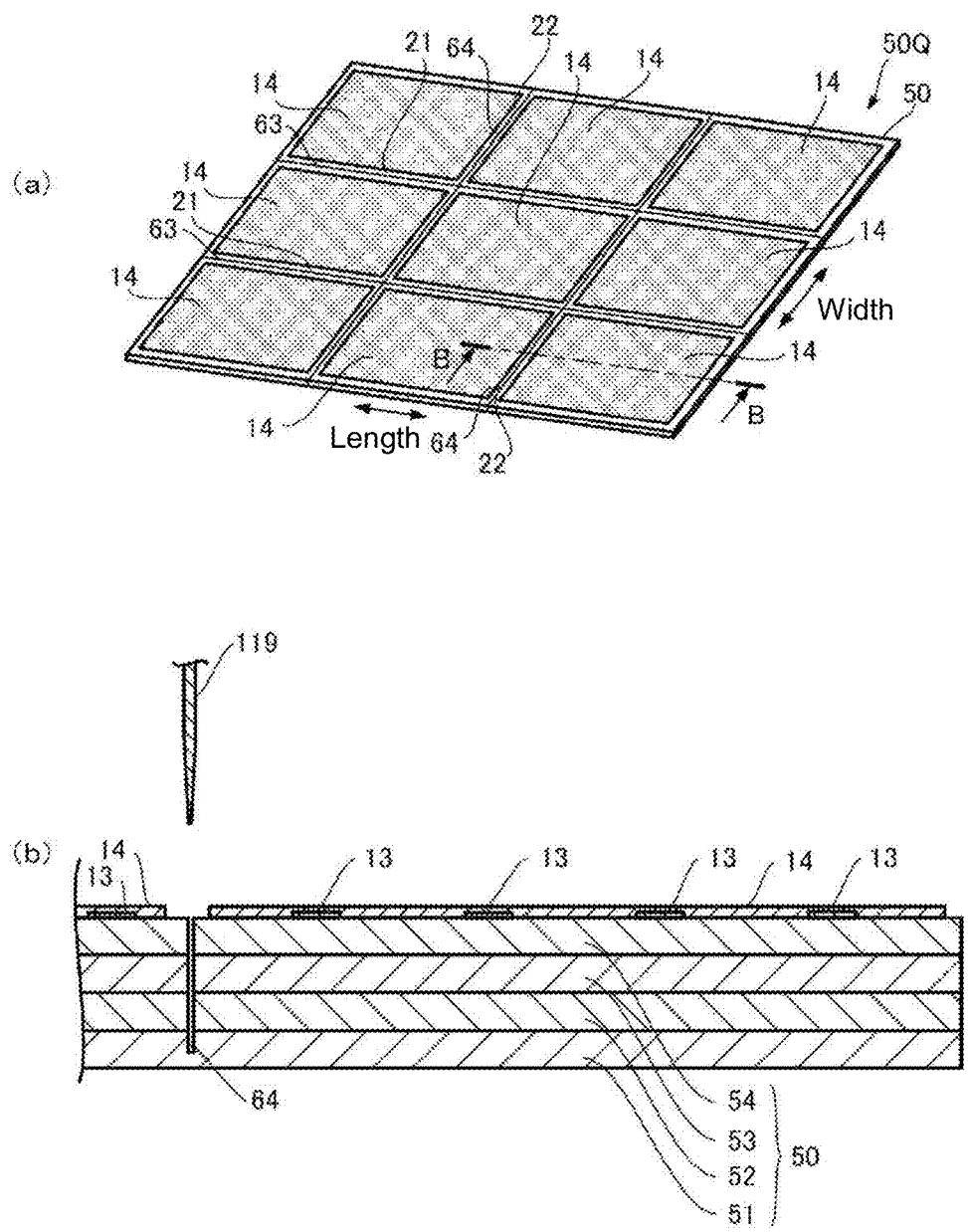
In FIG. 15, (a) is a perspective view of the print medium after formation of notches.

When such a print medium 50 is adopted, notches 63 may be formed instead of the perforations 23, and notches 64 may be formed instead of the perforations 24, as shown in FIG. 15. Similarly to the perforations 23, the notches 63 are formed linearly along the length direction in the margins 21. The notches 64 are formed linearly along the width direction in the margins 22, like the perforations 24.

The notches 63 and 64 are formed, for example, by half-cutting the print medium 50 after printing the foaming inhibition layer 13 and the image layer 14 in step S3. The half-cutting is performed with a cutter 119 (which may be the same as the cutter 118), as shown in (b) of FIG. 15. Specifically, the cutter 119 completely cuts the pressure-sensitive adhesive layer 52, the base material 53, and the foaming layer 54, while partially cutting the release paper 51. As a result, the notches 63 and 64 are formed. The print medium 50 after formation of the notches 63 and 64 is also referred to as a print medium 50Q. After the half-cutting in step S3, the print medium 50Q is heated in step S4 to foam the foaming layer 54. As a result, the print medium 50 having irregularities formed therein (also referred to as a print medium 50R, which is also a three-dimensional formed object) is obtained.

Figure 16:
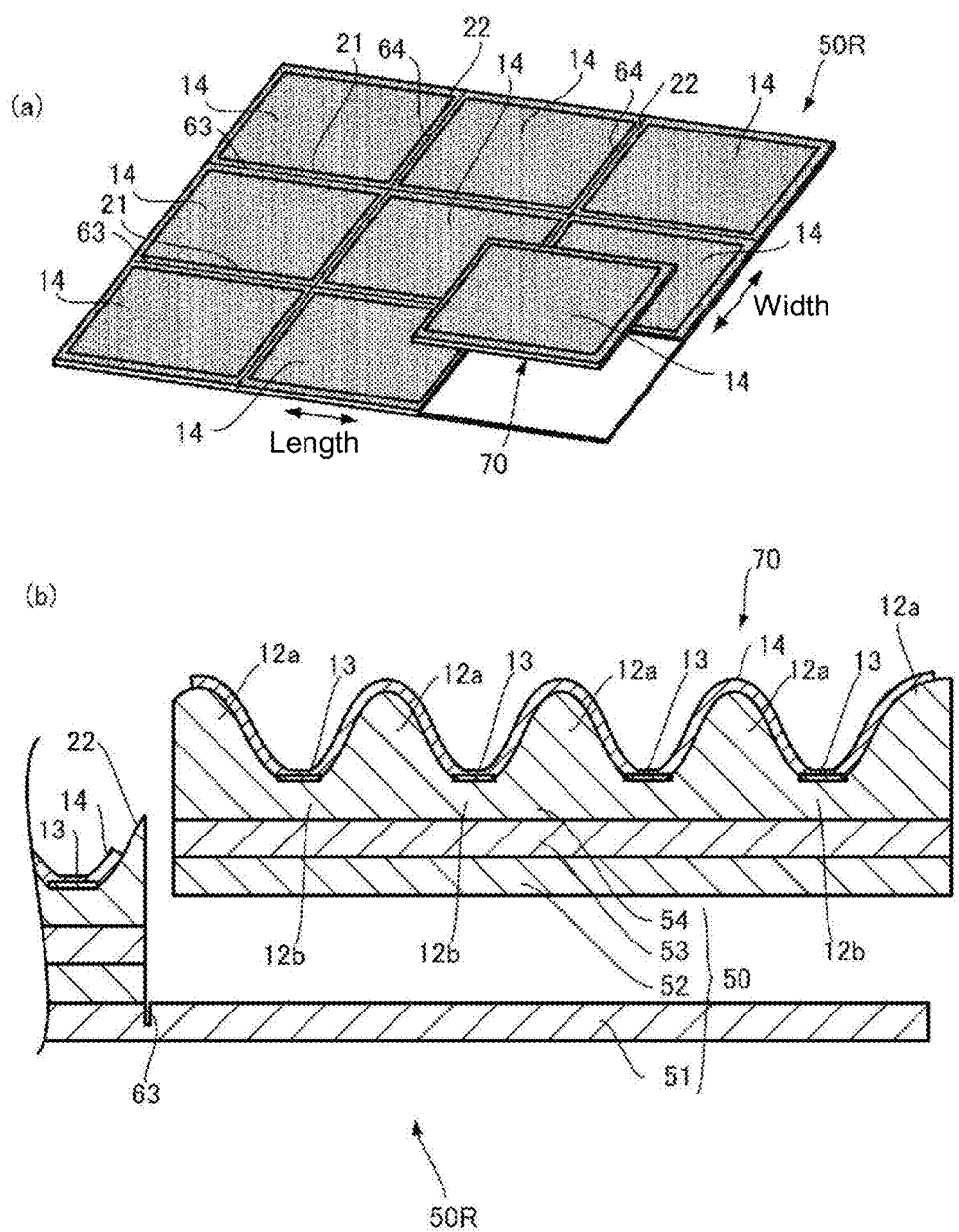
In FIGS. 16, (a) and (b) show a seal which is a small-sized three-dimensional formed object from a release paper of a print medium after foaming.

In this variation, the portion (portion for one image layer 14) surrounded by the notches 63 and 64, of the seal material (here, portion where the irregularities and the image layer 14 are formed) constituting the print medium 50R, which is the print medium after formation of the irregularities, can be peeled from the release paper 51 as a small-sized seal material (seal material for one image, which is also a three-dimensional formed object) 70 (see FIG. 16; In FIG. 16, dots show that the irregularities are formed, and the actual irregularities are omitted). The seal material 70 can be attached to another object. In this way, a wallpaper seal, a sticker, a label or the like can be formed as the seal material 70.

The same configuration as that of the forming system 100 can be adopted for the forming system for the three-dimensional formed object formed with the notches 63 and 64. However, the inkjet printer 101 shall have a half-cutting function. Further, when the inkjet printer 101 has a function capable of forming notches and perforations, the print medium may be provided with notches and perforations. In this case, by cutting the print medium along the perforations, it is possible to obtain a seal with a release paper (seal having irregularities), which has a plurality of small-sized seal materials partitioned by notches.

Since the notches 63 and 64 are also formed in the same manner as the perforations 23 and 24 (for example, it is necessary to press the print medium at the time of forming the notches 63 and 64), the notches 63 and 64 are formed before foaming, so that the same effects as those of the above embodiments can be obtained.

(Variation 2)

By applying lamination processing to the front surface of the print medium 10 after formation of the image layer 14, the water resistance and abrasion resistance of the three-dimensional formed object (print media 10R and 50R) may be improved. As the lamination processing, for example, liquid lamination can be used. The lamination processing can be performed at any stage, for example, after printing or heating process.

(Variation 3)

Printing of the image layer 14 and the foaming inhibition layer 13 and formation of the perforations or notches may be performed by different devices. For example, printing may be performed by a printing apparatus such as an inkjet printer (for example, one having no cutting function), and cutting to form perforations or notches may be performed by a cutting apparatus such as a cutting plotter different from the printing apparatus. In this case, the cutting apparatus may be disposed, for example, between the inkjet printer 101 (here, which is assumed to have no cutting function) and the heating apparatus 120 in FIG. 12.

(Variation 4)

The number of images (images exhibited by the image layers 14) to be printed in the width direction or the length direction is arbitrary. Also, at least one of the plurality of images arranged in the width direction or the length direction may be different from the rest of the images (including the case where the respective images are different from each other). Further, at least one of the irregularities (irregularities obtained by foaming the foaming layer) formed in each of the plurality of images (which may be the same or different) may be different from the irregularities formed in the rest of the images (including the case where the irregularities formed in the respective images are different from each other).

(Variation 5)

The perforations and half cuts may be formed along an oblique direction with respect to the print medium, or may be formed in a curved shape. As a result, when the small-sized three-dimensional structure 40 or 70 (for example, a wallpaper seal) is attached to a predetermined target (for example, a wall) for decoration, even if the target has a complicated shape having a curve (for example, the boundary between the ceiling and the wall has a curved shape), a small-sized three-dimensional formed object having a shape that matches the target can be obtained in advance. The work of cutting and adjusting the three-dimensional formed object after attachment thereof to the target becomes unnecessary, and the decoration by the three-dimensional formed object can be simplified.

(Variation 6)

By using a thick paper with a basis weight of 150 $g/m^2$ as the base material for the print medium, it is possible to make a box with three-dimensional printing applied to the surface. When making such a box, perforations as described above are formed at bent portions of the box, or notches as described above are formed. Such perforations and notches are also formed before the heating process of the print medium as in the above embodiments. As a result, the box having on its surface irregularities due to foaming of the foaming layer can be bent at the bent portions and easily assembled.

(Variation 7)

The foaming inhibition layers 13 may be formed in the margins 21 and 22 between the respective image layers 14. As a result, foaming of the portions where the perforations or notches are formed is inhibited, so that the three-dimensional formed object can be easily cut, or the work of peeling the three-dimensional formed object from the release paper can be easily performed. In this case, the foaming inhibition layers 13 may be formed after the image layer 14 is formed. If the foaming inhibition ink passes through the image layers 14 and can act on the foaming layers 12 and 54, the foaming inhibition ink may be applied from above the image layers after the image layers are formed.

(Variation 8)

In the above embodiments or the like, the foaming inhibition layers 13 and the image layers 14 exhibiting images are formed on the print medium 10 in step S2 in FIG. 5. However, a print medium on which an image is printed is prepared in advance, and only printing of the foaming inhibition layer 13 (application of the foaming inhibition ink) may be performed in step S2. In this case, the foaming inhibition layer 13 is formed in an unprinted region, so that the expansion of the foaming layers 12 and 54 can be inhibited without the function being impaired by the image printed in advance. If the foaming inhibition ink passes through the image layers 14 and can act on the foaming layers 12 and 54, the foaming inhibition ink may be applied from above the images.

(Variation 9)

A part or all of the image printed on the print medium 10 may be expressed by the foaming inhibition ink colored in a desired color. For example, the foaming inhibition layers 13 and the image layers 14 may cooperate to express one image. The printing time can be shortened. It should be noted that the design may be expressed only by the irregularities formed by foaming of the foaming layers 12 and 54, and, in this case, no image is necessary.

(Variation 10)

The foaming layers 12 and 54 may each be formed of a thermoplastic resin layer in which microcapsules made of a thermoplastic resin (e.g., acrylonitrile) in which a volatile solvent (e.g., liquid hydrocarbon) that volatilizes and expands by heating is encapsulated are dispersed, and carbon black ink may be printed on the region to be foamed (region to be heated) to form a three-dimensional formed object. This method utilizes the properties of carbon molecules that absorb electromagnetic waves due to the molecular structure of covalent bonds. Upon irradiation with electromagnetic waves, the region of the foaming layers 12 and 54 on which carbon black ink is printed is heated and expanded. Thus, control of the foaming of the foaming layers 12 and 54 (control of the place to be foamed and the place where foaming is inhibited) may be performed by either an ink that inhibits foaming or an ink that induces or promotes foaming (that is, an ink for controlling foaming of the foaming layers). The carbon black ink may be applied so as to form a part of the image.

(Variation 11)

Further, the cutting to form the perforations 23 and 24 or the notches 63 and 64 may be performed on the print medium 10 before formation of the foaming inhibition layers 13 and the image layers 14. Alternatively, the cutting may be performed after formation of the foaming inhibition layers 13, and then the image layers 14 may be formed. It is preferable that the cutting be performed after the formation of the foaming inhibition layers 13 (or the application of carbon black ink) or after the formation of the image layers 14. As a result, it is possible to prevent the ink from entering the cut portions (inside the cut portions of the perforations 23 and 24 and within the notches 63 and 64). Thus, for example, when a color ink or the like is applied onto or near the portion to be cut, the small-sized three-dimensional formed objects 40 and 70 (especially, their side end faces) can be beautifully finished.

First Embodiment

A foaming machine 1100 for a foamable medium 110 according to a first embodiment of the present invention will be described with reference to the drawings.

(Structure of Foamable Medium 110)

The foamable medium 110 is a sheet-shaped medium (including a film which has an arbitrary thickness and is a thin sheet), and can be wound for storage and transportation. The foamable medium 110 is a seal with a so-called mount, and, as shown in (a) of FIG. 17, includes: a base material 111; a foaming layer 112 formed on one surface of the base material 111; a pressure-sensitive adhesive layer 113 formed on the other surface of the base material 111; and a mold release material 114 attached to a back surface of the pressure-sensitive adhesive layer 113. The base material 111 to the pressure-sensitive adhesive layer 113 correspond to the seal, and the mold release material 114 corresponds to the mount.

The base material 111 is a sheet made of any material. For example, examples of the material for the base material 111 include a paper, a cloth, and plastic. It is particularly preferable that the base material 111 have high water resistance and adhesiveness to the foaming layer 112 which will be described later. Examples of such a base material 111 include a nonwoven fabric sheet, a fleece sheet, and a porous film. The heat resistant temperature of the base material 111 differs depending on the type. For example, the heat resistant temperature of a polypropylene-based porous film is 120° C. or lower, under the definition that the temperature at which heat shrinkage of 3% or more is observed is −10° C., as measured based on JIS K 7133. Further, the base material 111 may be a sheet containing a metal, for example, a flame-retardant sheet or a magnetic sheet.

As shown in (b) of FIG. 17, the foaming layer 112 is a thermoplastic resin layer that expands and increases in thickness, as compared with that before foaming, upon foaming of a foaming component in the layer heated to a predetermined temperature (hereinafter referred to as foaming temperature) or higher by a heating machine 150 which will be described later. Herein, the expansion of the foaming layer 112 by heating in this way is also referred to as "foaming" of the foaming layer 112.

The principle of foaming by heating is arbitrary, and, for example, a chemical foaming agent that generates a gas upon heating such as heat decomposition, or a thermoplastic resin microcapsule that encloses a volatile solvent that volatilizes and expands by heating can be used as the foaming component.

For example, examples of the chemical foaming agent described above include azodicarbonamide, N,N'-dinitrosopentamethylenetetramine, 4,4'-oxybis(benzenesulfonylhydrazide), and calcium hydrogencarbonate. In particular, azodicarbonamide is desirable.

Further, examples of the microcapsule described above include thermoplastic resin microcapsules in which a volatile organic solvent is encapsulated. Examples of the volatile organic solvent include petroleum ether, hydrocarbons (isobutane, pentane, hexane, heptane, etc.), low boiling point halogenated hydrocarbons, and methylsilane. Examples of the thermoplastic resin constituting the microcapsules include vinylidene chloride-acrylonitrile-based copolymers, acrylonitrile-based copolymers, acrylic acid ester-based copolymers, and methacrylate-based copolymers.

The foaming temperature varies depending on the types of the foaming component and the thermoplastic resin, but is usually about 70° C. or higher. When a chemical foaming agent is used, it is about 120° C. or higher.

The thermoplastic resin as the main component of the foaming layer 112 is arbitrary as long as it conforms to the foaming principle of the foaming component and expands upon foaming of the foaming component at a temperature at which the foaming component foams. Examples of the thermoplastic resin include polyvinyl chloride resins, polyethylene resins, polypropylene resins, polyethylene-vinyl acetate copolymers (EVA), acrylic resins, and urethane resins. Further, it is preferable that the polyvinyl chloride resin be a resin based on a soft polyvinyl chloride containing a plasticizer which will be described later in combination.

The foaming layer 112 may further contain an additional component, depending on the foaming component. For example, when a chemical foaming agent is used as the foaming component, it is preferable to further blend, in the thermoplastic resin, a foaming aid that promotes foaming of the chemical foaming agent and lowers the foaming temperature. Examples of such a foaming aid include zinc compounds such as zinc stearate and barium compounds such as barium stearate.

The foaming layer 112 may further contain a plasticizer, a filler, a pigment, a flame retardant, or the like, depending on the intended use.

Examples of the plasticizer include bis(2-ethylhexyl) phthalate, diisononyl phthalate (DINP), diisodecyl phthalate (DIDP), di-2-ethylhexyl adipate (DOA), diisononyl adipate (DINA), tri-2-ethylhexyl trimellitate (TOTM), and tricresyl phosphate (TCP).

Examples of the filler include calcium carbonate, talc, and clay minerals.

Examples of the pigment include pigments of any colors, for example, white pigments such as titanium oxide.

Examples of the flame retardant include phosphoric acid-based flame retardants, phosphoric acid ester-based flame retardants, aluminum hydroxide flame retardants, magnesium hydroxide flame retardants, and chlorine-based flame retardants.

The pressure-sensitive adhesive layer 113 is a layer of a pressure-sensitive adhesive (pressure sensitive adhesive) for adhering the foamable medium 110 to a desired part by peeling the mold release material 114 which will be described later from the layer and then attaching the layer to the desired part. The pressure-sensitive adhesive is optional as long as it is suitable for adhesion between the base material 111 and the desired part. Examples of the pressure-sensitive adhesive include rubber-based pressure-sensitive adhesives, acrylic pressure-sensitive adhesives, and silicone-based pressure-sensitive adhesives. The heat resistant temperature of the pressure-sensitive adhesive evaluated based on the peeling force of the pressure-sensitive adhesive layer can be measured, for example, by heating the pressure-sensitive adhesive layer at a plurality of temperatures for 2 minutes, then measuring the 90° peeling based on the T-peeling according to JIS K-6854-3, determining whether or not the peeling force is decreased by heating, and determining the maximum temperature at which no decrease in peeling force is observed. For example, the heat resistant temperature is about 120° C. or lower for rubber pressure-sensitive adhesives (for example, 120° C. for SB-1273 (manufactured by Regitex Co., Ltd.)), about 150° C. or lower for acrylic pressure-sensitive adhesives (for example, 150° C. for SK Dyne 1251 (manufactured by Soken Chemical & Engineering Co., Ltd.)), and about 250° C. or lower for silicone pressure-sensitive adhesives (for example, 250° C. for KR-3700 (manufactured by Shin-Etsu Chemical Co., Ltd.)).

The mold release material 114 is a sheet in which a layer of a mold release agent (mold release layer) is formed on a surface to be attached to the pressure-sensitive adhesive layer 113. The mold release material 114 is attached to the pressure-sensitive adhesive layer 113. Therefore, before the foamable medium 110 is adhered to a desired part, for example, when the foamable media 110 are stacked or rolled for storage, the pressure-sensitive adhesive layer 113 is prevented from adhering to other parts or the foamable medium 110 itself. On the other hand, by peeling the mold release material 114 from the pressure-sensitive adhesive layer 113, the pressure-sensitive adhesive layer 113 can be easily brought into a state where it can be adhered to the desired part. Examples of the material for the sheet of the mold release material 114 include a high-quality paper, a kraft paper, and polyethylene terephthalate (PET). Examples of the release agent include a silicone-based mold release agent, a polyolefin-based mold release agent, and a fluorine-based mold release agent.

Figure 17:
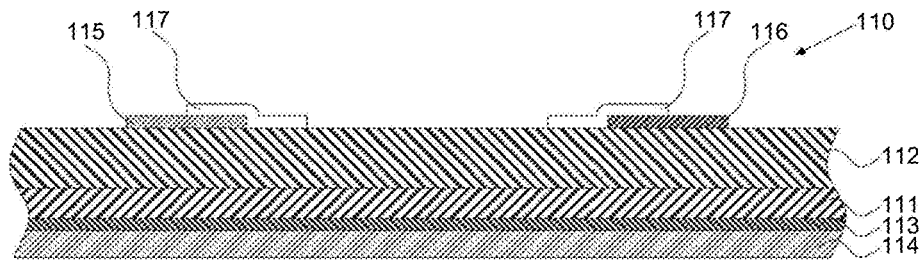
FIG. 17 is a schematic cross-sectional view of a foamable medium.
Figure 17:
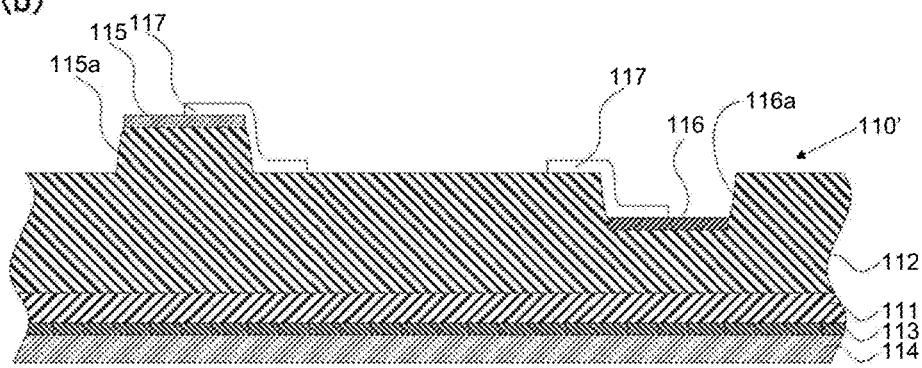

The foamable medium 110 may further have a foaming promotion layer 115, a foaming inhibition layer 116, and/or an image layer 117 formed on the foaming layer 112 in advance, as shown in (a) of FIG. 17, depending on the desired design. Further, in the process of conveying the foamable medium 110 on which these layers have not yet been formed from the roll to the heating machine 150 by a conveying apparatus 130 which will be described later, these layers may be formed on the foaming layer 112 of the foamable medium 110 being conveyed.

The foaming promotion layer 115 is a layer containing a foaming promoter that promotes foaming of the foaming layer 112 by heating. Therefore, when a foamable medium (hereinafter, foamed medium 110') in which the foamable medium 110 is heated by the foaming machine 1100 which will be described later to foam the foaming layer 112 is formed, the region of the foaming layer 112 where the foaming promotion layer 115 is provided is raised higher than the region where the foaming promotion layer 115 is not provided, as shown in (b) of FIG. 17. As a result, the foamed medium 110' is formed with a protrusion 115a having the shape of the foaming promotion layer 115 when viewed in a plan view.

Any foaming promoter may be used as long as it can promote the foaming of the foaming layer 112 at the heating temperature of the heating apparatus 151 of the heating machine 150 which will be described later. The principle based on which the foaming promoter promotes the foaming of the foaming component is not particularly limited. For example, as the foaming promoter, an agent that chemically promotes a chemical reaction required for foaming of the foaming component (chemical foaming promoter), or an endothermic agent that locally raises the temperature of an application portion can be used. For example, when the chemical foaming agent described above is used as the foaming component, a chemical foaming promoter such as a urea compound (e.g., urea) or a zinc compound can be used as the foaming promoter. When the microcapsules described above are used as the foaming component, an endothermic agent such as carbon black can be used as the foaming promoter. The foaming promoter may be decomposed or evaporated during heating of the foamable medium 110, and thus does not have a specific heat resistant temperature.

The foaming inhibition layer 116 is a layer containing a foaming inhibitor that inhibits foaming of the foaming layer 112 by heating. Therefore, when the foamed medium 110' is formed by heating the foamable medium 110 by the foaming machine 1100 which will be described later, the region of the foaming layer 112 where the foaming inhibition layer 116 is provided is positioned lower than the region where the foaming inhibition layer 116 is not provided, or is not raised at all, as shown in (b) of FIG. 17. As a result, the foamed medium 110' is formed with a recess 116a having the shape of the foaming inhibition layer 116 when viewed in a plan view.

Any foaming inhibitor may be used as long as it can inhibit the foaming of the foaming layer 112 at the temperature at which the foaming layer 112 is heated to foam. The principle based on which the foaming inhibitor inhibits the foaming of the foaming component is not particularly limited. For example, as the foaming inhibitor, a functional agent (chemical foaming inhibitor) that inhibits the action of a foaming aid that promotes the foaming of the foaming component, a heat radiating agent that locally lowers the temperature of the application portion, a decomposing agent that chemically or physically decomposes the foaming component, or the like can be used. When the chemical foaming agent described above is used as the foaming component, examples of usable foaming inhibitors include chemical foaming inhibitors such as benzotriazole-based compounds such as 1,2,3-benzotriazole, 1-[N,N-bis(2-ethylhexyl)aminomethyl]benzotriazole, 1-[N,N-bis(2-ethylhexyl)aminomethyl]methylbenzotriazole, and 2,2'-[[(methyl-1H-benzotriazol-1-yl)methyl]imino]bisethanol. When the microcapsules are used as the foaming component, a decomposing agent such as acetone, methyl ethyl ketone, ethyl butyl ketone, methanol, ethanol, ethyl acetate, γ-butyrolactone, ε-caprolactone, or dimethylformamide can be used as the foaming inhibitor. The foaming inhibitor preferably does not decompose or evaporate during heating of the foamable medium 110. The heat resistant temperature of the foaming inhibitor is desirably 210° C. or higher as measured by a thermogravimetric differential thermal analyzer (TG-DTA).

The image layer 117 is an ink layer that constitutes an image formed on the front surface of the foamable medium 110. The image layer 117 is inkjet-printed, for example, by an inkjet printer using each of C, M, Y and K inks (an aqueous ink in which a pigment is dispersed in water, a solvent pigment ink in which a pigment is dispersed in an organic solvent, an aqueous dye ink in which a dye is dissolved in water, a solvent dye ink in a dye is dissolved in an organic solvent, etc.). The image layer 117 may be printed through offset printing, gravure printing, screen printing, or the like.

The image layer 117 may be formed directly on, for example, the foaming layer 112, the foaming promotion layer 115, and/or the foaming inhibition layer 116 as shown in (a) and (b) of FIG. 17. Further, after formation of an undercoat layer with white ink or the like on the foaming layer 112, the foaming promotion layer 115, and/or the foaming inhibition layer 116, an image layer may be formed on the undercoat layer.

The image layer 117 may be formed over the foaming layer 112 and the foaming promotion layer 115 or the foaming inhibition layer 116. In this case, the paint for the image layer 117 may be a paint that imparts to the image layer 117 a breaking strength enough to cause deformation along the shape of the protrusion 115a or the recess 116a formed on the foamed medium 110' by the foaming promotion layer 115 or the foaming inhibition layer 116, as shown in (b) of FIG. 17. Further, the ink of the image layer 117 may be an ink that imparts to the image layer 117 a breaking strength enough to cause breakage at the boundary between the protrusion 115a or the recess 116a and the periphery, depending on the desired design.

The heat resistant temperature of the ink varies depending on the type. For example, an ink using a pigment as a coloring material has a heat resistant temperature of 250° C. or higher.

(Configuration of Foaming Machine 1100)

Figure 18:
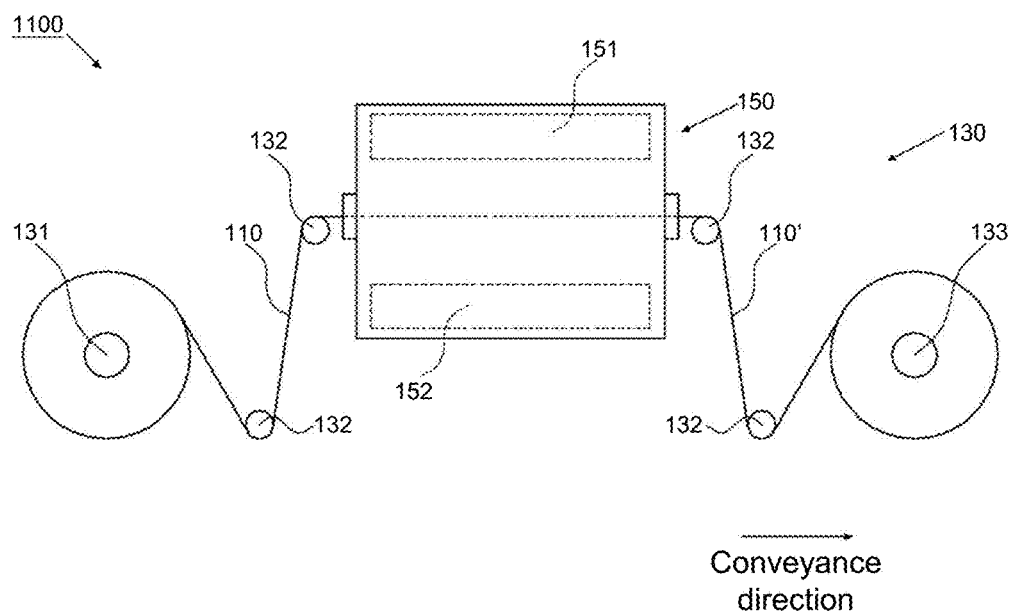
FIG. 18 is a schematic view of a foaming machine for a foamable medium according to a first embodiment of the present invention.

As shown in FIG. 18, the foaming machine 1100 includes the conveying apparatus 130 and the heating machine 150.

The conveying apparatus 130 carries the foamable medium 110 from outside the heating machine 150 into the heating machine 150, and carries the foamed medium 110' formed by heating the foamable medium 110 by using the heating apparatus 151 which will be described later to foam the foaming layer 112 out of the heating machine 150. The conveying apparatus 130 includes: a feed roller 131 for feeding a sheet of the foamable medium 110 from a roll of the foamable medium 110; one or more (for example, four) guide rollers 132 for appropriately changing the direction of the fed foamable medium 110 and conveying the foamable medium through the heating machine 150; and a winding roller 133 that winds the sheet of the foamed medium 110' conveyed by the guide rollers 132 in a roll shape. If the foamed medium 110' after heat expansion is compressed from the foaming layer 112 side before being cooled, the foaming layer 112 is hardened in a compressed state, so that the expansion of the foaming layer 112 of the foamed medium 110' will be inhibited. Further, if the foamable medium 110 is compressed from the foaming layer 112 side while being heated by the heating machine 150, the expansion of the foaming layer 112 of the foamed medium 110' after heat expansion will be similarly inhibited. Therefore, when the conveying apparatus 130 (for example, the guide rollers 132) conveys the foamable medium 110 during heating and after heat expansion, the conveying apparatus 130 is preferably configured not to compress the foamable medium 110 from the foaming layer 112 side (particularly, not to contact with the foaming layer 112) until the foamable medium 110 is subsequently cooled and reaches a temperature at which the shape of the foamable medium 110 becomes irreversible (particularly, while the foamable medium 110 is being heated by the heating machine 150).

The heating machine 150 includes the heating apparatus 151 and a cooling apparatus 152.

The heating apparatus 151 is disposed so as to face the foaming layer 112 of the foamable medium 110 conveyed into the heating machine 150 by the conveying apparatus 130, and is a heating apparatus that heats the foamable medium 110 from the foaming layer 112 side. As shown in (a) of FIG. 19, the heating apparatus 151 heats a heating region H over the entire width of the surface, on the heating apparatus 151 side, of the foamable medium 110. The heating apparatus 151 is a non-contact heating apparatus in which the heating portion of the heating apparatus 151 does not come into contact with the front surface of the foamable medium 110 (particularly, the foaming layer 112). Examples of the non-contact heating apparatus include a radiant heating apparatus (for example, an infrared heating apparatus such as an infrared heater), a microwave heating apparatus, a heating wire heater, and a hot air dryer. Any heating temperature (surface temperature of the surface to be heated) by the heating apparatus 151 may be employed as long as a suitable temperature gradient which will be described later can be formed.

The cooling apparatus 152 is disposed so as to face the mold release material 114 of the foamable medium 110 conveyed into the heating machine 150 by the conveying apparatus 130, and is a cooling apparatus that cools the foamable medium 110 from the mold release material 114 side. As shown in (a) of FIG. 19, the cooling apparatus 152 cools a cooling region C over the entire width of the surface of the foamable medium 110 on the cooling apparatus 152 side. The cooling apparatus 152 is a non-contact cooling apparatus in which the cooling portion of the cooling apparatus 152 does not come into contact with the front surface of the foamable medium 110 (particularly, the mold release material 114). Examples of the non-contact cooling apparatus include cooling fans (for example, an air-cooling cold air-agitating Peltier cooling fan, a water-cooling cold air-agitating Peltier cooling fan, and an air cooling fan). Any cooling temperature (surface temperature of the surface to be cooled) by the cooling apparatus 152 may be employed as long as a suitable temperature gradient which will be described later can be formed.

If only heating by the heating apparatus 151 is performed without cooling by the cooling apparatus 152, the heat given to the foaming layer 112 by the heating apparatus 151 due to the heating of the foamable medium 110 is transferred to the mold release material 114. Finally, the temperature of the mold release material 114 is increased, by heating, to an equivalent temperature to that of the foaming layer 112. Therefore, in the configuration in which the cooling apparatus 152 is omitted, the components (for example, the material for the base material 111, the pressure-sensitive adhesive, the mold release agent, etc.) of the layers other than the foaming layer 112 (for example, the base material 111, the pressure-sensitive adhesive layer 113, the mold release material 114, etc.) must be selected so that their heat resistant temperatures are lower than the foaming temperature required for foaming the foaming component of the foaming layer 112. As a result, options for the components of the layers other than the foaming layer 112 are extremely limited.

On the other hand, according to the foaming machine 1100 of the present embodiment described above, the foamable medium 110 is heated by the heating apparatus 151 from the foaming layer 112 side and cooled by the cooling apparatus 152 from the mold release material 114 side. Thus, in the foamable medium 110, a temperature gradient is formed in which the temperature gradually decreases from the foaming layer 112 side to the mold release material 114 side. Therefore, the heating temperature of the heating apparatus 151 (surface temperature of the surface to be heated (front surface of the foaming layer 112) of the foamable medium 110 being heated by the heating apparatus 151) and the cooling temperature of the cooling apparatus 152 (surface temperature of the surface to be cooled (front surface of the mold release material 114) of the foamable medium 110 being cooled by the cooling apparatus 152) are appropriately adjusted, so that a temperature gradient can be formed in which the temperature of the foaming layer 112 is not lower than the foaming temperature, and the temperatures of the other layers are lower than the heat resistant temperature of each of the layers. Therefore, the layers other than the foaming layer 112 (particularly, the pressure-sensitive adhesive layer 113 and/or the mold release material 114) can be cooled to a temperature lower than that at which the functionality thereof is not lost or deteriorated.

For example, the foaming temperature of the chemical foaming agent is as high as 120° C. or higher. In such a high temperature environment, the pressure-sensitive adhesive layer 113 made of a pressure-sensitive adhesive having a low heat resistant temperature, such as a rubber-based pressure-sensitive adhesive or an acrylic pressure-sensitive adhesive, has reduced adhesiveness, and, in the worst case, may lose its adhesiveness. Further, in a high temperature environment, the mold release material 114 having a mold release layer made of a mold release agent having a low heat resistant temperature has reduced mold releasability, becomes difficult to peel from the pressure-sensitive adhesive layer 113, and, in the worst case, loses its mold releasability, so that it will not be peeled from the pressure-sensitive adhesive layer 113.

As shown in FIG. 18, the heating machine 150 may further include a housing that covers the heating apparatus 151 and the portion to be heated of the foamable medium 110 in order to prevent heat dissipation to the outside of the heating machine 150 and increase the heating efficiency. Further, as shown in FIG. 18, the housing may further cover the cooling apparatus 152. Further, the heating machine 150 may further include a ventilation device for discharging a gas (particularly, a toxic gas) generated from the foamable medium 110 upon heating by the heating apparatus 151.

Effect of First Embodiment

In a conventional foaming machine for a foamable medium, even if the foamable medium is heated from only one side and not from the other side, both sides of the foamable medium are heated to the same extent, so options for the components of the layers other than the foaming layer of the foamable medium are extremely limited. In particular, when a chemical foaming agent is used as the foaming component, the foaming temperature is as high as 120° C. or higher, so options for the pressure-sensitive adhesive and the mold release agent are limited.

On the other hand, in the foaming machine 1100 for the foamable medium 110 according to the present embodiment, the foamable medium 110 is heated from the foaming layer 112 side and cooled from the mold release material 114 side, and thus a suitable temperature gradient can be formed in the foamable medium 110, in which the temperature of the foaming layer 112 is not lower than the foaming temperature, and the temperatures of the other layers are lower than the temperatures at which the components thereof do not lose their functionality. Therefore, according to the foaming machine 1100, it is possible to foam various foamable media 110, particularly, foamable media 110 in which the heat resistant temperatures of the components of the layers other than the foaming layer 112 are lower than the foaming temperature of the foaming component of the foaming layer 112, while maintaining the functionality of the components of the layers other than the foaming layer 112. These characteristics are particularly advantageous when the chemical foaming agent is used as the foaming component.

Further, since the cooling required to form a suitable temperature gradient in the foamable medium 110 can be performed also by a simple cooling apparatus such as a cooling fan, the configuration of the foaming machine 1100 can be simplified.

(Variation 1)

The foamable medium 110 is used in the first embodiment, but the medium to be foamed by the foaming machine 1100 is not limited thereto. Any foamable medium having the foaming layer 112, the pressure-sensitive adhesive layer 113, and the mold release material 114 can be used. For example, a layer other than the base material 111 may be interposed between the foaming layer 112 and the pressure-sensitive adhesive layer 113, or the base material 111 may be omitted. Further, a protective layer may be formed on the front surface of the foaming layer 112 by liquid lamination or the like.

(Variation 2)

Figure 19:
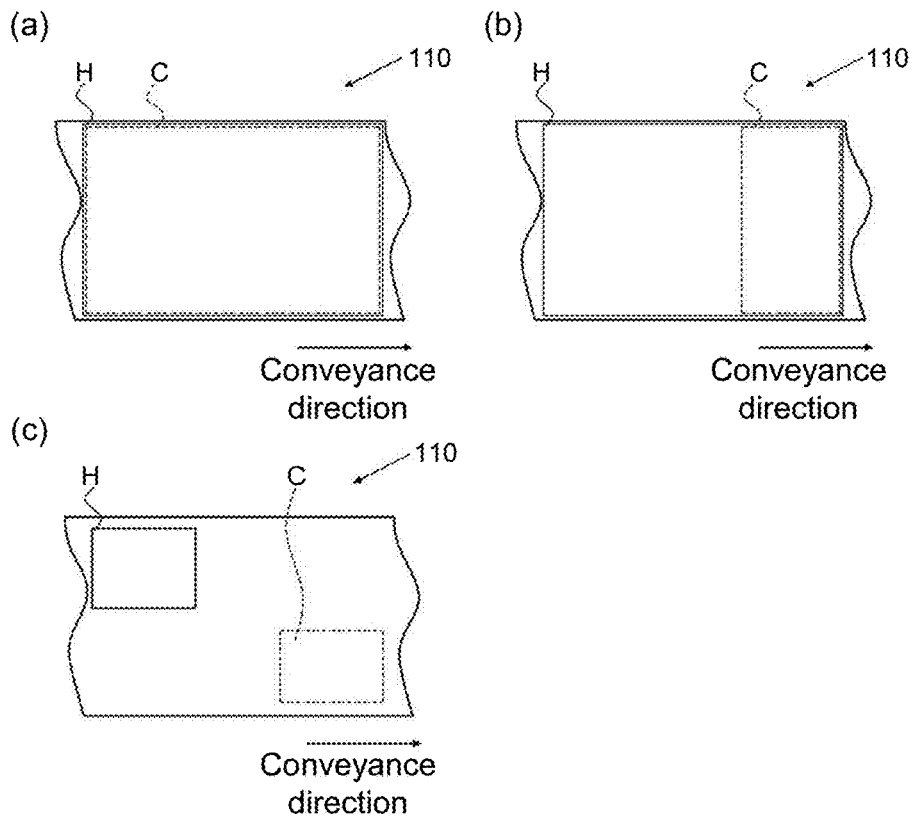
FIG. 19 is a schematic view showing a positional relationship between a heating region and a cooling region in the foamable medium in a heating machine.

In the first embodiment, as shown in (a) of FIG. 19, the heating apparatus 151 and the cooling apparatus 152 simultaneously heat and cool the back and front of the foamable medium 110 conveyed in the heating machine 150. However, as shown in (b) of FIG. 19, the heating region H may extend over the entire surface of the foamable medium 110, and the cooling region C may exist only in a part of the downstream side of the foamable medium 110 in the conveyance direction, in a plan view.

As shown in (a) and (b) of FIG. 19, even when the heating region H extends over the entire surface of the foamable medium 110, the foamable medium 110 is heated while being conveyed in a predetermined conveyance direction in the heating machine 150. Thus, the foamable medium 110 located on the upstream side of the heating machine 150 (on the left side of the paper in FIGS. 18 and 19) has a low temperature due to the short heating time, and the foamable medium 110 located on the downstream side of the heating machine 150 (on the right side of the paper in FIGS. 18 and 19) has a high temperature due to the long heating time. Therefore, if the temperature of the foamable medium 110 located in the region on the upstream side of the heating machine 150 is lower than the heat resistant temperature of a predetermined layer of the foamable medium 110, it is not necessary to perform cooling in the region.

According to this variation, the cooling apparatus 152 can be reduced in size, and, for example, the increase in size and number of the cooling fan can be prevented.

(Variation 3)

In the first embodiment, any positional relationship between the heating region H of the foamable medium 110 to be heated by the heating apparatus 151 and the cooling region C of the foamable medium 110 to be cooled by the cooling apparatus 152 may be employed as long as a suitable temperature gradient is formed within the foamable medium 110.

For example, if the thermal conductivity from the foaming layer 112 side to the mold release material 114 side is low and the temperature of the pressure-sensitive adhesive layer 113 or the mold release material 114 does not rise immediately even if the foaming layer 112 is heated, the heating region H and the cooling region C may not overlap with each other on the foamable medium 110 in a plan view, as shown in (c) of FIG. 19.

(Variation 4)

Figure 20:
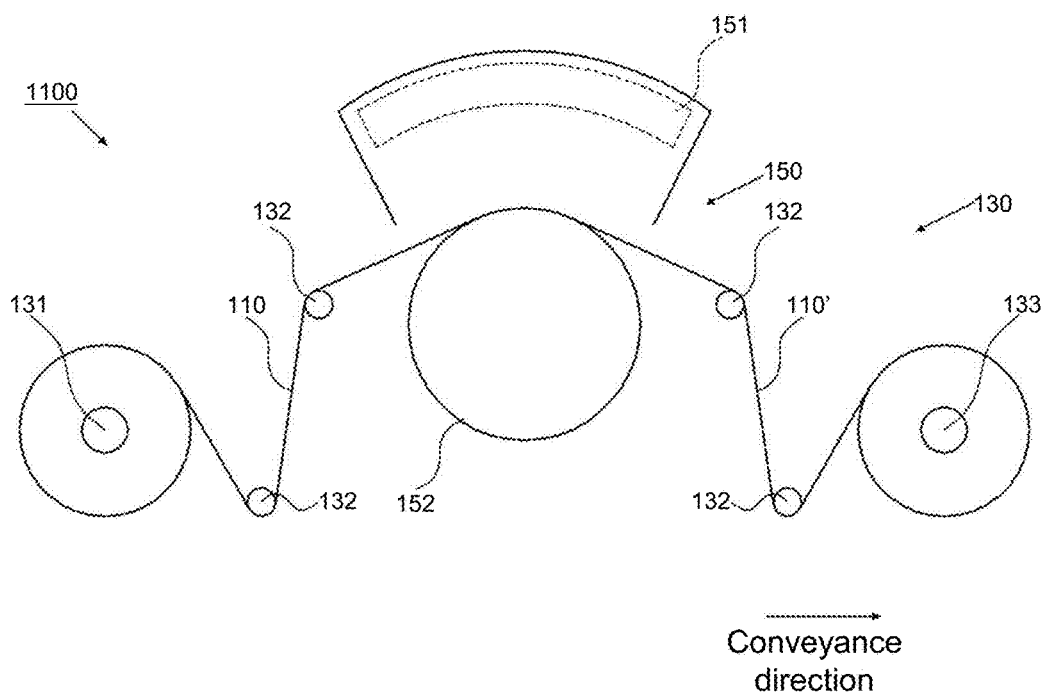
FIG. 20 is a schematic view of a foaming machine according to Variation 3.

In the first embodiment, a non-contact cooling apparatus is used as the cooling apparatus 152, but a contact cooling apparatus in which the cooling portion of the cooling apparatus 152 comes into contact with the front surface of the foamable medium 110 (particularly, the mold release material 114) may be used. Examples of such a contact cooling apparatus include cooling rollers (for example, water-cooling cooling rollers, thermoelectric cooling rollers, etc.) as shown in FIG. 20.

Second Embodiment

Figure 21:
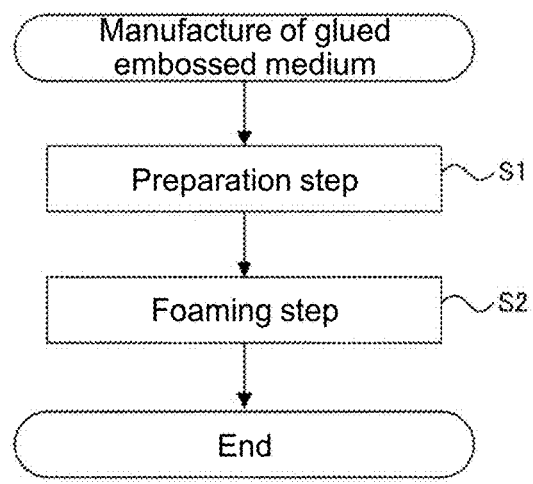
FIG. 21 is a flow diagram of a manufacturing method for a foamed medium according to a second embodiment of the present invention.

A manufacturing method for a foamed medium according to a second embodiment of the present invention will be described. In this manufacturing method, as shown in FIG. 21, a preparation step S1 and a foaming step S2 are mainly performed.

(Preparation Step S1)

The preparation step S1 involves preparing a foamable medium including: a foaming layer that foams by heating; a pressure-sensitive adhesive layer having pressure-sensitive adhesiveness; and a mold release material that is attached to the pressure-sensitive adhesive layer on a side opposite to the foaming layer across the pressure-sensitive adhesive layer, and can be peeled from the pressure-sensitive adhesive layer. Another layer such as a base material may be interposed between the foaming layer and the pressure-sensitive adhesive layer. For example, as such a foamable medium, the foamable medium 110 described in the first embodiment can be indicated.

(Foaming Step S2)

The foaming step S2 involves heating the foamable medium prepared in the preparation step S1 from the foaming layer side and cooling the foamable medium from the mold release material side to form a temperature gradient in which the temperature of the foaming layer is not lower than a foaming temperature and the temperature of the pressure-sensitive adhesive layer or the mold release material is lower than a temperature at which the pressure-sensitive adhesive layer or the mold release material loses its functionality, and foaming the foaming layer while maintaining the functionality of the pressure-sensitive adhesive layer or the mold release material. The foaming step S2 can be performed, for example, by heating and cooling the foamable medium 110 described above by the heating machine 150 described in the first embodiment.

As described above, a foamed medium in which the foaming layer is foamed can be formed. By peeling the mold release material from the back surface of the foamed medium and attaching it to a desired article, an article decorated with the foamed foaming layer can be obtained.

Effect of Second Embodiment

According to the second embodiment, the same effects as those of the first embodiment can be obtained.

(Variation 5)

In the manufacturing method according to the second embodiment, the foaming promotion layer, the foaming inhibition layer, and/or the image layer may be formed on the foamable medium after the preparation step S1 and before the foaming step S2. For example, when the foamable medium 110 is foamed, the foaming promotion layer 115, the foaming inhibition layer 116, and/or the image layer 117 may be formed on the foaming layer 112 as shown in (a) of FIG. 17. The foaming promotion layer 115 is an ink containing the foaming promoter described above; the foaming inhibition layer 116 is an ink containing the foaming inhibitor; and the image layer 117 is inkjet-printed by an inkjet printer using a color ink. The foaming promotion layer, the foaming inhibition layer, and/or the image layer may be printed by offset printing, gravure printing, screen printing, or the like.

(Variation 6)

In the manufacturing method according to the second embodiment, a protective layer may be formed on the front surface of the foaming layer of the foamable medium (including the foamed medium) before or after the foaming step S2. The protective layer can be formed, for example, by liquid lamination.

(Variation 7)

In the manufacturing method according to the second embodiment, the foamed medium may be cut into a desired shape after the foaming step S2. The foamed medium can be cut by a cutting apparatus such as a plotter.

(Variation 8)

In the manufacturing method according to the second embodiment, a cutting line (for example, a perforation or a slit extending from the foaming layer nearly to the mold release material) for breaking the foamable medium (including the foamed medium) into a desired shape may be provided before or after the foaming step S2. The foamable medium can be cut by a cutting apparatus such as a plotter.

(Variation 9)

The heating machine 150 according to the first embodiment can be used for forming a suitable temperature gradient in which the temperature gradually decreases from one side of a substantially flat medium to the other side thereof within the medium (for example, a temperature gradient in which the temperature of the other surface of the medium does not exceed a predetermined temperature due to the heating of one surface of the medium by the heating apparatus 151), in addition to the purpose of foaming the foamable medium 110.

For example, the heating machine 150 can be used when an attachment sheet such as a seal having a pressure-sensitive adhesive layer and a mold release material on its back is used instead of the foamable medium 110 and the front of the sheet is heated at a high temperature for sterilization or the like.

The characteristics described in the above-described embodiments and variations can be arbitrarily combined as long as they do not conflict with each other.

First Embodiment

A manufacturing apparatus 2100 for a foamed object according to the first embodiment of the present invention will be described with reference to the drawings. The manufacturing apparatus 2100 is a roll-to-roll manufacturing apparatus for a foamed object by foaming a foamable workpiece 10 after printing on the workpiece 10.

(Configuration of Foamable Workpiece 10)

The foamable workpiece 10 is a sheet-shaped workpiece (including a film which has an arbitrary thickness and is a thin sheet), and can be wound into a roll for storage and transportation. As shown in (a) of FIG. 22, the foamable workpiece 10 includes a base material 211 and a foaming layer 212 formed on one surface of the base material 211.

The base material 211 is a sheet made of any material. For example, examples of the material for the base material 211 include a paper, a cloth, and plastic. It is particularly preferable that the base material 211 have high water resistance and adhesiveness to the foaming layer 212 which will be described later. Examples of such a base material 211 include a nonwoven fabric sheet, a fleece sheet, and a porous film.

The foaming layer 212 is a thermoplastic resin layer that expands and increases in thickness, as compared with that before foaming, upon foaming of the foaming component in the layer by heating. Herein, the expansion of the foaming layer 212 by heating in this way is also referred to as "foaming" of the foaming layer 212. Further, the temperature at which the foaming component foams is also referred to as a foaming temperature.

The principle of foaming by heating is arbitrary, and, for example, a chemical foaming agent that generates a gas upon heating such as heat decomposition, or a thermoplastic resin microcapsule that encloses a volatile solvent that volatilizes and expands by heating can be used as the foaming component.

For example, examples of the chemical foaming agent described above include azodicarbonamide, N,N'-dinitrosopentamethylenetetramine, 4,4'-oxybis(benzenesulfonylhydrazide), and sodium hydrogencarbonate. In particular, azodicarbonamide is desirable.

Further, examples of the microcapsule described above include thermoplastic resin microcapsules in which a volatile organic solvent is encapsulated. Examples of the volatile organic solvent include petroleum ether, hydrocarbons (isobutane, pentane, hexane, heptane, etc.), low boiling point halogenated hydrocarbons, and methylsilane. Examples of the thermoplastic resin constituting the microcapsules include vinylidene chloride-acrylonitrile-based copolymers, acrylonitrile-based copolymers, acrylic acid ester-based copolymers, and methacrylate-based copolymers.

The thermoplastic resin as the main component of the foaming layer 212 is arbitrary as long as it conforms to the foaming principle of the foaming component and expands upon foaming of the foaming component. Examples of the thermoplastic resin include polyvinyl chloride resins, polyethylene resins, polypropylene resins, polyethylene-vinyl acetate copolymers (EVA), acrylic resins, and urethane resins. Further, it is preferable that the polyvinyl chloride resin be a resin based on a soft polyvinyl chloride containing a plasticizer which will be described later in combination.

The foaming layer 212 may further contain an additional component, depending on the foaming component. For example, when a chemical foaming agent is used as the foaming component, it is preferable to further blend, in the thermoplastic resin, a foaming aid that promotes foaming of the chemical foaming agent and lowers the foaming temperature. Examples of such a foaming aid include zinc compounds such as zinc stearate and barium compounds such as barium stearate.

(Configuration of Manufacturing Apparatus 2100)

Figure 23:
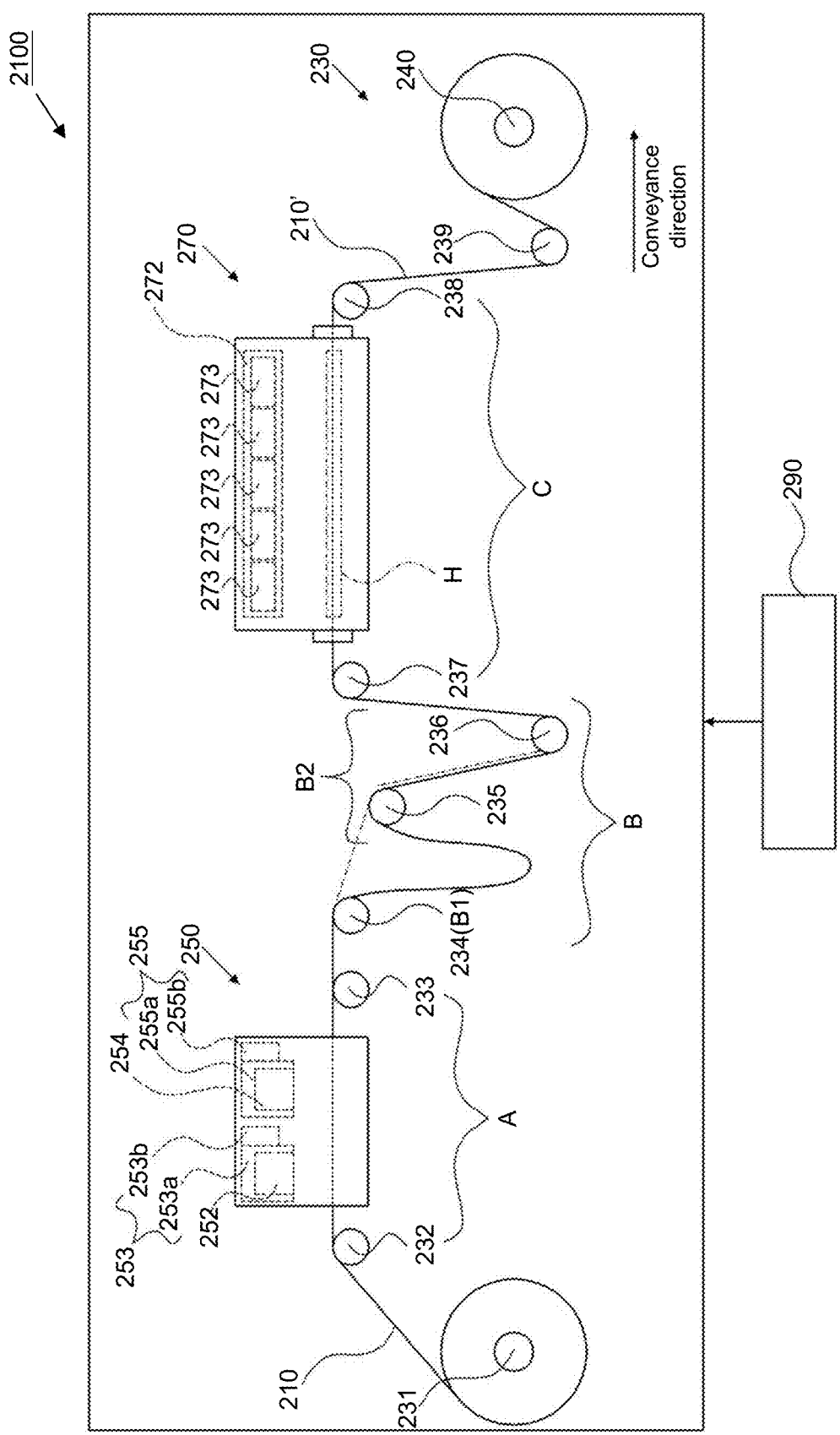
FIG. 23 is a schematic view of a manufacturing apparatus for a foamed object according to the first embodiment.

As shown in FIG. 23, the manufacturing apparatus 2100 includes a conveying apparatus 230, a printing apparatus 250, and a foaming apparatus 270. Further, the manufacturing apparatus 2100 also includes a control unit 290 for controlling the conveying apparatus 230, the printing apparatus 250 and the foaming apparatus 270. The operations of the conveying apparatus 230, the printing apparatus 250, and the foaming apparatus 270 which will be described below are performed under the control of the control unit 290. The conveying apparatus 230, the printing apparatus 250, and the foaming apparatus 270 may each be provided with a control unit for controlling the operation, and the control unit 290 may control the operation of each apparatus via each control unit.

(Conveying Apparatus 230)

The conveying apparatus 230 is an arbitrary roll-to-roll conveying apparatus that conveys the foamable workpiece 10 through the printing apparatus 250 and the foaming apparatus 270 along a predetermined conveyor path.

As shown in FIG. 23, for example, the conveying apparatus 230 includes: a feed roller 231 that feeds the foamable workpiece 10 from a raw material roll of the foamable workpiece 10; guide rollers 232 to 239 that appropriately change the direction of the fed foamable workpiece 10, and convey it through the printing apparatus 250 and the foaming apparatus 270; and a winding roller 240 that winds, as a product roll, the foamable workpiece 10 foamed by the foaming apparatus 270 (hereinafter, foamed workpiece 210'). Further, the conveying apparatus 230 includes: a drive motor (not shown) for rotating the feed roller 231; a drive motor (not shown) for rotating the winding roller 240; and a drive motor for rotating each of the guide rollers serving as driving rollers among the guide rollers 232 to 239 as will be described later (the control unit 290 controls the operation of the conveying apparatus 230 by controlling each drive motor).

Among the guide rollers 232 to 239, the guide rollers 232 and 233 constitute a conveyor mechanism A for the printing apparatus 250, and the guide rollers 234 to 236 constitute a slack holding device B which will be described later (the conveying apparatus 230 is provided with the slack holding device B). The guide rollers 237 and 238 constitute a conveyor mechanism C for the foaming apparatus 270.

As will be described later, the conveying apparatus 230 intermittently conveys the foamable workpiece 10 in a period from the time when the foamable workpiece 10 leaves the raw material roll until it is supplied to the slack holding device B. In a period from the time when the foamable workpiece 10 exits the slack holding device B until it enters the product roll, the conveying apparatus 230 continuously conveys the foamable workpiece 10 at a constant speed.

(Printing Apparatus 250)

Figure 22:
FIG. 22 is a schematic cross-sectional view of a foamable workpiece.
Figure 22:
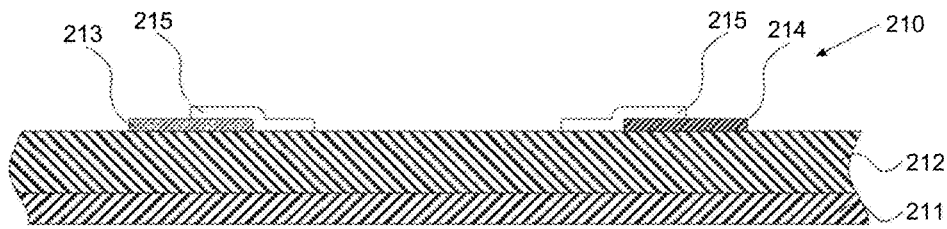
Figure 22:
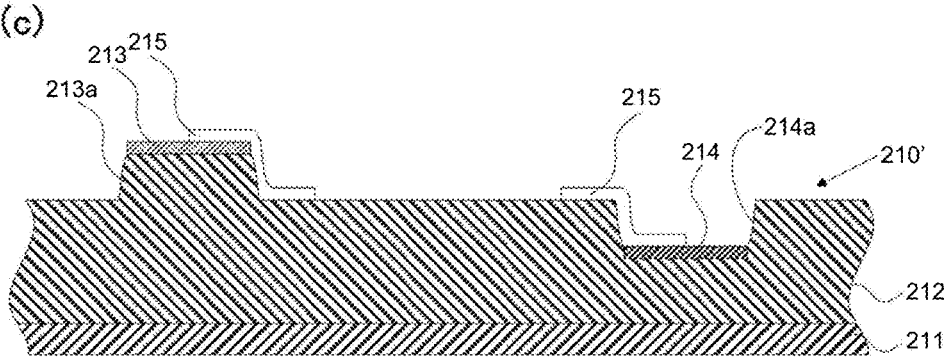

As shown in (b) of FIG. 22, the printing apparatus 250 is any roll-to-roll scanning inkjet printer that uses a foaming promotion ink, a foaming inhibition ink, and a coloring ink to print, on the foamable workpiece 10, a foaming promotion layer 213, a foaming inhibition layer 214, and an image layer 215.

In the case of printing on a workpiece with a scanning inkjet printer, steps are repeated of conveying the workpiece only by the printing width in the conveyance direction, and then stopping the conveyance of the workpiece, during which the print head is scanned along a direction (main scanning direction) perpendicular to the conveyance direction (sub scanning direction) to perform printing on the workpiece. Therefore, in the printing apparatus 250, the foamable workpiece 10 is intermittently conveyed. The influence of such intermittent conveyance is offset by a slack formed by the slack holding device B, as will be described later.

Further, for example, as the resolution of the image to be printed as the image layer 215 becomes higher, it is necessary to increase the number of passes accordingly. As the number of passes increases, the number of times of scanning of the print head at the same location increases, so that the time during which conveyance is stopped also increases, and finally, an average conveyance speed (printing speed) of the foamable workpiece 10 by the printing apparatus 250 (the length of the foamable workpiece 10 to be conveyed from the printing apparatus 250 by the end of printing, with respect to the time until the end of printing the image) is reduced. In this way, the printing speed changes according to the resolution of the image to be printed. The influence of such a change in printing speed is offset by both or one of the slack formed by the slack holding device B and the adjustment of the length of the heating region H of the foaming apparatus 270, as will be described later.

(Foaming Promotion Ink)

The foaming promotion ink is any ink for inkjet printing that contains a foaming promotion agent that promotes foaming of the foaming layer 212 by heating. The foaming promotion layer 213 is formed by the ink.

Any foaming promoter may be used as long as it can promote the foaming of the foaming layer 212 at the heating temperature of the foaming apparatus 270 which will be described later. The principle based on which the foaming promoter promotes the foaming of the foaming component is not particularly limited. For example, as the foaming promoter, an agent that chemically promotes a chemical reaction required for foaming of the foaming component (chemical foaming promoter), or an endothermic agent that locally raises the temperature of an application portion can be used. For example, when the chemical foaming agent described above is used as the foaming component, a chemical foaming promoter such as a urea compound (e.g., urea) or a zinc compound can be used as the foaming promoter. When the microcapsules described above are used as the foaming component, an endothermic agent such as carbon black can be used as the foaming promoter.

(Foaming Promotion Layer 213)

The foaming promotion layer 213 is a layer containing the foaming promoter described above. Therefore, when the foamable workpiece 10 is heated by the foaming apparatus 270 which will be described later to form the foamed workpiece 210', the region of the foaming layer 212 where the foaming promotion layer 213 is provided is raised higher than the region where the foaming promotion layer 213 is not provided, as shown in (c) of FIG. 22. As a result, the foamed workpiece 210' is formed with a protrusion 213a having the shape of the foaming promotion layer 213 when viewed in a plan view.

(Foaming Inhibition Ink)

The foaming inhibition ink is any ink for inkjet printing that contains a foaming inhibitor that inhibits foaming of the foaming layer 212 by heating. The foaming inhibition layer 214 is formed by the ink.

Any foaming inhibitor may be used as long as it can inhibit the foaming of the foaming layer 212 at the temperature at which the foaming layer 212 is heated to foam. The principle based on which the foaming inhibitor inhibits the foaming of the foaming component is not particularly limited. For example, as the foaming inhibitor, a functional agent (chemical foaming inhibitor) that inhibits the action of a foaming aid that promotes the foaming of the foaming component, a heat radiating agent that locally lowers the temperature of the application portion, a decomposing agent that chemically or physically decomposes the foaming component, or the like can be used. When the chemical foaming agent described above is used as the foaming component, examples of usable foaming inhibitors include chemical foaming inhibitors such as benzotriazole-based compounds such as 1,2,3-benzotriazole, 1-[N,N-bis(2-ethylhexyl)aminomethyl]benzotriazole, 1-[N,N-bis(2-ethylhexyl)aminomethyl]methylbenzotriazole, and 2,2'-[[(methyl-1H-benzotriazol-1-yl)methyl]imino]bisethanol. When the microcapsules are used as the foaming component, a solvent such as acetone, methyl ethyl ketone, ethyl butyl ketone, methanol, ethanol, ethyl acetate, γ-butyrolactone, ε-caprolactone, or dimethylformamide can be used as the foaming inhibitor.

(Foaming Inhibition Layer 214)

The foaming inhibition layer 214 is a layer containing the foaming inhibitor described above. Therefore, when the foamable workpiece 10 is heated by the foaming apparatus 270 which will be described later to form the foamed workpiece 210', the region of the foaming layer 212 where the foaming inhibition layer 214 is provided is raised lower than the region where the foaming inhibition layer 214 is not provided, or is not raised at all, as shown in (c) of FIG. 22. As a result, the foamed workpiece 210' is formed with a recess 214a having the shape of the foaming inhibition layer 214 when viewed in a plan view.

(Coloring Ink)

The coloring ink is a color ink that can be inkjet-printed. For example, as the coloring ink, an inkjet printer using each of C, M, Y and K inks (an aqueous ink in which a pigment is dispersed in water, a solvent pigment ink in which a pigment is dispersed in an organic solvent, an aqueous dye ink in which a dye is dissolved in water, a solvent dye ink in a dye is dissolved in an organic solvent, etc.) can be used.

(Image Layer 215)

The image layer 215 is an ink layer that constitutes an image formed on the front surface of the foamable workpiece 10 by the coloring inks described above.

The image layer 215 may be formed directly on, for example, the foaming layer 212, the foaming promotion layer 213, and/or the foaming inhibition layer 214 as shown in (b) and (c) of FIG. 22. Further, after formation of an undercoat layer with white ink or the like on the foaming layer 212, the foaming promotion layer 213, and/or the foaming inhibition layer 214, an image layer 215 may be formed on the undercoat layer.

The image layer 215 may be formed over the foaming layer 212 and the foaming promotion layer 213 or the foaming inhibition layer 214. In this case, the paint for the image layer 215 may be a paint that imparts to the image layer 215 a breaking strength enough to cause deformation along the shape of the protrusion 213a or the recess 214a formed on the foamed workpiece 210' by the foaming promotion layer 213 or the foaming inhibition layer 214, as shown in (c) of FIG. 22. Further, the ink of the image layer 215 may be an ink that imparts to the image layer 215 a breaking strength enough to cause breakage at the boundary between the protrusion 213a or the recess 214a and the periphery, depending on the desired design.

(Configuration Example of Printing Apparatus 250)

As shown in FIG. 23, for example, the printing apparatus 250 includes: an ink storage unit (not shown); an ink supply mechanism (not shown); a print head 252 for ejecting a foaming promotion ink and a foaming inhibition ink; a driving device 253 for the print head 252; and a print head 254 for ejecting a coloring ink; and a driving device 255 for the print head 254.

The printing apparatus 250 performs printing on the foamable workpiece 10 to be conveyed by the conveyor mechanism A for the printing apparatus 250 of the conveying apparatus 230. The conveyor mechanism A conveys the foamable workpiece 10 fed from the raw material roll along the conveyance direction (sub scanning direction). For example, the conveyor mechanism A is composed of the guide rollers 232 and 233 as described above, and at least the guide roller 233 is a driving roller. The guide roller 232 may be a driven roller or a driving roller.

The ink storage unit is composed of a plurality of tanks or bottles for storing the foaming promotion ink, the foaming inhibition ink, and the coloring ink, respectively, and supplies, via the ink supply mechanism, these inks to the corresponding print heads (to the print head 252 for the foaming promotion ink and the foaming inhibition ink, and to the print head 254 for the coloring ink).

The print head 252 for ejecting the foaming promotion ink and the foaming inhibition ink ejects the foaming promotion ink and the foaming inhibition ink to the foamable workpiece 10 by an inkjet method. Any inkjet method may be adopted for the print head 252, and is, for example, a piezo method or a thermal method. The print head 252 usually includes a plurality of nozzles for ejecting the inks, but may include only a single nozzle for each of the foaming promotion ink and the foaming inhibition ink. Further, the print head 252 may be a single print head or may be composed of a plurality of print heads.

The driving device 253 of the print head 252 moves the print head 252 in a direction (main scanning direction) orthogonal to the conveyance direction for the foamable workpiece 10. The driving device 253 includes, for example, a carriage 253*a* on which the print head 252 is mounted; a guide rail 253*b* that movably supports the carriage 253*a* in the main scanning direction; a set of towing cables for the carriage 253*a* disposed at the respective ends of the guide rail 253*b*; and a winding mechanism for winding the towing cables.

The print head 254 for ejecting the coloring ink ejects the coloring ink (for example, each of C, M, Y and K inks) to the foamable workpiece 10 by an inkjet method. Any inkjet method may be adopted for the print head 254, and is, for example, a piezo method or a thermal method. The print head 254 usually includes a plurality of nozzles for ejecting the inks, but may include only a single nozzle for each of the coloring inks. Further, the print head 254 may be a single print head or may be composed of a plurality of print heads.

The driving device 255 of the print head 254 moves the print head 254 in a direction (main scanning direction) orthogonal to the conveyance direction for the foamable workpiece 10. The driving device 255 includes, for example, a carriage 255*a* on which the print head 254 is mounted; a guide rail 255*b* that movably supports the carriage 255*a* in the main scanning direction; a set of towing cables for the carriage 255*a* disposed at the respective ends of the guide rail 255*b*; and a winding mechanism for winding the towing cables.

In the printing apparatus 250 of the above configuration example, the print head 252 for ejecting the foaming promotion ink and the foaming inhibition ink ejects the foaming promotion ink and the foaming inhibition ink to the foamable workpiece 10, and then the print head 254 for ejecting the coloring ink. As shown in (b) of FIG. 22, the coloring ink is ejected to form the foaming promotion layer 213, the foaming inhibition layer 214, and the image layer 215.

The example of (b) of FIG. 22 exemplifies the case where the foaming promotion layer 213, the foaming inhibition layer 214, and the image layer 215 are all formed on the foamable workpiece 10, but only two or one of these layers may be formed thereon, depending on the desired design.

(Slack Holding Device B)

The conveying apparatus 230 includes the slack holding device B. The slack holding device B conveys the foamable workpiece 10 in a slackened state from the printing apparatus 250 to the foaming apparatus 270. The slack holding device B includes a first conveyor mechanism B1 and a second conveyor mechanism B2.

The first conveyor mechanism B1 and the second conveyor mechanism B2 are disposed apart from each other so that they can support the foamable workpiece 10 in a slackened state, and are conveying apparatuses that can control the respective conveyance speeds independently. For example, in FIG. 23, the first conveyor mechanism B1 is composed of the guide roller 234, and the second conveyor mechanism B2 is composed of the guide rollers 235 and 236, respectively. The guide rollers 234 and 235 support the foamable workpiece 10 delivered to their upper side (on the upper side of the paper in FIG. 23) in a slackened state.

When the foamable workpiece 10 is placed in the conveying apparatus 230, the foamable workpiece 10 is placed in the slack holding device B in a state of being slackened in a predetermined amount. Then, the foamable workpiece 10 is conveyed so that the slack of the foamable workpiece 10 is maintained in the slack holding device B.

Specifically, when the foamable workpiece 10 is slackened by a first length in the slack holding device B at a certain point of time, the foamable workpiece 10 is intermittently fed by a second length from the printing apparatus 250 to the slack holding device B over a predetermined time after that point of time, and the foamable workpiece 10 is continuously fed by a third length from the slack holding device B to the foaming apparatus 270 at a constant speed, the foamable workpiece 10 is conveyed by the conveying apparatus 230 so that the state where the third length is equal to or less than the sum of the first length and the second length is maintained.

The first length is a length obtained by subtracting, from a length of the foamable workpiece 10 in a region (hereinafter, convey region) where the foamable workpiece 10 is conveyed in the slack holding device B (for example, a length of the foamable workpiece 10 shown by a solid line extending from the guide roller 234 to the guide roller 236 in FIG. 23), a length of the foamable workpiece 10 when passing through the convey region in the shortest distance (for example, a length of the foamable workpiece 10 shown by a long dashed short dashed line extending from the guide roller 234 to the guide roller 236 in FIG. 23). In FIG. 23, for convenience of visibility, the solid line and the long dashed short dashed line are shown shifted between the guide rollers 235 and 236, but actually match.

The conveyance speed (third length) of the foaming apparatus 270 is appropriately adjusted with respect to the printing speed (second length) of the printing apparatus 250 in the manner described above, so that, even if the foamable workpiece 10 is intermittently conveyed from the printing apparatus 250 or the printing speed of the printing apparatus 250 is different from the conveyance speed of the foaming apparatus 270, for example, because the conveyance speed of the printing apparatus 250 is changed, the influence can be absorbed and offset by the slack. Therefore, the intermittent conveyance by the printing apparatus 250 can be led to the continuous conveyance by the foaming apparatus 270, and printing and foaming can be continuously performed in a roll-to-roll system.

The first conveyor mechanism B1 conveys the foamable workpiece 10 at the same conveyance speed as that of the conveyor mechanism A for the printing apparatus 250 (that is, by the first length over a predetermined time).

The first conveyor mechanism B1 may be a conveyor mechanism that passively conveys the foamable workpiece 10 depending on the conveyor mechanism A. For example, the first conveyor mechanism B1 may be a guide roller 234 which is a driven roller. In this case, a conveyor mechanism (for example, a flat pedestal or a belt conveyor) that supports the foamable workpiece 10 so that the foamable workpiece 10 is not wrinkled between the guide roller 233 and the guide roller 234 is preferably provided between the guide roller 233 and the guide roller 234.

The first conveyor mechanism B1 may be a conveyor mechanism that is driven in conjunction with the conveyor mechanism A. For example, the first conveyor mechanism B1 may be the guide roller 234, which is a driving roller that is driven in conjunction with the conveyor mechanism A. When the guide roller 233 of the conveyor mechanism A is a driving roller, it may be used as the driving roller for the first conveyor mechanism B1, and the guide roller 234 may be omitted.

The second conveyor mechanism B2 conveys the foamable workpiece 10 at the same conveyance speed as that of the conveyor mechanism C for the foaming apparatus 270 (that is, by the third length over a predetermined time).

The second conveyor mechanism B2 may actively convey the foamable workpiece 10 independently of the conveyor mechanism C for the foaming apparatus 270. In this case, the second conveyor mechanism B2 is a driving mechanism that continuously sends out the foamable workpiece 10 at the same conveyance speed as that of the conveyor mechanism C for the foaming apparatus 270 (that is, only the third length over a predetermined time) which is a constant speed. For example, the second conveyor mechanism B2 is composed of the guide rollers 235 and 236, at least the guide roller 236 is a driving roller, and the guide roller 235 may be a driven roller or a driving roller.

Also, the second conveyor mechanism B2 may passively convey the foamable workpiece 10 dependently on the conveyor mechanism C for the foaming apparatus 270. In this case, the conveyor mechanism C for the foaming apparatus 270 continuously draws the foamable workpiece 10 from the second conveyor mechanism B2 at the same conveyance speed as that of the conveyor mechanism C for the foaming apparatus 270 (that is, only the third length over a predetermined time) which is a constant speed. For example, the second conveyor mechanism B2 may be composed of the guide rollers 235 and 236 which are driving rollers or driven rollers.

The slackened portion (hereinafter referred to as slack portion) of the foamable workpiece 10 between the first conveyor mechanism B1 and the second conveyor mechanism B2 applies tension to the foamable workpiece 10 that has been sent out from the first conveyor mechanism B1 and the foamable workpiece 10 to be sent to the second conveyor mechanism B2 due to its weight. Therefore, if the weight of the slack portion is sufficiently large, no slack or wrinkle occurs in the first conveyor mechanism B1 or a portion of the conveying apparatus 230 upstream thereof (for example, a region between the guide roller 233 and the guide roller 234), or the second conveyor mechanism B2 or a portion of the conveying apparatus 230 downstream thereof (for example, a region between the guide roller 235 and the guide roller 236). Assuming that the length of the foamable workpiece 10 that provides the minimum weight of the slack portion that provides such sufficient tension is a fourth length, if the third length is set so that the value obtained by subtracting the third length from the sum of the first length and the second length is equal to or greater than the fourth length, when the third length is set as described above, a suitable slack as described above is maintained.

In particular, since the length (and thus weight) of the slack portion can be maintained almost constant (for example, the fourth length described above), it is preferable that the conveyance speeds of the slack holding device B and the foaming apparatus 270 be set to be substantially equal to the printing speed of the printing apparatus 250, i.e., that the third length be set to be equal to the second length.

(Foaming Apparatus 270)

The foaming apparatus 270 heats and foams the foamable workpiece 10 to form the foamed workpiece 210' as shown in (c) of FIG. 22. The foaming apparatus 270 is provided with a heating machine 272.

The foaming apparatus 270 heats the foamable workpiece 10 sent out from the slack holding device B and conveyed by the conveyor mechanism C for the foaming apparatus 270 to foam the foamable workpiece 10. The conveyor mechanism C is a conveying apparatus that continuously conveys the foamable workpiece 10 sent out from the slack holding device B through the foaming apparatus 270 (heating region H to be heated by the heating machine 272 which will be described later) at a constant speed. The conveyance speed of the conveyor mechanism C is the same as the conveyance speed of the foamable workpiece 10 from the slack holding device B (that is, the third length over a predetermined time). The conveyor mechanism C actively conveys the foamable workpiece 10. For example, the conveyor mechanism C is composed of the guide rollers 237 and 238, and at least the guide roller 238 is a driving roller. In this case, the guide roller 237 may be a driven roller or a driving roller.

Figure 24:
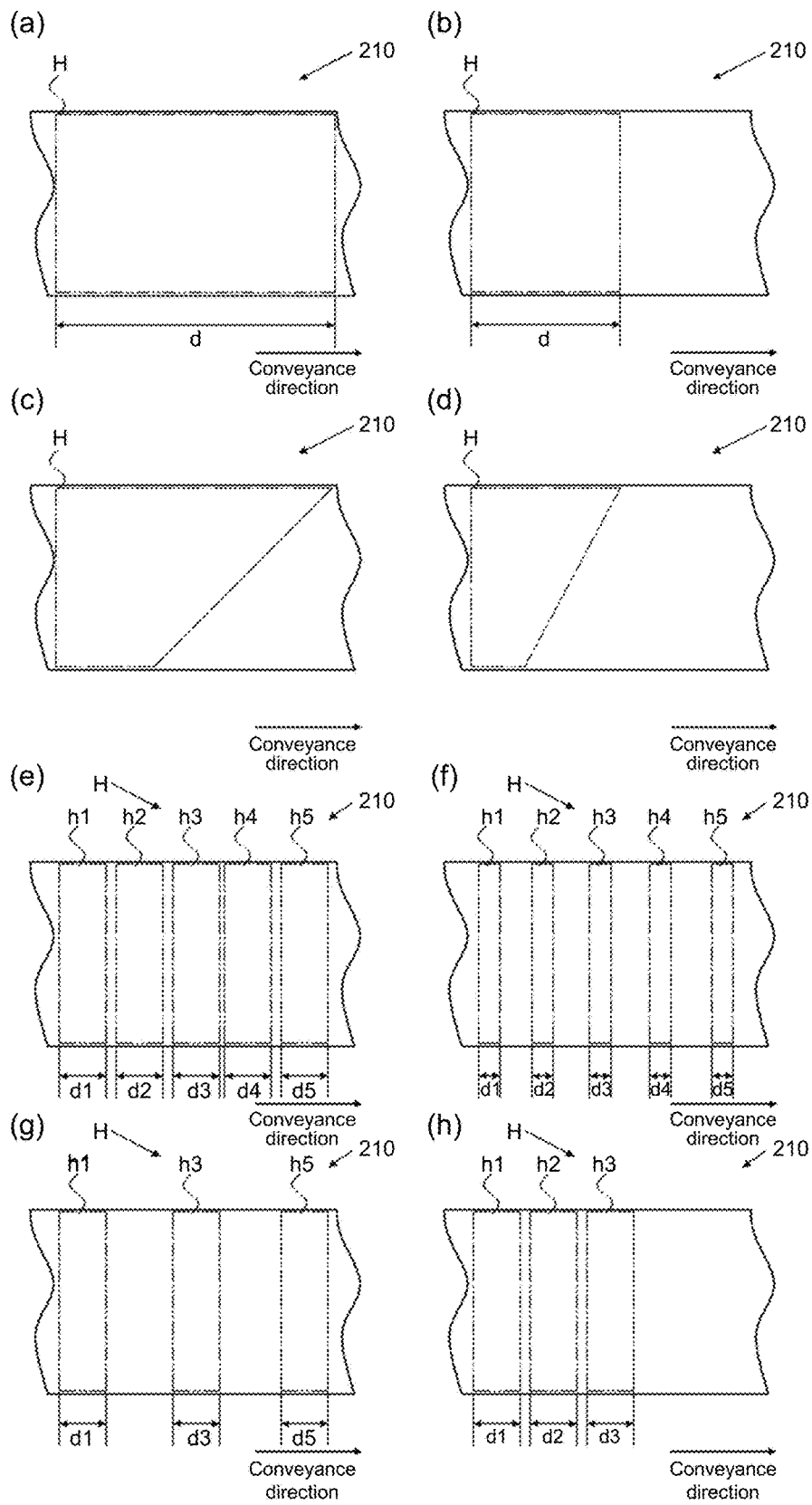
FIG. 24 is a schematic view showing a positional relationship between a heating region of a foaming apparatus and a foamable workpiece in the foaming apparatus in a plan view.

As shown in (a) of FIG. 24, the heating machine 272 is a roll-to-roll heating machine that heats and foams the foamable workpiece 10 in the predetermined heating region H extending over the entire width of the foamable workpiece 10 in a length d in a plan view. The heating machine 272 is configured so that the length d of the heating region H can be changed, and includes a changing apparatus (not shown) which is a changing device for this purpose.

For example, the heating machine 272 may be composed of a plurality of heating apparatuses 273 (five in FIG. 23). In this case, if all the heating apparatuses 273 are operated, a heating region H as shown in (a) of FIG. 24 is obtained. If only some (for example, three) of the heating apparatuses 273 on the printing apparatus 250 side are operated, a heating region H as shown in (b) of FIG. 24 can be obtained. The number of the heating apparatuses 273 to be operated can be changed by turning on/off switches of the respective heating apparatuses 273 manually or using the control unit 290. The changing device that changes the number of the heating apparatuses 273 to be operated is, for example, a manual switch or a switch circuit controlled by the control unit 290.

Assuming that the conveyance speed of the conveyor mechanism C is v, a time t at which a portion of the foamable workpiece 10 passes through the heating region H having the length d is expressed as $t=d/v$. Assuming that the thermal energy per unit time unit area applied to the heating region H by the heating machine 272 is i, a thermal energy Q per unit area received by a portion of the foamable workpiece 10 is expressed as Q=id/v. Even if the conveyance speed v is changed, if the thermal energy Q is not changed, the degree of foaming (thickness after foaming) of the foamable workpiece 10 can be made substantially constant, and, for this purpose, the length d of the heating region H may be defined as d=Qv/i. Actually, the relationship between the length d of the heating region H and the conveyance speed v of the conveyor mechanism C may deviate from the above equation due to factors such as heat dissipation of the foamable workpiece 10 and unevenness of the thermal energy i caused by conveyance. However, since both the parameters are generally in a proportional relationship, it is easy to obtain the relational expression in advance by routine work.

Therefore, based on the relational expression, the length of the heating region H is appropriately changed according to the conveyance speed (that is, the third length) of the conveyor mechanism C of the foaming apparatus 270 (for example, an appropriate number of the heating apparatuses 273 disposed continuously from the inlet side (the printing apparatus 250 side) or outlet side are operated), thereby making it possible to keep the degree of foaming of the foamable workpiece 10 by the foaming apparatus 270 substantially constant, even when the conveyance speed of the conveyor mechanism C of the foaming apparatus 270 is changed as the printing speed (that is, the second length) of the printing apparatus 250 is changed.

The heating machine 272 and the heating apparatus 273 are non-contact heating apparatuses in which their heating portion does not come into contact with the front surface of the foamable workpiece 10 (particularly, the foaming layer 212). Examples of the non-contact heating apparatus include a radiant heating apparatus (for example, an infrared heating apparatus such as an infrared heater), and a microwave heating apparatus.

(Control Unit 290)

The control unit 290 controls each of the conveying apparatus 230, the printing apparatus 250, and the foaming apparatus 270 so that the apparatuses perform the above operations.

The control unit 290 is configured to include: a storage device (a hard disk, a flash memory, etc.) for storing programs and various data; a processor (e.g., a CPU (Central Processing Unit)) that executes the programs stored in the storage device and actually executes the printing process by using the various data; a main memory for the processor; and various interfaces. The control unit 290 has only to be composed of various computers such as a personal computer.

(Manufacturing Method for Foamed Object)

Prior to the control unit 290 manufacturing the foamed object, the foamable workpiece 10 is placed in the conveying apparatus 230. The foamable workpiece 10 may be placed in the slack holding device B with a predetermined amount of slack, or may be placed without any slack. When the foamable workpiece 10 is placed in the slack holding device B without slack, the control unit 290 operates the driving rollers of the first conveyor mechanism B1 and/or the conveyor mechanism A while stopping, for example, the driving rollers of the second conveyor mechanism B2 and/or the conveyor mechanism C, so that the foamable workpiece 10 is slackened between the first conveyor mechanism B1 and the second conveyor mechanism B2.

After that, the control unit 290 conveys the foamable workpiece 10 to the conveying apparatus 230 along the conveyor path, and, in the process, causes the printing apparatus 250 to perform printing on the foamable workpiece 10 in the printing region of the conveyor path, and then causes the foaming apparatus 270 to heat the foamable workpiece 10 in the heating region of the conveyor path to foam the foamable workpiece 10.

With regard to the conveyance of the foamable workpiece 10 in the printing region, the control unit 290 controls the guide roller 233, which is the driving roller of the conveyor mechanism A, to intermittently convey the foamable workpiece 10 in the printing region along the sub scanning direction (conveyance direction) according to the situation of printing by the printing apparatus 250. For example, when the printing apparatus 250 scans the print heads (for example, the print head 252 for ejecting the foaming promotion ink and the foaming inhibition ink, and the print head 254 for ejecting the coloring ink) along the main scanning direction, the control unit 290 stops the guide roller 233 of the conveyor mechanism A to interrupt the conveyance of the foamable workpiece 10 in the printing region. When the scanning and the ink ejection associated therewith are completed, the control unit 290 drives the guide roller 233 of the conveyor mechanism A and conveys the foamable workpiece 10 in the printing region along the sub scanning direction by the printing width.

With regard to the convey of the foamable workpiece 10 in the heating region, the control unit 290 controls the guide roller 238, which is the driving roller of the conveyor mechanism C, to continuously convey the foamable workpiece 10 in the heating region along the conveyance direction at a constant speed.

With regard to the conveyance of the foamable workpiece 10 by the slack holding device B, the control unit 290 control the conveying apparatus 230 (in particular, the conveyor mechanism A of the printing apparatus 250, the first conveyor mechanism B1 and the second conveyor mechanism B2 of the slack holding device B, and the conveyor mechanism C for the foaming apparatus 270) to maintain the slack of the foamable workpiece 10 in the slack holding device B.

Specifically, assuming that the foamable workpiece 10 is slackened by a first length in the slack holding device B at the start of manufacture of the foamed object or at a certain point of time during the manufacture, that the foamable workpiece 10 is intermittently fed by a second length from the printing apparatus 250 to the slack holding device B over a predetermined time after that point of time, and that the foamable workpiece 10 is continuously fed by a third length from the slack holding device B to the foaming apparatus 270 at a constant speed, the control unit 290 sets the third length to be equal to or less than the sum of the first length and the second length. The control unit 290 may set the third length at the start of the manufacture of the foamed object, periodically during the manufacture of the foamed object, or continuously during the manufacture of the foamed object.

This setting of the third length will be described in more detail below with specific examples. As described above, the number of passes required varies depending on the resolution of the image to be printed as the image layer 215, whereby the scheduled printing speed of the image (length of the foamable workpiece 10 to be conveyed from the printing apparatus 250 by the end of printing the image with respect to the scheduled time until the end of the printing) also varies. For example, if JV-300 (manufactured by Mimaki Engineering Co., Ltd.) is adopted as the printing apparatus 250, the relationship between the images A to C having different resolutions and the number of passes and scheduled printing speed when these images are printed is as follows.

TABLE 3

|  | Image A | Image B | Image C |
|---|---|---|---|
| Resolution | 720 × 1440 dpi | 540 × 720 dpi | 360 × 360 dpi |
| Number of passes | 24 | 8 | 2 |
| Scheduled printing speed | About 3.3 m/h | About 10 m/h | About 30 m/h |

In the case where the images A to C having different resolutions are alternately and continuously printed on the same foamable workpiece 10 along the length direction (conveyance direction) (for example, A→B→C→A→B→C→A . . . ), if the constant conveyance speed of the conveyor mechanism C for the foaming apparatus 270 is set to be equal to the scheduled printing speed of the image A (or B, C), irrespective of the type of image printed in the region of the foamable workpiece 10 present in the foaming apparatus 270, during printing of the image A (or B or C) by using the printing apparatus 250, the length of the foamable workpiece 10 sent into the slack holding device B and the length of the foamable workpiece 10 sent out from the slack holding device B are balanced within the period of printing the image. Thus, the length of the slack in the slack holding device B is maintained substantially constant.

When the above method is adopted, the control unit 290 receives the image data on and resolution of the images A to C to be printed, and determines the scheduled printing speed by a well-known method. For example, the control unit 290 obtains the number of passes from the resolution, referring to a table in which the resolution is associated with the number of passes suitable for printing at the resolution, and then obtains the scheduled printing speed from the number of passes, referring to the table in which the number of passes is associated with the scheduled printing speed when the number of passes is adopted, to determine the scheduled printing speed from the resolution. After that, when the manufacture of the foamed object is started, the control unit 290 controls the printing apparatus 250 and the conveyor mechanism A under the conditions according to the image data on and resolution of the images A to C to be printed to print the images. As a result, the foamable workpiece 10 is intermittently conveyed in the printing region at the same average conveyance speed as the above-described scheduled printing speed corresponding to the image being printed. On the other hand, the control unit 290 controls the foaming apparatus 270 and the conveyor mechanism C to continuously convey the foamable workpiece 10 in the heating region at a constant conveyance speed that is the same as the scheduled printing speed of the image being printed. In this case, the length of the foamable workpiece 10 sent into the slack holding device B and the length of the foamable workpiece 10 sent out from the slack holding device B are balanced, so that the length of the slack in the slack holding device B is maintained almost constant. Also, no matter how the predetermined time is set, the second length=the third length, so the third length is always less than or equal to the sum of the first length and the second length.

Assuming that images A to C are printed alternately as described above, when it takes 30 minutes to print each of the images A to C, the amount of slack (first length) in the slack holding device B is 12 m, and the conveyance speed of the conveyor mechanism C for the foaming apparatus 270 is 20 m/h, in the first printing of the image A, the printed foamable workpiece 10 of about 1.7 m is sent out from the conveyor mechanism A, and the foamable workpiece 10 of 10 m is sent into the conveyor mechanism C. Thus, the amount of slack is 3.7 m. In the printing of the next image B, the printed foamable workpiece 10 of 5 m is sent out from the conveyor mechanism A, and the foamable workpiece 10 of 10 m is sent into the conveyor mechanism C. Since the total length (5+3.7=8.7 m) of the length sent into the slack holding device B and the length of slack is smaller than the length (10 m) sent out from the slack holding device B, a defect occurs in conveyance if no measure is taken. Here, when the conveyance speed of the conveyor mechanism C for the foaming apparatus 270 is set to be equal to the scheduled printing speed of the image B, the defect in conveyance can be eliminated. At this time, in the printing of the image B, the printed foamable workpiece 10 of 5 m is sent out from the conveyor mechanism A, and the foamable workpiece 10 of 5 m is sent into the conveyor mechanism C. Thus, the amount of slack remains 3.7 m. After that, in the printing of the image C, the printed foamable workpiece 10 of 15 m is sent out from the conveyor mechanism A, and the foamable workpiece 10 of 5 m is sent into the conveyor mechanism C. Thus, the amount of slack becomes 13.7 m. As described above, the slack in the slack holding device B can be maintained also by periodically monitoring the amount of slack consumed and adjusting the conveyance speed of the conveyor mechanism C for the foaming apparatus 270.

When the above method is adopted, the control unit 290 determines whether $c \times t > a + b \times t$, from the current slack length a, the scheduled printing speed b of the image being printed, and the current conveyance speed c of the conveyor mechanism C for the foaming apparatus 270, every predetermined time t and every time the image to be printed changes. Here, a corresponds to the first length, $b \times t$ corresponds to the second length, and $c \times t$ corresponds to the third length. If $c \times t > a + b \times t$, c is set to $a \div t + b$ or less (for example, b). On the other hand, if $c \times t \leq a + b \times t$, the current c is maintained. By virtue of the above procedures, the slack length a is 0 or more in the slack holding device B until at least the predetermined time t elapses, so that the slack can be maintained.

Further, if the predetermined time t is shortened to, for example, 10 seconds or 1 second, the third length can be set substantially continuously.

As described above, a foamed object formed of the foamed workpiece 210' to can be manufactured from the foamable workpiece 10 in a roll-to-roll system.

Effect of First Embodiment

In a conventional roll-to-roll manufacturing apparatus that manufactures a foamed object by foaming the workpiece after printing on the foamable workpiece, in order to apply the printing process and the foaming process to the foamable workpiece in a roll-to-roll system, it is necessary to continuously convey the foamable workpiece at the same speed in both the processes. When the printing process is performed by using a scanning printer, the workpiece is intermittently conveyed in the scanning printer. Therefore, the workpiece is also intermittently conveyed in the foaming process following the printing process. In this case, if the foaming process is performed while the workpiece is intermittently conveyed, it becomes difficult to uniformly heat the workpiece in the length direction, so that problems such as uneven foaming may occur.

On the other hand, in the manufacturing apparatus 2100 according to the first embodiment, by forming the slack of the foamable workpiece 10 in the slack holding device B or adjusting the length of the heating region H of the foaming apparatus 270, it is made possible to perform heating for foaming while continuously conveying the foamable workpiece 10 at a constant speed, simultaneously with printing by a scanning printer. As a result, uniform heating of the workpiece in the length direction is ensured, and defects such as uneven foaming can be prevented.

In addition, in the scanning printer, the number of passes is changed according to the resolution (for example, when low resolution is acceptable, printing is performed with a low number of passes (for example, 1 pass), and when high resolution is required, printing is performed with a high number of passes (for example, 24 passes)), so that the resolution and printing speed can be optimized. In the manufacturing apparatus 2100 according to the first embodiment, even when the printing speed (conveyance speed) is changed according to the resolution of the image, the influence is offset by adjusting the formation of the slack of the foamable workpiece 10 in the slack holding device B or the length of the heating region H of the foaming apparatus 270, so that the resolution and the printing speed can be optimized, for example, the printing speed is increased at a low resolution. This is advantageous in that the time required for the entire manufacturing process can be shortened by optimizing the printing speed according to the resolution of each image, for example, when high-resolution images and low-resolution images are mixedly printed on the same foamable workpiece 10 (for example, alternately along the conveyor path). Therefore, according to the manufacturing apparatus 2100, a plurality of types of images can be efficiently printed continuously together using a single raw material roll in a roll-to-roll system, so that a plurality of types of small-lot foamed objects can be manufactured efficiently.

(Variation 1)

In the first embodiment, the foamable workpiece 10 is used, but the workpiece to be foamed by the manufacturing apparatus 2100 is not limited to this, and any sheet-shaped foamable workpiece may be employed as long as it includes a foaming layer 212 and is continuous over the conveyor path of a series of processing steps (for example, printing and foaming).

For example, the base material 211 may be omitted in the foamable workpiece 10. Further, a protective layer may be formed on the front surface of the foaming layer 212 by liquid lamination or the like.

Further, the foamable workpiece 10 may not be supplied from the raw material roll or may not be rolled up as a product roll.

(Variation 2)

In the first embodiment, the resolution and the printing speed are optimized by both forming the slack of the foamable workpiece 10 in the slack holding device B and adjusting the length of the heating region H of the foaming apparatus 270. However, such optimization can also be performed by only one of them.

For example, if the length of the slack can be sufficiently long in the slack holding device B, a roll-to-roll conventional foaming apparatus is used instead of the foaming apparatus 270, and the slack of the foamable workpiece 10 is formed in the slack holding device B, so that, even if the printing speed of the printing apparatus 250 fluctuates, the conveyance speed of the foaming apparatus 270 can be maintained constant regardless of the printing speed. Therefore, as in the first embodiment, it is possible to optimize the printing speed according to the resolution.

Further, for example, if the stop period in the intermittent conveyance of the foamable workpiece 10 by the printing apparatus 250 is sufficiently short, only a small slack can be formed. If a small slack is formed, the small slack can be maintained without any trouble as in the slack holding device B also by using a conventional roll-to-roll conveying apparatus (for example, two guide rollers) instead of the slack holding device B. In other words, the conventional conveying apparatus also functions in the same manner as the slack holding device B for a small slack. Therefore, in this case, even if the slack holding device B is omitted, the printing speed of the printing apparatus 250 and the conveyance speed of the foaming apparatus 270 can be made substantially equal by adjusting the length of the heating region H of the foaming apparatus 270. Therefore, as in the first embodiment, it is possible to optimize the printing speed according to the resolution.

(Variation 3)

In the first embodiment, instead of the printing apparatus 250, any printing apparatus that performs printing while intermittently conveying the foamable workpiece 10 may be used.

For example, the printing apparatus 250 prints the foaming promotion ink, the foaming inhibition ink, and the coloring ink, but a printing apparatus that prints only one or two types of these inks may be used, or, instead of these inks or in addition to these inks, a printing apparatus that prints other functional inks may be used. Examples of such functional inks include inks containing an antibacterial agent, a deodorant, a fungicide, a water repellent, an antifouling agent, a flame retardant, and the like.

Further, for example, instead of the printing apparatus 250, a printing apparatus other than the inkjet printer, for example, a thermal printing apparatus, a screen printing apparatus, a dispenser printing apparatus, or the like may be used. Even such a printing apparatus, if performing printing while intermittently conveying the foamable workpiece, has benefits obtained by the slack holding device B or the foaming apparatus 270 described above.

(Variation 4)

In the first embodiment, another processing apparatus that performs processing other than printing may be displaced instead of the printing apparatus 250, or the processing apparatus may be disposed downstream of the printing apparatus 250 and upstream of the slack holding device B. Alternatively, the processing apparatus may be disposed upstream of the printing apparatus 250.

Such processing apparatuses include preprocessing apparatuses, postprocessing apparatuses, coating apparatuses (e.g., liquid lamination devices), cutting apparatuses, and additional foaming apparatuses (e.g., pre-foaming apparatuses).

The processing apparatus is an apparatus that performs processing while intermittently conveying the foamable workpiece 10 when it is disposed instead of the printing apparatus 250. When it is disposed upstream or downstream of the printing apparatus 250, it may be an apparatus that performs processing while continuously conveying the foamable workpiece 10 at a constant speed, or an apparatus that performs processing while intermittently conveying the foamable workpiece 10.

When a processing apparatus that intermittently conveys the foamable workpiece 10 is disposed upstream or downstream of the printing apparatus 250, it is preferable to additionally dispose the slack holding device B between the printing apparatus 250 and the processing apparatus.

Further, when a processing apparatus that intermittently conveys the foamable workpiece 10 is disposed downstream of the printing apparatus 250, a printing apparatus that performs printing while continuously conveying the foamable workpiece 10 at a constant speed (for example, line inkjet printer) may be used, instead of the printing apparatus 250.

According to this variation, the foamable workpiece 10 that has undergone both the printing process and any other process or only any other process is intermittently conveyed toward the slack holding device B, and, as in the first embodiment, this intermittent conveyance is converted by the slack holding device B into continuous conveyance at a constant-speed toward the foaming apparatus 270. As a result, the workpiece can be continuously foamed while the workpiece is subjected to processing that involves intermittent conveyance, such as cutting.

(Variation 5)

In the first embodiment, the heating region H is rectangular, but the shape of the heating region H may be any other shape depending on the desired design. Also in this case, the length of the heating region H can be appropriately changed according to the conveyance speed (third length over a predetermined time) of the conveyor mechanism C of the foaming apparatus 270, thereby making it possible to keep substantially constant the degree of foaming of the foamable workpiece 10 by the foaming apparatus 270, even if the conveyance speed of the conveyor mechanism C of the foaming apparatus 270 is changed due to the change in printing speed (second length over a predetermined time) of the printing apparatus 250.

For example, as shown in (c) of FIG. 24, the shape of the heating region H is long in the vicinity of one edge of the foamable workpiece 10 (in (c) of FIG. 24, the edge of the foamable workpiece 10 on the upper side of the paper surface) and short in the vicinity of the other edge (in (c) of FIG. 24, the edge of the foamable workpiece 10 on the lower side of the paper surface). In this heating region H, a gradation of foaming thickness is formed in which the foamable workpiece 10 is foamed thickly in the vicinity of one edge and foamed thinly in the vicinity of the other edge. Also in this case, as shown in (d) of FIG. 24, the shape of the heating region H is contracted or, conversely, expanded at a constant rate along the conveyance direction, so that, even if the printing speed of the printing apparatus 250 fluctuates, the gradation of foaming thickness described above can be maintained. Such a change in shape of the heating region H can be performed, for example, by disposing a changing device, such as a filter having a hole having a shape similar to the shape, on a heat-irradiation surface of the heating machine 272 (particularly, a radiant heating apparatus) manually or automatically under the control of the control unit 290 (for example, by rotating a rotating plate provided with a plurality of filters having holes different in shape manually or by using a motor controlled by the control unit 290).

Further, for example, as shown in (e) of FIG. 24, the shape of the heating region H may be composed of a plurality of (five in (e) of FIG. 24) sub heating regions h1 to h5. In this case, as shown in (f) of FIG. 24, lengths d1 to d5 of the respective sub heating regions h1 to h5 are decreased or increased along the conveyor path to keep the degree of foaming of the foamable workpiece 10 by the foaming apparatus 270 substantially constant. The lengths d1 to d5 of the sub heating regions h1 to h5 can be changed, for example, by adopting an infrared heater as the heating apparatus 273 and changing the radiation width of each infrared heater. The radiation width can be changed by manually changing the shape or inclination of a radiation plate, which is the changing device, or by controlling a driving unit that changes the shape or inclination of the radiation plate by the control unit 290.

Further, the degree of foaming of the foamable workpiece 10 by the foaming apparatus 270 can be kept substantially constant by decreasing or, conversely, increasing the number of effective sub heating regions h1 to h5, for example, by making the sub heating regions alternately effective as shown in (g) of FIG. 24, or making only some of the sub heating regions continuously effective as shown in (h) of FIG. 24, instead of changing the lengths d1 to d5 of the sub heating regions h1 to h5. The number of such effective sub heating regions h1 to h5 can be increased or decreased by increasing or decreasing the number of heating apparatuses 273 to be operated. As explained in the first embodiment, the number of the heating apparatuses 273 to be operated can be changed, for example, by a manual switch or a changing device such as a switch circuit controlled by the control unit 290.

In order to inhibit the influence of heat dissipation, it is preferable that the intervals between the sub heating regions h1 to h5 be short. In addition, when the lengths d1 to d5 of the respective sub heating regions h1 to h5 are changed or the number of effective sub heating regions h1 to h5 is increased or decreased, in order to inhibit the influence of heat dissipation, it is preferable to maintain the intervals between the respective sub heating regions h1 to h5.

Second Embodiment

Figure 25:
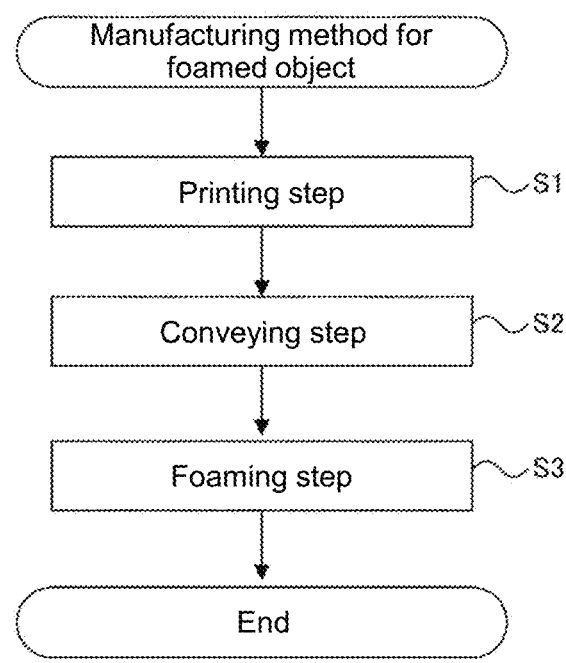
FIG. 25 is a flow diagram of a manufacturing method for a foamed object according to the second embodiment.

A manufacturing method for a foamed object according to the second embodiment of the present invention will be described. This manufacturing method is a manufacturing method involving performing printing on a foamable workpiece 10 and then foaming the foamable workpiece 10 to manufacture a foamed object. In this manufacturing method, as shown in FIG. 25, a printing step S1, a conveying step S2, and a foaming step S3 are mainly performed in the process of conveying a sheet-shaped workpiece to be foamed by heating along a conveyor path.

(Workpiece)

The sheet-shaped workpiece that foams by heating is continuous over the conveyor path from the printing step S1 to the foaming step S3, and the printing step S1 to the foaming step S3 are simultaneously performed on one sheet of workpiece. The workpiece includes a thermoplastic resin layer that expands and increases in thickness, as compared with that before foaming, upon foaming of a foaming component in the layer heated to a foaming temperature or higher. For example, the foamable workpiece 10 described in the first embodiment can be indicated as such a workpiece.

(Printing Step S1)

In the printing step S1, printing is performed on the workpiece while intermittently conveying the sheet-shaped workpiece that foams by heating.

The printing step S1 can be performed by using an arbitrary printing apparatus that performs printing while intermittently conveying the sheet-shaped workpiece that foams by heating. For example, examples of such a printing apparatus include the printing apparatus 250 described in the first embodiment and various printing apparatuses described in Variation 3.

(Conveying Step S2)

In the conveying step S2, the workpiece printed in the printing step S1 is conveyed in a slackened state.

When the printing step S1, the conveying step S2, and the foaming step S3 are performed, over a predetermined time, from a state where the workpiece is slackened by the first length in the conveying step S2; in the printing step S1, the workpiece is conveyed by the second length over the predetermined time described above; and the workpiece is conveyed by the third length over the predetermined time described above in the foaming step S3, the third length is required to be less than or equal to the sum of the first length and the second length in order that a slack exists.

The workpiece having such a slack can be conveyed, for example, by the slack holding device B described in the first embodiment. Further, the control unit 290 described in the first embodiment can control the conveyance speeds of the workpiece in the printing step S1, the conveying step S2, and the foaming step S3.

Even if the conveyance of the workpiece is stopped or the conveyance speed is changed in the printing step S1, the influence is absorbed by the slack. Therefore, in the conveying step S2, as long as the slack exists, the workpiece can be continuously conveyed at a constant speed toward the foaming step S3, irrespective of the conveyance status in the printing step S1. Therefore, the intermittent conveyance in the printing step S1 can be led to the continuous conveyance in the foaming step S3.

(Foaming Step S3)

In the foaming step S3, the workpiece conveyed in the conveying step S2 is heated in the heating region while being continuously conveyed, to foam the workpiece.

The foaming step S3 can be performed, for example, by the foaming apparatus 270 described in the first embodiment.

As described above, a foamed object formed of a foamed workpiece in which a foaming layer is foamed can be manufactured from a sheet-shaped workpiece that foams by heating.

Effect of Second Embodiment

In a conventional manufacturing method in which a foamable workpiece is printed and then foamed to manufacture a foamed object, when the printing process is performed using a scanning printer instead of a line printer, the workpiece is intermittently conveyed in the scanning printer, and thus it is necessary to intermittently convey the workpiece similarly in the foaming process following the printing process, as described in the effect of the first embodiment The same applies to the case where a cutting process is performed on the workpiece instead of the printing process. However, if the foaming process is performed while the workpiece is being intermittently conveyed, there is a risk that defects such as uneven foaming may occur.

On the other hand, in the manufacturing method according to the second embodiment, the slack in the conveying step S2 can lead the intermittent conveyance in the printing step S1 to the continuous conveyance in the foaming step S3.

Further, as described in the first embodiment, in the conventional manufacturing method, the optimization of the resolution and the printing speed (for example, increase of the printing speed at a low resolution) could not be realized because of the necessity to perform printing at a constant speed at any resolution.

On the other hand, in the manufacturing method according to the second embodiment, even if the printing speed (second length over a predetermined time) in the printing step S1 fluctuates, the fluctuation is absorbed by the slack, and thus the conveyance speed (third length over a predetermined time) in the foaming step S3 can be adjusted irrespective of the printing speed. Therefore, it is possible to change the printing speed according to the resolution required for printing the image while maintaining the conveyance speed required for foaming. As a result, the resolution and the printing speed can be optimized.

(Variation 6)

In the second embodiment, as in Variation 4, a processing step of performing processing other than printing may be performed instead of the printing step S1, or the processing step may be performed after the printing step S1 and before the conveying step S2. Alternatively, the processing step may be performed before the printing step S1.

The processing performed in the processing step includes pretreatment, posttreatment, coating (for example, liquid lamination), and cutting.

When the processing step is performed instead of the printing step S1, the workpiece is intermittently conveyed in the processing step. On the other hand, when it is performed before or after the printing step S1, the workpiece may be continuously conveyed at a constant speed or intermittently in the processing step.

Further, when any other processing step is performed while the workpiece is intermittently conveyed with a processing region after the printing step S1 and before the conveying step S2, the workpiece may be subjected to printing while being continuously conveyed at a constant speed using a line printer or the like in the printing step S1.

According to this variation, the workpiece subjected to both printing and processing or only processing is sent to the conveying step S2 while being intermittently conveyed, and, as in the second embodiment, in the conveying step S2, this intermittent conveyance is converted into continuous conveyance at a constant speed toward the foaming step S3. As a result, the workpiece can be continuously foamed while the workpiece is subjected to processing that involves intermittent conveyance, such as cutting.

(Variation 7)

In the second embodiment, in the case where the conveyance speed (that is, the third length) in the foaming step S3 is changed, for example, in the case where the printing speed in the printing step S1 is changed due to changes in image to be printed and thus in number of passes required for printing, a foaming condition changing step of changing the length of the heating region along the conveyor path for the workpiece according to the conveyance speed (that is, the third length) may be performed.

For example, in the case where the foaming step S3 is performed by the foaming apparatus 270 described in the first embodiment, the length of the heating region can be changed by changing the number of heating apparatuses 273 to be operated by turning on/off switches of the respective heating apparatuses 273 manually or using the control unit of the foaming apparatus 270.

According to this variation, the conveyance speed (third length over a predetermined time) of the foaming step S3 can be changed according to the fluctuation of the printing speed (second length over a predetermined time) in the printing step S1, for example, the second length and the third length can be made substantially equal. Therefore, the printing speed can be optimized according to the resolution required.

(Variation 8)

The printing apparatus 250, the slack holding device B, and the foaming apparatus 270 of the manufacturing apparatuses 2100 according to the first embodiment and Variations 1 to 5 may each be provided as an independent module.

The characteristics described in the above-described embodiments and variations can be arbitrarily combined as long as they do not conflict with each other.

The invention claimed is:

1. A manufacturing method for a printed matter that is foamable and foams to form an irregular pattern on a surface of the printed matter, comprising:
 a printing step of inkjet-printing a foaming inhibition ink on a printing medium having a layer of a foamable resin composition containing a chemical foaming agent, under a temperature condition lower than a softening temperature of the foamable resin composition,
 wherein a resin of the foamable resin composition comprises a vinyl chloride-based resin or a non-vinyl chloride-based thermoplastic resin;
 wherein when the resin of the foamable resin composition is the vinyl chloride-based resin, the foaming inhibition ink comprises:
  a foaming inhibitor that deteriorates a heat decomposing ability of the foamable resin composition, wherein the foaming inhibitor comprises 1-[N,N-bis(2-ethylhexyl)aminomethyl]methylbenzotriazole; and
  a solvent that dissolves the foaming inhibitor when the foaming inhibitor is solid, is compatible with the foaming inhibitor when the foaming inhibitor is liquid, and is able to move the foaming inhibitor into the foamable resin composition, wherein the solvent comprises diethylene glycol ethyl methyl ether and ε-caprolactone.

2. The manufacturing method for the printed matter as set forth in claim 1, wherein
 the foamable resin composition further comprises: a foaming aid of a metal-base that promotes a foaming reaction of the chemical foaming agent;
 the foaming inhibitor is a chelating agent that chelates a metal of the foaming aid; and
 the solvent is a non-aqueous solvent when the resin of the foamable resin composition is the vinyl chloride-based resin, and is an aqueous solvent when the resin of the foamable resin composition is the non-vinyl chloride-based thermoplastic resin.

3. The manufacturing method for the printed matter as set forth in claim 1, wherein
 the printing step further comprises: inkjet-printing a coloring ink containing a colorant;
 the coloring ink is a non-aqueous ink when the resin of the foamable resin composition is the vinyl chloride-based resin; and
 the coloring ink is a latex ink when the resin of the foamable resin composition is the non-vinyl chloride-based thermoplastic resin.

4. A manufacturing method for a foam having an irregular pattern on a surface of the foam, comprising:
 a heating step of heating the printed matter as set forth in claim 1 at a temperature at which a difference occurs between heat decomposition of a region where the foaming inhibition ink is printed and heat decomposition of a region where the foaming inhibition ink is not printed, of the layer of the foamable resin composition to foam at least a part of the chemical foaming agent to make the region where the foaming inhibition ink is printed into a recess,
 wherein the foaming inhibition ink comprises a black colorant that emphasize the recess.

5. A manufacturing method for a foam having an irregular pattern on a surface of the foam, comprising:
 a heating step of heating the printed matter as set forth in claim 2 at a temperature at which a difference occurs between heat decomposition of a region where the foaming inhibition ink is printed and heat decomposition of a region where the foaming inhibition ink is not printed, of the layer of the foamable resin composition to foam at least a part of the chemical foaming agent to make the region where the foaming inhibition ink is printed into a recess,
 wherein the foaming inhibition ink comprises a black colorant that emphasize the recess.

6. A manufacturing method for a foam having an irregular pattern on a surface of the foam, comprising:
 a heating step of heating the printed matter as set forth in claim 3 at a temperature at which a difference occurs between heat decomposition of a region where the foaming inhibition ink is printed and heat decomposition of a region where the foaming inhibition ink is not printed, of the layer of the foamable resin composition to foam at least a part of the chemical foaming agent to make the region where the foaming inhibition ink is printed into a recess,
 wherein the foaming inhibition ink comprises a black colorant that emphasize the recess.

7. A foaming inhibition ink for inkjet printing on a printing medium having a layer of a foamable resin composition containing a chemical foaming agent, comprising:
 a foaming inhibitor that deteriorates a heat decomposing ability of the foamable resin composition; and
 a solvent that dissolves the foaming inhibitor when the foaming inhibitor is solid, is compatible with the foaming inhibitor when the foaming inhibitor is liquid, and is able to move the foaming inhibitor into the foamable resin composition,
 wherein a resin of the foamable resin composition comprises a vinyl chloride-based resin or a non-vinyl chloride-based thermoplastic resin;
 wherein
 when the resin of the foamable resin composition is the vinyl chloride-based resin, the foaming inhibitor comprises 1-[N,N-bis(2-ethylhexyl)aminomethyl]methylbenzotriazole, and the solvent is a non-aqueous solvent when the resin of the foamable resin composition is the vinyl chloride-based resin, wherein the solvent comprises diethylene glycol ethyl methyl ether and ε-caprolactone;
 when the resin of the foamable resin composition is the non-vinyl chloride-based thermoplastic resin, the solvent is an aqueous solvent.

8. A forming method for a three-dimensional formed object, comprising:
 an applying step of applying an ink to a medium in sheet shape, wherein the medium has a foaming layer that foams by being heated, and the ink is for controlling a foaming of the foaming layer;
 a cutting step of performing a cutting that foil is a perforation or a notch in the medium; and
 a foaming step of foaming the foaming layer by heating the medium after the applying step and the cutting step.

9. The forming method for the three-dimensional formed object as set forth in claim 8, further comprising:
a printing step of printing an image on the medium.

10. The forming method for the three-dimensional formed object as set forth in claim 9, wherein
in the printing step, a plurality of images arranged in a width direction of the medium are printed on the medium, and
in the cutting step, the perforation or the notch extending along a length direction of the medium is formed between the plurality of images.

11. The forming method for the three-dimensional formed object as set forth in claim 8, wherein
the applying step and the cutting step are performed by using an identical apparatus.

12. The forming method for the three-dimensional formed object as set forth in claim 8, wherein
in the cutting step, the medium is cut to form the perforation.

13. The forming method for the three-dimensional formed object as set forth in claim 12, wherein
in the cutting step, the perforation is formed in which a ratio of a length of an uncut portion to a length of a cut portion ranges from 1:1 to 1:5.

\* \* \* \* \*